(12) United States Patent
Das et al.

(10) Patent No.: US 8,610,991 B2
(45) Date of Patent: Dec. 17, 2013

(54) ELECTROCHROMIC MATERIAL AND ELECTROCHROMIC DEVICE INCLUDING THE SAME

(75) Inventors: Rupasree Ragini Das, Suwon-si (KR); Chang-Ho Noh, Suwon-si (KR); Seog-Jin Jeon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 362 days.

(21) Appl. No.: 13/172,481

(22) Filed: Jun. 29, 2011

(65) Prior Publication Data

US 2012/0013966 A1 Jan. 19, 2012

(30) Foreign Application Priority Data

Jul. 14, 2010 (KR) .................. 10-2010-0068159

(51) Int. Cl.
*G02F 1/153* (2006.01)
(52) U.S. Cl.
USPC .................... 359/265; 359/270; 359/273
(58) Field of Classification Search
USPC .................... 359/265, 270, 273
See application file for complete search history.

(56) References Cited

U.S. PATENT DOCUMENTS

| 2005/0179012 | A1  | 8/2005  | Kwon et al.      |
|--------------|-----|---------|------------------|
| 2005/0231784 | A1  | 10/2005 | Shinohara et al. |
| 2006/0110638 | A1  | 5/2006  | Corr et al.      |
| 2009/0002802 | A1* | 1/2009  | Shibuya et al. ............ 359/273 |
| 2010/0039025 | A1  | 2/2010  | Son et al.       |
| 2010/0053724 | A1  | 3/2010  | RaginiDas et al. |

FOREIGN PATENT DOCUMENTS

| JP | S59-044379 A    | 3/1984  |
|----|-----------------|---------|
| JP | 05-170738 A     | 7/1993  |
| JP | 2001-188261 A   | 7/2001  |
| JP | 2007-031708 A   | 2/2007  |
| JP | 2008-179725 A   | 8/2008  |
| JP | 2009-048142 A   | 3/2009  |
| KR | 10-2001-026838 A | 4/2001 |
| KR | 10-2005-096149 A | 10/2005 |
| KR | 10-2010-020417 A | 2/2010 |
| KR | 10-2010-027510 A | 3/2010 |
| WO | 2004/067673 A1  | 8/2004  |
| WO | 2005/095342 A1  | 10/2005 |

OTHER PUBLICATIONS

The Extended European Search Report for European Patent Application No. 111734752 mailing date of Nov. 6, 2012.

\* cited by examiner

*Primary Examiner* — James Jones
(74) *Attorney, Agent, or Firm* — Cantor Colburn LLP

(57) ABSTRACT

An electrochromic compound represented by the following Chemical Formula 1:

Chemical Formula 1

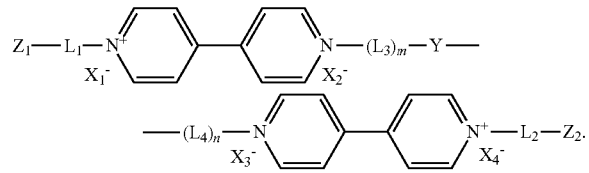

Also disclosed is an electrochromic device including the electrochromic compound.

21 Claims, 39 Drawing Sheets

Chemical Shift (parts per million, ppm)

Chemical Shift (parts per million, ppm)

Chemical Shift (parts per million, ppm)

Chemical Shift (parts per million, ppm)

Chemical Shift (parts per million, ppm)

Chemical Shift (parts per million, ppm)

Chemical Shift (parts per million, ppm)

ELECTROCHROMIC MATERIAL AND ELECTROCHROMIC DEVICE INCLUDING THE SAME

CROSS-REFERENCE TO RELATED APPLICATION

This application claims priority to Korean Patent Application No. 10-2010-0068159, filed on Jul. 14, 2010, and all the benefits accruing therefrom under 35 U.S.C. §119, the content of which in its entirety is herein incorporated by reference.

BACKGROUND

1. Field

This disclosure relates to an electrochromic compound and an electrochromic device including the same.

2. Description of the Related Art

Electrochromism refers to a phenomenon of reversible color change upon application of a voltage. An electrochromic material has optical characteristics that may be reversibly changed by oxidation and reduction. Thus the electrochromic material may be colorless (i.e., not display a color in a "bleached" state) when an electric field is not applied and may be colored when an electric field is applied; or on the contrary, it may be colored when an electric field is not applied and may be colorless when an electric field is applied.

The electrochromic material may be applied to an electrochromic device to provide electrically controlled optical transmission characteristics according to an applied voltage.

Electrochromic devices have been applied to provide smart windows. Also, electrochromic devices have been used to provide a display, such as electronic paper, in part due to the excellent portability and lightweight characteristics of electrochromic devices.

However, there remains a need for improved electrochromic materials.

SUMMARY

An embodiment of this disclosure provides a novel electrochromic compound, in particular an asymmetric novel electrochromic compound.

Another embodiment of this disclosure provides an electrochromic device including the electrochromic compound.

According to an embodiment of this disclosure, an electrochromic compound represented by the following Chemical Formula 1 is provided.

Chemical Formula 1

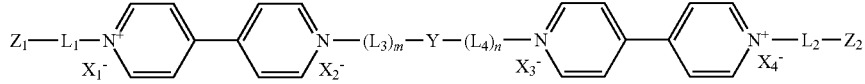

In Chemical Formula 1,
Y is an N-containing aromatic ring group,
$X_1^-$ to $X_4^-$ are each independently a monovalent anion,
$L_1$ to $L_4$ are each independently a single bond, a substituted or unsubstituted C1 to C30 alkylene group, a substituted or unsubstituted C3 to C30 cycloalkylene group, a substituted or unsubstituted C6 to C30 arylene group, or a substituted or unsubstituted C2 to C30 heteroarylene group, and
$Z_1$ and $Z_2$ are each independently a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, provided that at least one of $Z_1$ and $Z_2$ is a phosphonic acid group, a carboxylic acid group, a sulfonic acid group, a hydroxyl group, or a thiol group, and m and n each independently range from 0 to 4.

In Chemical Formula 1, when $Z_1$ and $Z_2$ are the same, $L_1$ and $L_2$ may be different from each other, and are each independently a substituted or unsubstituted C3 to C30 cycloalkylene group, a substituted or unsubstituted C6 to C30 arylene group, or a substituted or unsubstituted C2 to C30 heteroarylene group.

Y is a substituted or unsubstituted pyridine group, a substituted or unsubstituted pyridazine group, a substituted or unsubstituted pyrimidine group, a substituted or unsubstituted pyrazine group, a substituted or unsubstituted quinoline group, a substituted or unsubstituted quinoxaline group, a substituted or unsubstituted isoquinoline group, an N-substituted, substituted or unsubstituted benzimidazole group, an N-substituted, substituted or unsubstituted indole group, an N-substituted, substituted or unsubstituted isoindole group, an N-substituted, substituted or unsubstituted indazole group, an N-substituted, substituted or unsubstituted carbazole group, a substituted or unsubstituted phthalazine group, or a substituted or unsubstituted acridine group. For example, Y may be a functional group represented by the following Chemical Formula 2.

Chemical Formula 2

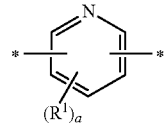

(1)

-continued

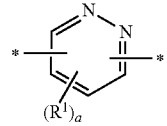

(2)

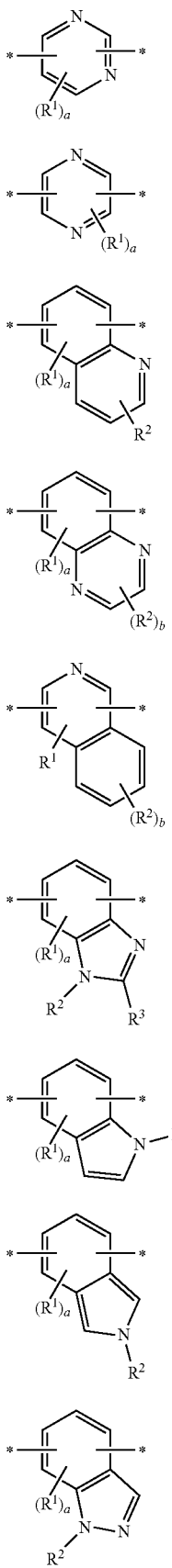

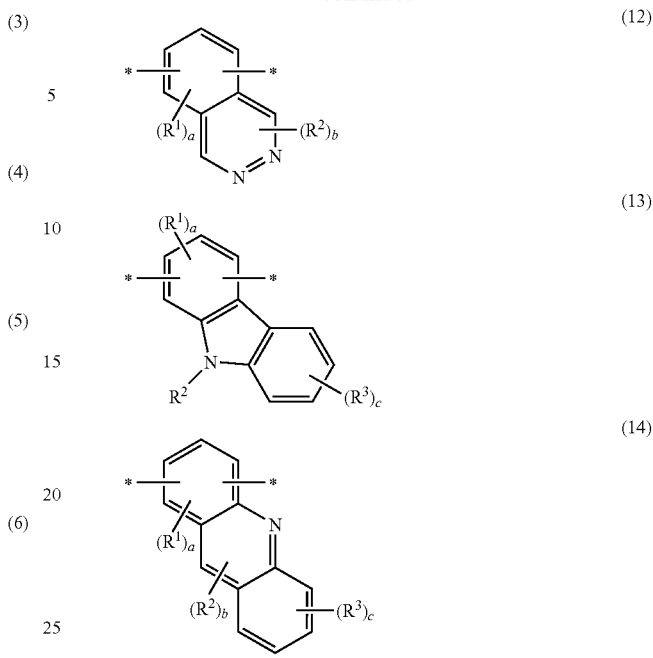

In Chemical Formula 2, $R^1$ to $R^3$ are each independently hydrogen, a substituted or unsubstituted C1 to C10 alkyl group, or a substituted or unsubstituted C6 to C12 aryl group, and a to c range from 0 to the number of hydrogens in the ring being substituted.

One of $Z_1$ and $Z_2$ is a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, and the other of $Z_1$ and $Z_2$ is a phosphonic acid group, a carboxylic acid group, a sulfonic acid group, a hydroxyl group, or a thiol group.

In an embodiment, one of -$L_1$-$Z_1$ and -$L_2$-$Z_2$ is a substituted or unsubstituted phenyl group, a substituted or unsubstituted benzyl group, a substituted or unsubstituted vinyl group, a substituted or unsubstituted allyl group, a substituted or unsubstituted carbazolyl group, a substituted or unsubstituted pyrenyl group, a substituted or unsubstituted thiophene group, a substituted or unsubstituted hydroxyalkyl group, a substituted or unsubstituted heptyl group, a substituted or unsubstituted octyl group, or represented by the following Chemical Formula 3A, which includes a substituted or unsubstituted quinolinyl group (1), a substituted or unsubstituted quinoxalinyl group (2), a substituted or unsubstituted fluorenyl group (3), a substituted or unsubstituted beta-methylstyrenyl group (4), a substituted or unsubstituted anthraquinonyl group (5), a substituted or unsubstituted benzimidazolyl group (6), and a substituted or unsubstituted N-phenyl imidazolyl group (7), and the other of -$L_1$-$Z_1$ and -$L_2$-$Z_2$ is a functional group represented by the following Chemical Formula 3B-1 or 3B-2.

Chemical Formula 3A

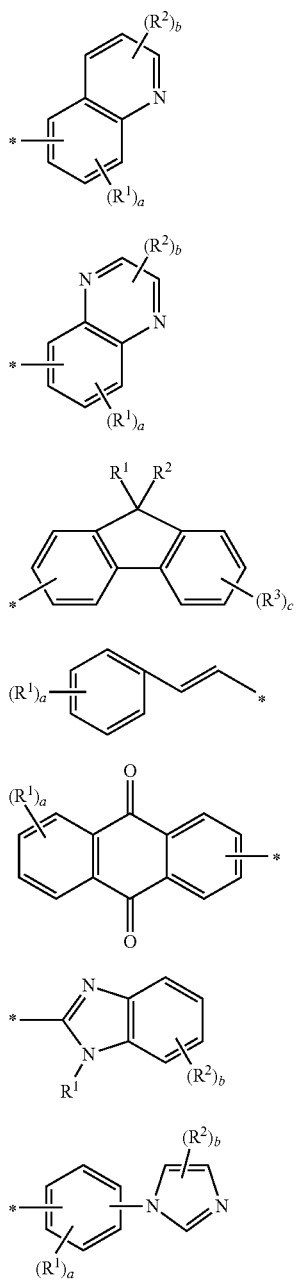

(1)
(2)
(3)
(4)
(5)
(6)
(7)

In Chemical Formula 3A,
R$^1$ and R$^2$ are each independently a substituted or unsubstituted C1 to C10 alkyl group, or a substituted or unsubstituted C6 to C12 aryl group, and a to c range from 0 to the number of hydrogens on the substituted ring.

$$*\text{-}(G)_n\text{-}(Z_3)_k \quad \text{Chemical Formula 3B-1}$$

In Chemical Formula 3B-1,
G is a C1 to C4 hydrocarbon group,
Z$_3$ is a phosphonic acid group, a carboxylic acid group, a sulfonic acid group, a hydroxyl group, or a thiol group,
n ranges from 0 to 1, and k is 1 or 2.

$$*\text{—}(CH_2)_{m1}\text{-}(Ph)_{m2}\text{-}(CH_2)_{m3}\text{—}(Z_3)_k \quad \text{Chemical Formula 3B-2}$$

In Chemical Formula 3B-2,
Ph is a substituted or unsubstituted phenylene, Z$_3$ is a phosphonic acid group, a carboxylic acid group, a sulfonic acid group, a hydroxyl group, or a thiol group, m1, m2, and m3 are each independently 0 to 4, and k is 1 or 2.

Examples of the functional groups of Chemical Formulas 3B-1 and 3B-2 include groups represented by the following Chemical Formula 4.

Chemical Formula 4

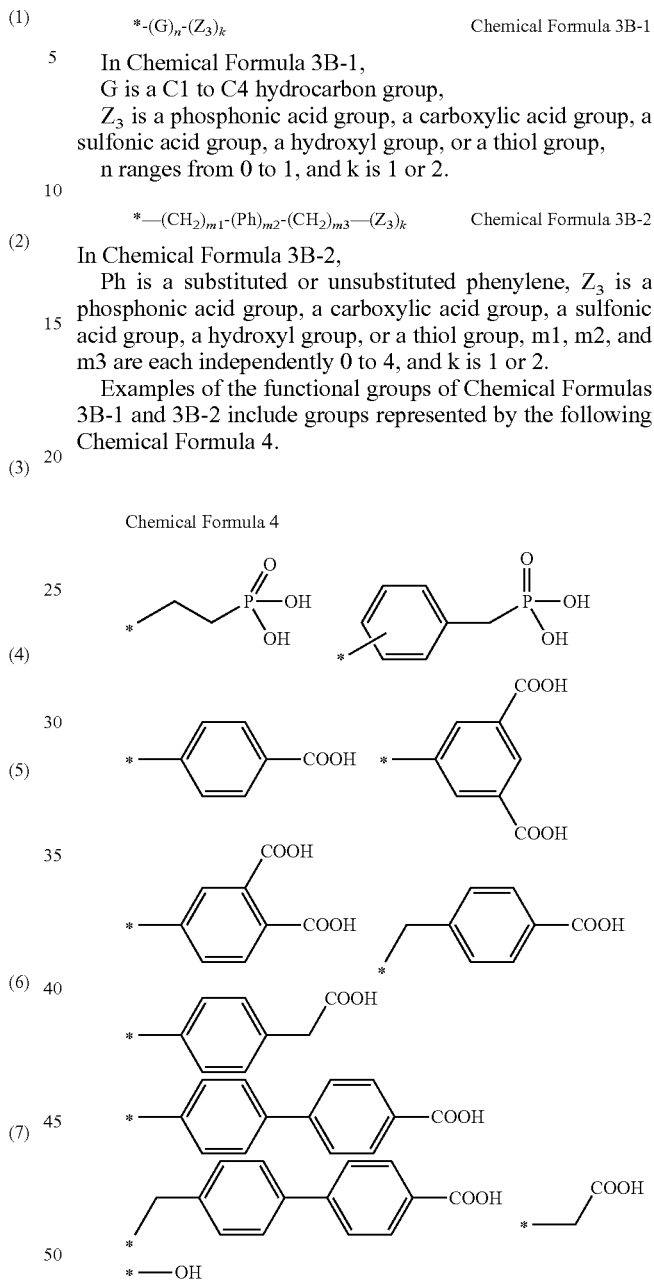

The electrochromic compound may include at least one of the compounds represented by the following Chemical Formulae 1A to 1J.

Chemical Formula 1A

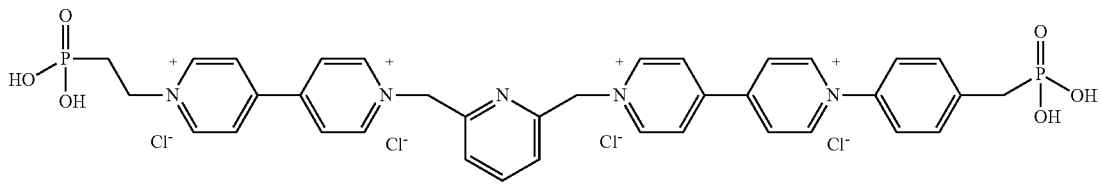

-continued
Chemical Formula 1B
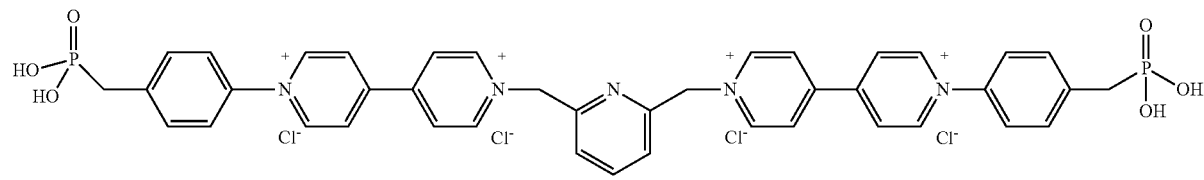
Chemical Formula 1C
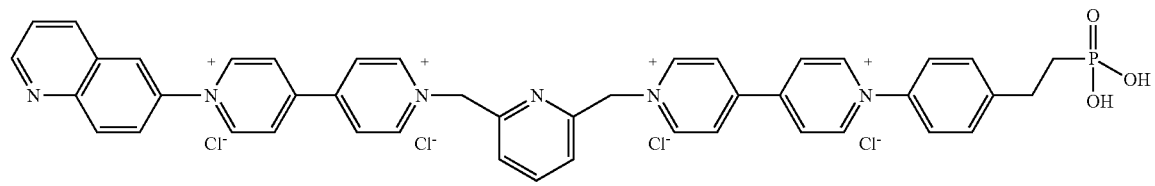
Chemical Formula 1D
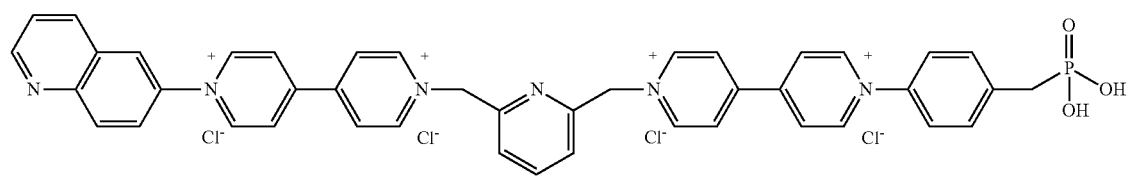
Chemical Formula 1E
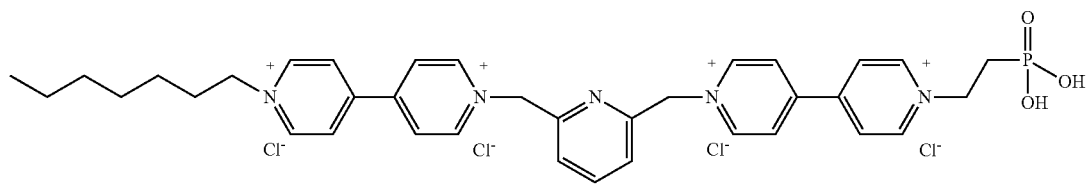
Chemical Formula 1F
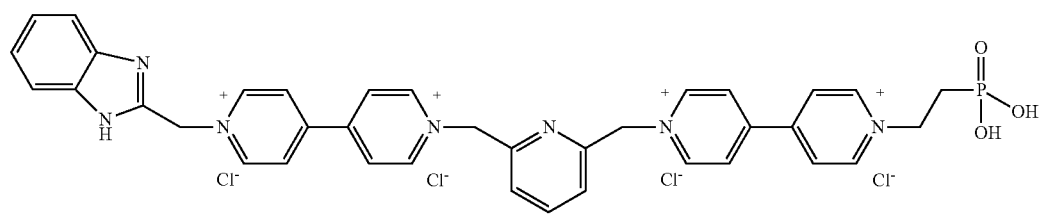
Chemical Formula 1G
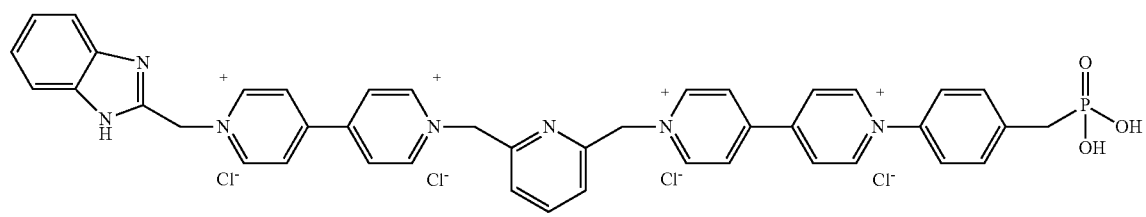
Chemical Formula 1H
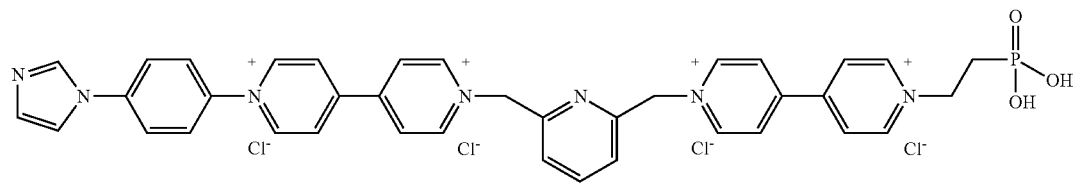

Chemical Formula 1I

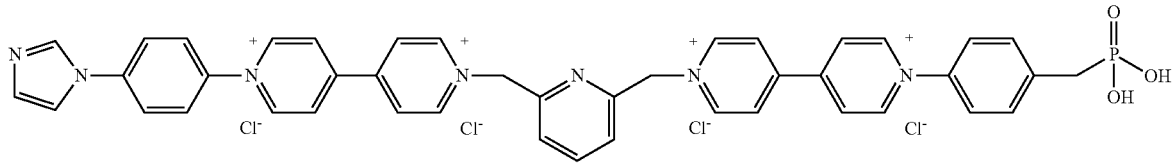

Chemical Formula 1J

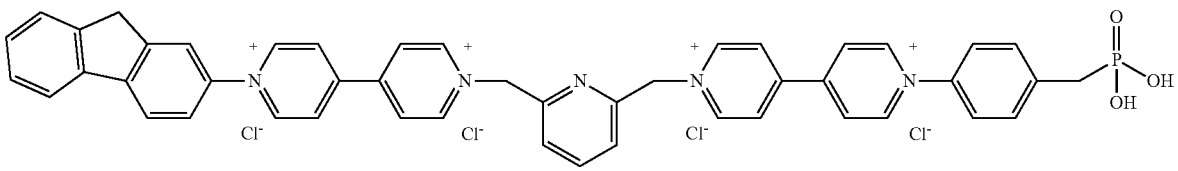

The electrochromic compound may have a black color or a color close to black, such as deep green, deep violet, and the like.

According to another embodiment, an electrochromic device includes: a first electrode and a second electrode opposite the first electrode, an electrochromic compound on either of the first electrode or the second electrode, and an electrolyte layer positioned between the first electrode and the second electrode, wherein the electrochromic compound is represented by the above-described Chemical Formula 1.

The electrochromic device may have an operating voltage of about 0.9 volts (V) or more.

The electrochromic device may have a potential window of about 1.2 V to about 2 V.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
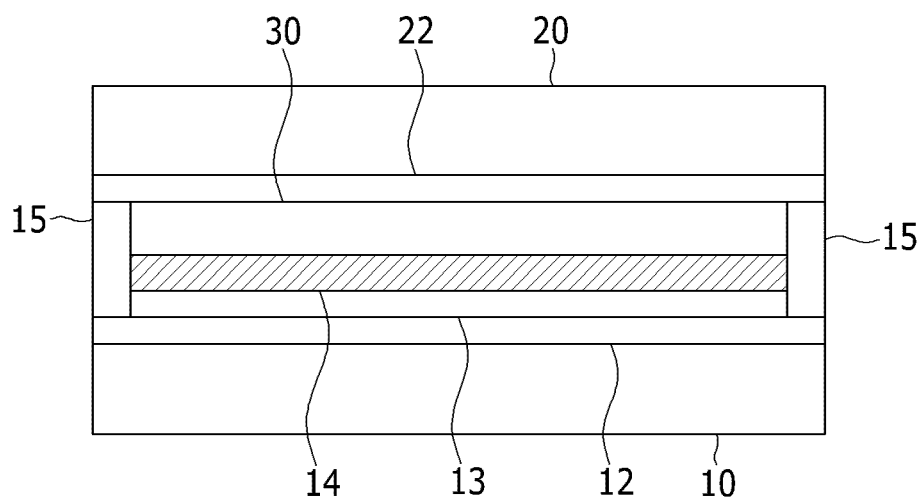
FIG. 1 is a schematic cross-sectional view of an embodiment of an electrochromic device.

The invention will be described more fully hereinafter with reference to the accompanying drawings, in which exemplary embodiments are shown. As those skilled in the art would realize, the embodiments may be modified in various different ways, all without departing from the spirit or scope of the present disclosure, and should not be construed as limited to the embodiments set forth herein. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, a first "element," "component," "region," "layer," or "section" discussed below could be termed a second element, component, region, layer, or section without departing from the teachings herein.

The terminology used herein is for the purpose of describing particular embodiments only and is not intended to be limiting. As used herein, the terms "a" and "an" are open terms that may be used in conjunction with singular items or with plural items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a "hydrocarbon" group has the indicated number of carbons and the valence dictated by the structure.

"Alkyl" means a straight or branched chain, saturated, monovalent group (e.g., methyl and hexyl) having the indicated number of carbon atoms.

"Alkenyl" means a straight or branched chain, monovalent group having the indicated number of carbon atoms and at least one carbon-carbon double bond (e.g., ethenyl (—HC=CH$_2$)).

"Alkylene" means a straight or branched chain, saturated, divalent aliphatic group having the indicated number of carbon atoms (e.g., methylene (—CH$_2$—) and propylene (—(CH$_2$)$_3$—)).

"Alkoxy" means an alkyl group having the indicated number of carbon atoms that is linked via an oxygen (i.e., alkyl-O—), for example methoxy, ethoxy, and sec-butyloxy groups.

"Aryl" means a monovalent group having the indicated number of carbon atoms and formed by removal of a hydrogen atom from an aromatic carbon-containing ring, and includes monocyclic and polycyclic groups (e.g., phenyl or naphthyl) wherein the additional ring(s) of a polycyclic aryl group may be aromatic or nonaromatic.

"Arylene" means a divalent group having the indicated number of carbon atoms and formed by the removal of two hydrogen atoms from an aromatic carbon-containing ring, and includes monocyclic and polycyclic groups (e.g., phenylene or naphthylene) wherein the additional ring(s) of a polycyclic aryl group may be aromatic or nonaromatic "Aryloxy" means an aryl moiety having the indicated number of carbon atoms and that is linked via an oxygen (i.e., —O-aryl).

"Arylalkylene" means an aryl group covalently linked to an alkylene group that is linked to a compound (e.g., a benzyl is a C7 arylalkylene group).

"Cycloalkyl" means a monovalent group having the indicated number of carbon atoms and one or more saturated rings in which all ring members are carbon (e.g., cyclopentyl and cyclohexyl).

"Cycloalkylene" means a divalent group having the indicated number of carbon atoms and formed by the removal of two hydrogen atoms from one or more rings of a nonaromatic saturated cyclic group comprising at least one ring).

"Cycloalkenyl" means a monovalent group having the indicated number of carbon atoms and having one or more rings and one or more carbon-carbon double bond in the ring, wherein all ring members are carbon (e.g., cyclopentenyl and cyclohexenyl).

"Cycloalkynyl" means a stable aliphatic monocyclic or polycyclic group having at least one carbon-carbon triple bond, wherein all ring members are carbon (e.g., cyclohexynyl).

As used herein, when a definition is not otherwise provided, the term "substituted" refers to a that hydrogen in compound or group is replaced with at least one (e.g., 1, 2, 3, or 4) substituent selected from a halogen (F, Cl, Br, or I), a hydroxyl group (—OH), an C1-9 alkoxy group, a C1-9 haloalkoxy group, an oxo (=O) group, a nitro group (—NO$_2$), a cyano group (—CN), an amino group (—NH$_2$), an azido group (—N$_3$), an amidino group (—C(=NH)NH$_2$), a hydrazino group (—NHNH$_2$), a hydrazono group (=N(NH$_2$)), an aldehyde group (—C(=O)H), a sulfinic acid group (—S(=O)$_2$H), a carbamoyl group (—C(O)NH$_2$), a thiol group (—SH), a thiocyano group (—SCN), a tosyl group (CH$_3$C$_6$H$_4$SO$_2$—), a carboxylic C1 to C6 alkyl ester group (—C(=O)OR wherein R is a C1 to C6 alkyl group), a carboxyl group (—C(=O)OH), a carboxylic acid salt (—C (=O)OM) wherein M is an organic or inorganic anion, a sulfonic acid group (—SO$_3$H), a sulfonic monobasic salt (—SO$_3$M wherein M is an organic or inorganic cation), a phosphonic acid group (—PO$_3$H$_2$), a phosphonic acid mono- or dibasic salt (—PO$_3$MH or —PO$_3$M$_2$ wherein M is an organic or inorganic cation), a C1 to C20 alkyl group, a C2 to C16 alkenyl group, a C6 to C20 aryl group, a C6 to C20 aryloxy group, a C7 to C13 arylalkyl group, a C1 to C4 alkoxy group, a C1 to C20 heteroalkyl group, a C3 to C20 heteroarylalkyl group, a C3 to C20 cycloalkyl group, a C3 to C15 cycloalkenyl group, a C6 to C15 cycloalkynyl group, a C2 to C20 heterocycloalkyl group, and a combination thereof, instead of hydrogen, provided that the substituted atom's normal valence is not exceeded.

As used herein, when a definition is not otherwise provided, the prefix "hetero" refers to a group including 1 to 3 heteroatoms that are each independently selected from N, O, S, Si, and P. Hereinafter, an embodiment of an electrochromic compound is disclosed. The electrochromic compound may employed singly, or included in a combination including two or more electrochromic compounds.

The electrochromic compound according to an embodiment is represented by the following Chemical Formula 1.

Chemical Formula 1

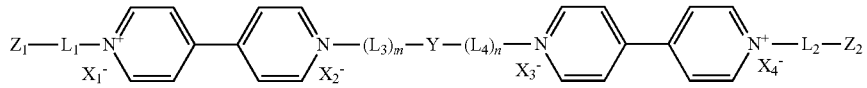

In Chemical Formula 1,

Y is an N-containing aromatic ring group,

X$_1^-$ to X$_4^+$ are each independently a monovalent anion,

L$_1$ to L$_4$ are each independently a single bond, a substituted or unsubstituted C1 to C30 alkylene group, for example methylene group, a substituted or unsubstituted C3 to C30 cycloalkylene group, a substituted or unsubstituted C6 to C30 arylene group, or a substituted or unsubstituted C2 to C30 heteroarylene group, and Z$_1$ and Z$_2$ are each independently a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, provided that at least one of Z$_1$ and Z$_2$ is a phosphonic acid group, a carboxylic acid group, a sulfonic acid group, a hydroxyl group, or a thiol group, and m and n each independently range from 0 to 4.

In Chemical Formula 1, when Z$_1$ and Z$_2$ are the same, L$_1$ and L$_2$ may be different from each other, and may each independently be a substituted or unsubstituted C3 to C30 cycloalkylene group, a substituted or unsubstituted C6 to C30 arylene group, or a substituted or unsubstituted C2 to C30 heteroarylene group. Thus the electrochromic compound may be asymmetric.

The N-containing aromatic ring group includes N in an aromatic ring, has a ring structure including an unsaturated bond and a lone pair, and includes delocalized or resonance electrons.

Y is a substituted or unsubstituted pyridine group, a substituted or unsubstituted pyridazine group, a substituted or unsubstituted pyrimidine group, a substituted or unsubstituted pyrazine group, a substituted or unsubstituted quinoline group, a substituted or unsubstituted quinoxaline group, a substituted or unsubstituted isoquinoline group, an N-substituted, substituted or unsubstituted benzimidazole group, an N-substituted, substituted or unsubstituted indole group, an N-substituted, substituted or unsubstituted isoindole group, an N-substituted, substituted or unsubstituted indazole group, an N-substituted, substituted or unsubstituted carbazole group, a substituted or unsubstituted phthalazine, or a substituted or unsubstituted acridine group. Y may be a functional group represented by the following Chemical Formula 2.

Chemical Formula 2

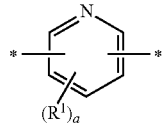
(1)

-continued

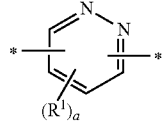
(2)

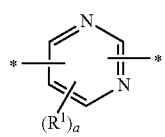
(3)

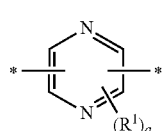
(4)

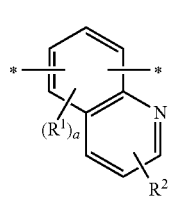
(5)

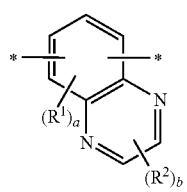
(6)

-continued (7)
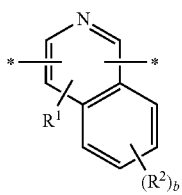

(8)
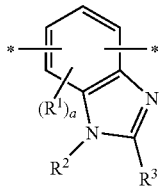

(9)
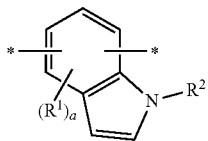

(10)
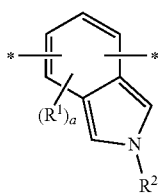

(11)
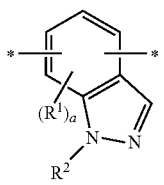

(12)
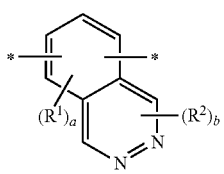

(13)
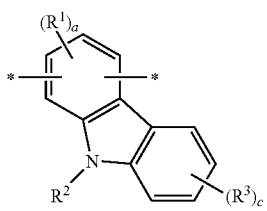

(14)
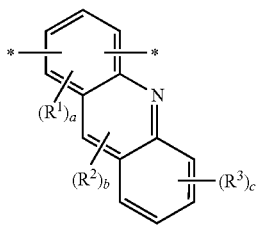

In Chemical Formula 2, $R^1$ to $R^3$ are each independently hydrogen, a substituted or unsubstituted C1 to C10 alkyl group or a substituted or unsubstituted C6 to C12 aryl group, and a to c range from 0 to the number of hydrogens in the ring being substituted. Thus each of $R^1$ to $R^3$ may be the same or different. In Chemical Formula 2, * represents a point of attachment.

In Chemical Formula 2, the pyridine group (1), pyrimidine group (3), or pyrazine group (4) may each independently be bound with a viologen moiety at each of the 2 and 6 positions; the quinoline group (5), quinoxaline group (6), or isoquinoline (7) group may each independently be bound with a viologen moiety at the 6 and 8 positions; and the benzimidazole group (8) may be bound with a viologen moiety at the 5 and 7 positions to produce a compound having a kink structure. In Chemical Formula 2, indole group (9), isoindole group (10) indazole group (11), carbazole group (12), phthalazine group (13), and acridine group (14) may also be bound with a viologen moiety to form a kink structure. Depending on an electronic structure of Y, electrochromic properties of the viologen may be changed.

$X_1^-$ to $X_4^+$ may each independently be $Br^-$, $Cl^-$, $BF_4^-$, $PF_6^-$, $ClO_4^-$, $CF_3SO_3^-$, or an imidazole anion. In an embodiment, $X_1^-$ to $X_4^-$ are each independently $Br^-$, or $Cl^-$.

In another embodiment, at least one of $Z_1$ and $Z_2$ is a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, and the other of $Z_1$ and $Z_2$ is a phosphonic acid group, a carboxylic acid group, a sulfonic acid group, a hydroxyl group, or a thiol group.

In an embodiment, one of $-L_1-Z_1$ and $-L_2-Z_2$ is a substituted or unsubstituted phenyl group, a substituted or unsubstituted benzyl group, a substituted or unsubstituted vinyl group, a substituted or unsubstituted allyl group, a substituted or unsubstituted carbazolyl group, a substituted or unsubstituted pyrenyl group, a substituted or unsubstituted thiophene group, a substituted or unsubstituted hydroxyalkyl group, a substituted or unsubstituted heptyl group, or a substituted or unsubstituted octyl group, or is represented by the following Chemical Formula 3A, including a substituted or unsubstituted quinolinyl group (1), such as a quinolinyl group including methyl substituent, a substituted or unsubstituted quinoxalinyl group (2), a substituted or unsubstituted fluorenyl group (3), a substituted or unsubstituted beta-methylstyrenyl group (4), a substituted or unsubstituted anthraquinonyl group (5), a substituted or unsubstituted benzimidazolyl group (6), and a substituted or unsubstituted N-phenyl imidazolyl group (7), and the other of $-L_1-Z_1$ and $-L_2-Z_2$ may be a functional group represented by the following Chemical Formula 3B-1 or 3B-2.

Chemical Formula 3A (1)
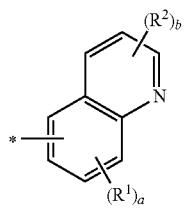

(2)
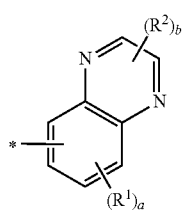

(3)
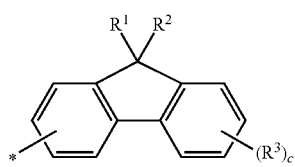

(4)
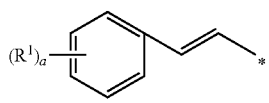

(5)
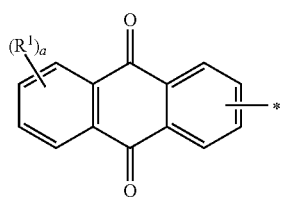

(6)
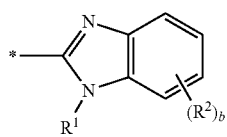

(7)
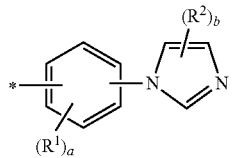

In Chemical Formula 3A, $R^1$ and $R^2$ are and are each independently a substituted or unsubstituted C1 to C10 alkyl group, or a substituted or unsubstituted C6 to C12 aryl group, and a to c range from 0 to the number of hydrogens on the substituted ring. Thus each of $R^1$ and $R^2$ may be the same or different.

*-(G)$_n$-(Z$_3$)$_k$  Chemical Formula 3B-1

In Chemical Formula 3B-1,

G is a C1 to C4 hydrocarbon group, for example a methylene group, $Z_3$ is a phosphonic acid group, a carboxylic acid group, a sulfonic acid group, a hydroxyl group, or a thiol group, n is 0 to 4, more specifically 1 to 3, and k is 1 or 2, more specifically 1. In an embodiment, n is 1 and k is 1.

*—(CH$_2$)$_{m1}$-(Ph)$_{m2}$-(CH$_2$)$_{m3}$—(Z$_3$)$_k$  Chemical Formula 3B-2

In Chemical Formula 3B-2,

Ph is a substituted or unsubstituted phenylene, $Z_3$ is a phosphonic acid group, a carboxylic acid group, a sulfonic acid group, a hydroxyl group, or a thiol group, m1, m2, and m3 are each independently 0 to 4, specifically 1 to 3, more specifically 1 to 2, and k is 1 or 2, more specifically 1. In an embodiment, m1, m2, and m3 are each 1 and k is 1.

Examples of the functional group of Chemical Formulae 3B-1 and 3B-2 include groups represented by the following Chemical Formula 4.

Chemical Formula 4

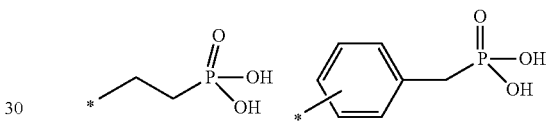

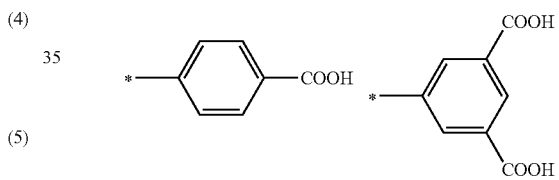

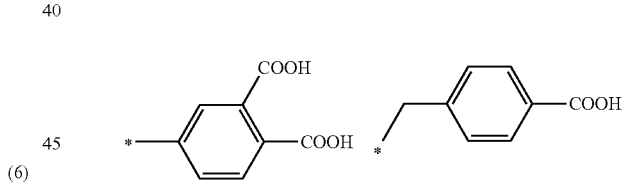

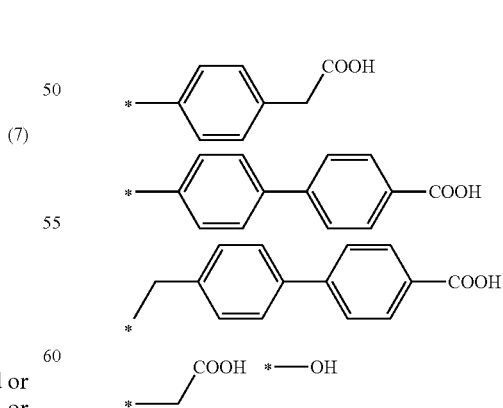

The electrochromic compound may include at least one of the compounds represented by the following Chemical Formulas 1A to 1J.

Chemical Formula 1A
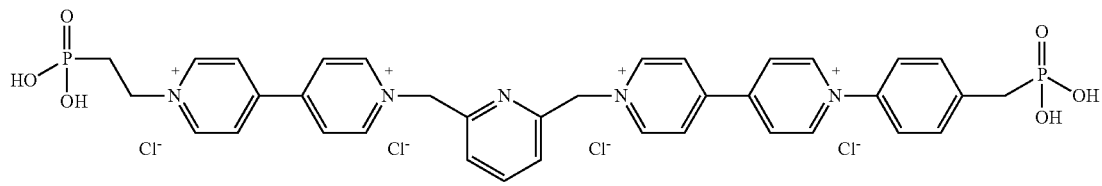
Chemical Formula 1B
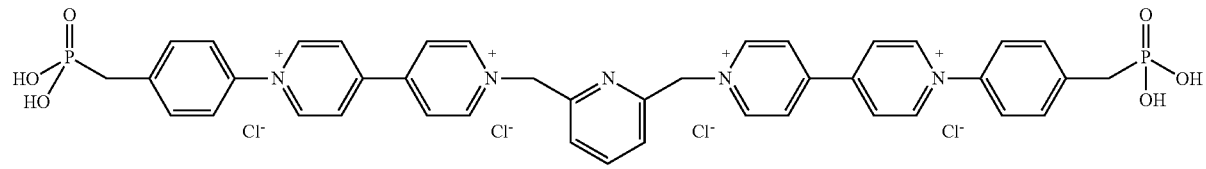
Chemical Formula 1C
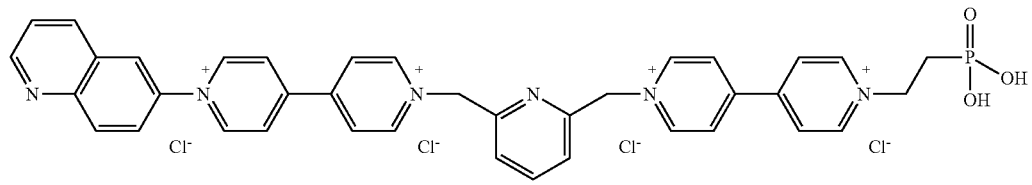
Chemical Formula 1D
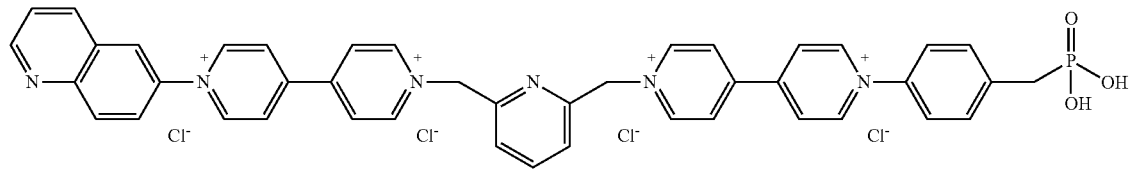
Chemical Formula 1E
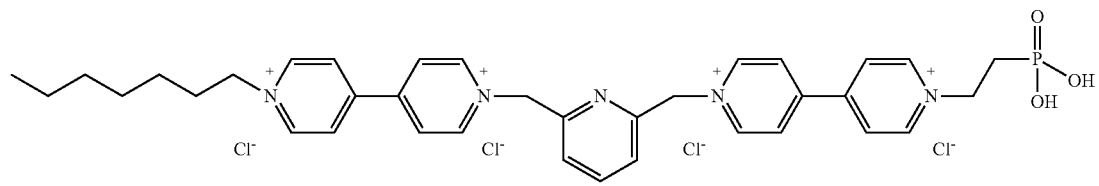
Chemical Formula 1F
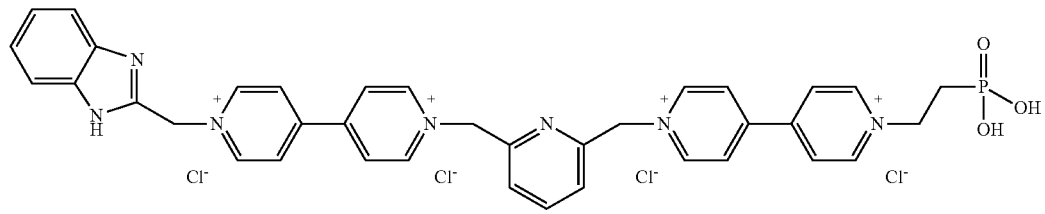
Chemical Formula 1G
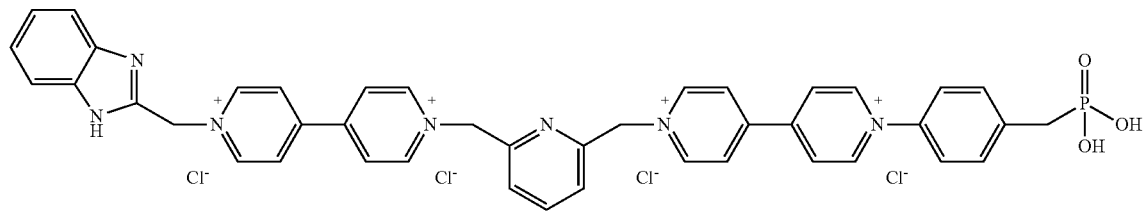

Chemical Formula 1H

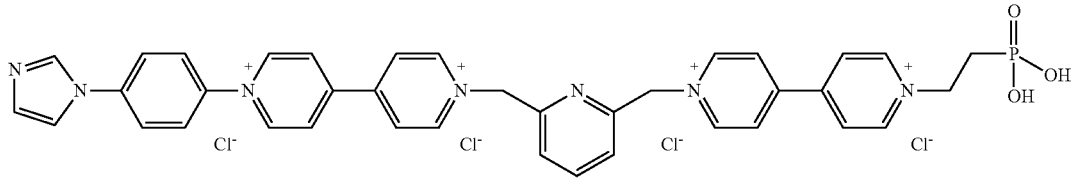

Chemical Formula 1I

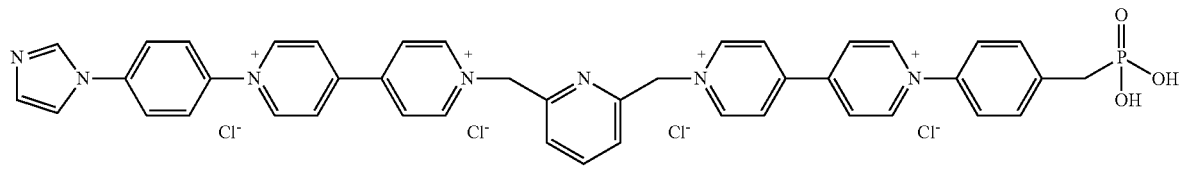

Chemical Formula 1J

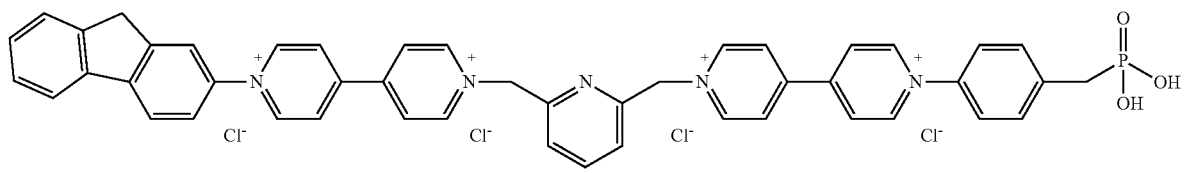

The electrochromic compound may be a multicolor electrochromic material that has (e.g., emits or reflects) a different color at different applied voltages. While not wanting to be bound by theory, it is believed that because the electrochromic compound can be reversibly oxidized and reduced, the electrochromic compound can have a different color depending on its oxidation state, and the oxidation state can be selected by the applied voltage. For example, the electrochromic compound may have a green color at a first voltage range, and a black or a color close to black such as deep green, deep violet, and the like, at a second voltage range. Herein, the second voltage range may be higher than the first voltage range.

According to an embodiment, an electrochromic compound includes two viologen moieties connected to each other by an N-containing aromatic ring group. The two viologen moieties each have a substituent having (e.g., displaying) a different color, respectively. Herein, the N-containing aromatic group provides a red color, and each viologen is substituted with *-$L_1$-$Z_1$ or *-$L_2$-$Z_2$ and respectively provides a blue, or deep green color, and the like to the electrochromic compound. Accordingly, the electrochromic compound may have a black color, or a dark, black-like color.

The viologen may be a moieties of 4,4'-bipyridyl derivative, of which a color reversibly changes upon oxidation and reduction.

The substituent (i.e., *-$L_1$-$Z_1$ or *-$L_2$-$Z_2$) is connected to the viologen and may regulate electron mobility, and thus may control oxidation and reduction of the compound.

In Reaction Scheme 1, (A) shows an oxidation state that is colorless (i.e., bleached or does not emit a color), (B) shows a first reduced state having a first color, and (C) shows a second reduced state having a second color. Herein, the first and second reduced states each respectively have a different color; for example, the state (B) may be green, and the state (C) may be black or a black-like color. Thus the first and second colors may be different.

Reaction Scheme 1

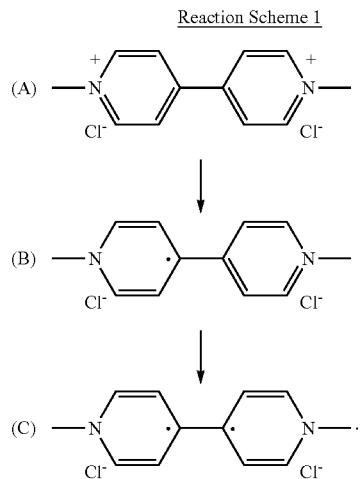

In Reaction Scheme 1, an operating voltage E1 may be used to reduce the electrochromic compound from the (A) state to the (B) state.

As described above, the electrochromic compound of Chemical Formula 1 according to an embodiment has a high operating voltage E1. The operating voltage may be, for example, about 0.2 to about 3 volts (V), specifically about 0.4 to about 2 V, more specifically about 0.8 to about 1.5 V, or more specifically still about 0.9 V or more. In an embodiment, the electrochromic compound has a wide potential window of about 1 to about 3 V, specifically about 1.2 to about 2 V, more specifically about 1 to about 1.5 V. The potential window refers to a voltage range that maintains a color.

Thus the electrochromic compound may change from a bleached (e.g., substantially or entirely colorless state) to a colored state upon application of a voltage. Also when the voltage is not applied, or when a reverse (e.g., negative)

voltage is applied, the electrochromic compound may change from the colored state to the bleached state. The electrochromic compound may change from a bleached state to a colored state upon application of a voltage of greater than or equal to about 0.5 V, specifically greater than or equal to about 1 V, more specifically greater than or equal to about 1.2 V, versus a titanium oxide (i.e., $TiO_2$) coated indium tin oxide electrode. In an embodiment, the electrochromic compound may change from a bleached state to a colored state upon application of a voltage of about 0.5 to about 6 V, specifically about 0.8 to about 4 V, more specifically about 1 to about 2 V, versus a titanium oxide (i.e., $TiO_2$) coated indium tin oxide electrode. Also, the electrochromic compound in the colored state may return to the bleached state by application of a voltage of less than about 0.5 V, specifically less than about 0 V, more specifically less than about −0.5 V, versus a titanium oxide (i.e., $TiO_2$) coated indium tin oxide electrode. In an embodiment, the electrochromic compound in the colored state may return to the bleached state by application of a voltage of about 0.5 to about −6 V, specifically about 0 to about −4 V, more specifically about −0.5 to about −2 V.

In the colored state, the electrochromic compound has an average reflectance between 400 and 700 nanometers (nm) of less than about 10%, specifically less than about 8%, more specifically less than about 6%. In the colored state, the electrochromic compound has an average reflectance between 400 and 700 nanometers (nm) of about 0.1 to about 10%, specifically about 0.2 to about 8%, more specifically about 0.4 to about 6%.

In another embodiment, in the colored state the electrochromic compound has an average reflectance between 500 and 700 nanometers (nm) of less than about 5%, specifically less than about 2.5%, more specifically less than about 1%. In the colored state, the electrochromic compound has an average reflectance between 500 and 700 nanometers (nm) of about 0.01 to about 5%, specifically about 0.02 to about 2.5%, more specifically about 0.04 to about 1%.

In another embodiment, in the colored state the electrochromic compound has an average reflectance between 425 and 475 nanometers (nm) of less than about 5%, specifically less than about 2.5%, more specifically less than about 1%. In the colored state, the electrochromic compound has an average reflectance between 425 and 475 nanometers (nm) of about 0.01 to about 5%, specifically about 0.02 to about 2.5%, more specifically about 0.04 to about 1%.

Also, when oxidized at a voltage of greater than 1V versus a titanium oxide (i.e., $TiO_2$) coated indium tin oxide electrode, the electrochromic compound has a wavelength of maximum reflectance at about 400 to about 500 nm, specifically 425 to about 475 nm, more specifically about 450 nm.

According to an embodiment, an electrochromic compound of Chemical Formula 1 may be a multicolor electrochromic material which displays two or more colors by selecting an oxidation state of the electrochromic material.

The electrochromic compounds may be prepared by methods known in the art, based on the guidance provided herein. For example, a method of preparing the electrochromic compound comprises contacting a first viologen precursor compound, a second viologen precursor compound, and an N-containing aromatic ring compound to form an intermediate electrochromic compound; and optionally treating the intermediate electrochromic compound with, e.g., an inorganic acid, to prepare the electrochromic compound.

The first viologen precursor compound and the second viologen precursor compound may be the same or different, and each independently may be represented by the derivatized 4,4'-bipyridyl compound of Chemical Formula 5.

Chemical Formula 5

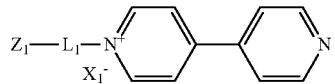

In Chemical Formula 5, $X_1^-$ is a monovalent anion, specifically a halogen, $L_1$ is a single bond, a substituted or unsubstituted C1 to C30 alkylene group, a substituted or unsubstituted C3 to C30 cycloalkylene group, a substituted or unsubstituted C6 to C30 arylene group, or a substituted or unsubstituted C2 to C30 heteroarylene group, and $Z_1$ is a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid ester group, a carboxylic acid ester group, a sulfonic acid ester group, a hydroxyl group, or a thiol group, provided that in at least one of the first precursor and the second precursor $Z_1$ is a phosphonic acid ester group, a carboxylic acid ester group, a sulfonic acid ester group, a hydroxyl group, or a thiol group.

The N-containing aromatic ring compound may be a halogen-containing N-substituted indole, N-substituted isoindole, N-substituted indazole, N-substituted carbazole, phthalazine, or acridine, or a halogen-containing compound represented by Chemical Formula 6.

Chemical Formula 6

(1)

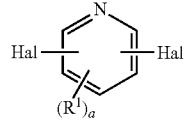

(2)

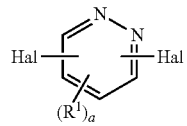

(3)

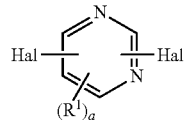

(4)

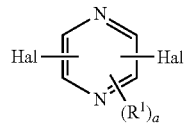

(5) 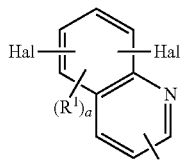

(6) 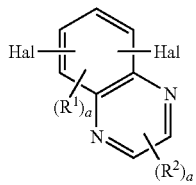

(7) 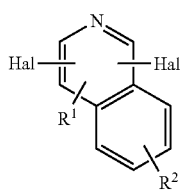

(8) 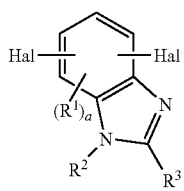

(9) 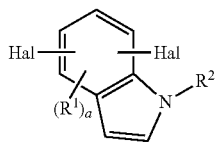

(10) 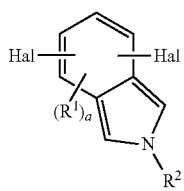

(11) 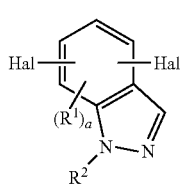

(12) 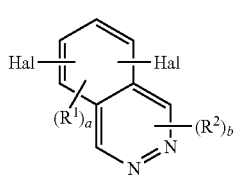

(13) 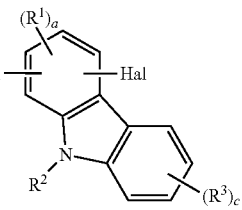

(14) 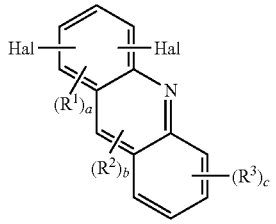

In Chemical Formula 6, $R^1$ to $R^3$ are each independently selected from hydrogen, a substituted or unsubstituted C1 to C10 alkyl group or a substituted or unsubstituted C6 to C12 aryl group, and a to c ranges from 0 to the number of hydrogens in the ring being substituted, and Hal is a halogen, specifically bromine.

The contacting of the first viologen precursor, the second viologen precursor, and the N-containing aromatic ring compound to form the ester intermediate may be conducted in a solvent. Suitable solvents are known in the art, and can be selected based on considerations such as stability, availability, processability, and the like, without undue experimentation. Aprotic polar organic solvents such as acetonitrile may be specifically mentioned.

Hereinafter, an electrochromic device using the electrochromic compound is further disclosed with reference to FIG. 1.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is the schematic cross-sectional view of an embodiment of electrochromic device.

Referring to FIG. 1, the electrochromic device includes a first and a second insulating substrates 10 and 20, respectively, facing (e.g., opposite) each other, and a first and a second electrodes 12 and 22, respectively disposed on the first and the second insulating substrates 10 and 20, respectively.

The insulating substrates 10 and 20 may each independently comprise a transparent glass or a plastic. Examples of the plastic include one or more selected from polyacrylate, polyethylene terephthalate, polyethylene naphthalate, polycarbonate, polyarylate, polyetherimide, polyethersulfone, or polyimide. A combination comprising at least one of the foregoing can be used.

The first electrode 12 may comprise a transparent conductive material, for example, an inorganic conductive material including indium tin oxide ("ITO") or fluorine-doped tin oxide ("FTO"), or an organic conductive material, such as polyacetylene, or polythiophene. A combination comprising at least one of the foregoing can be used.

The second electrode 22 may comprise a transparent or opaque conductive material, for example, indium tin oxide ("ITO"), fluorine-doped tin oxide ("FTO"), a metal such as Al, antimony-doped tin oxide ("ATO"). A combination comprising at least one of the foregoing can be used.

On the first electrode 12, an electrochromic layer 14 including the electrochromic compound is provided. A buffer layer 13 may be optionally disposed between the first electrode 12 and the electrochromic layer 14 to improve adherence of the electrochromic layer 14. The buffer layer 13 may comprise titanium oxide (e.g., $TiO_2$), or the like, and may be omitted as desired.

A reflector (not shown) may be positioned under the second electrode 22.

The first substrate 10 and the second substrate 20 are fixed by a spacer 15, and an electrolyte 30 is disposed between the first substrate 10 and the second substrate 20. The electrolyte 30 comprises an oxidation/reduction material which can oxidize or reduce the electrochromic material, and may be a liquid electrolyte or a solid polymer electrolyte. The liquid electrolyte may comprise a solution wherein a lithium salt, such as LiOH or $LiClO_4$, a potassium salt, such as KOH, or a sodium salt, such as NaOH, is dissolved in a solvent, but is not limited thereto. The solid electrolyte may comprise poly(2-acrylamino-2-methylpropane sulfonic acid) or polyethylene oxide, but is not limited thereto.

When a voltage is applied between the first electrode 12 and the second electrode 22, the electrochromic layer 14, which comprises the electrochromic compound, may change from bleached (e.g., substantially or entirely colorless state) to a colored state. Also when the voltage is not applied between the first electrode 12 and the second electrode 22, or when a reverse voltage is applied, the electrochromic layer 14 may change from the colored state to the bleached state. The electrochromic layer 14 may change from a bleached state to a colored state upon application of a voltage of greater than or equal to about 0.5 V, specifically greater than or equal to about 1 V, more specifically greater than or equal to about 1.2 V. In an embodiment, the electrochromic layer 14 may change from a bleached state to a colored state upon application of a voltage of about 0.5 to about 6 V, specifically about 0.8 to about 4 V, more specifically about 1 to about 2 V. Also, the electrochromic layer 14 in the colored state may return to the bleached state by application of a voltage of less than about 0.5 V, specifically less than about 0 V, more specifically less than about −0.5 V. In an embodiment, the electrochromic layer 14 in the colored state may return to the bleached state by application of a voltage of about 0.5 to about −6 V, specifically about 0 to about −4 V, more specifically about −0.5 to about −2 V.

In the colored state, the electrochromic layer 14 has an average reflectance between 400 and 700 nanometers (nm) of less than about 10%, specifically less than about 8%, more specifically less than about 6%. In the colored state, the electrochromic layer 14 has an average reflectance between 400 and 700 nanometers (nm) of about 0.1 to about 10%, specifically about 0.2 to about 8%, more specifically about 0.4 to about 6%.

In another embodiment, in the colored state the electrochromic layer 14 has an average reflectance between 500 and 700 nanometers (nm) of less than about 5%, specifically less than about 2.5%, more specifically less than about 1%. In the colored state, the electrochromic layer 14 has an average reflectance between 500 and 700 nanometers (nm) of about 0.01 to about 5%, specifically about 0.02 to about 2.5%, more specifically about 0.04 to about 1%.

In another embodiment, in the colored state the electrochromic layer 14 has an average reflectance between 425 and 475 nanometers (nm) of less than about 5%, specifically less than about 2.5%, more specifically less than about 1%. In the colored state, the electrochromic layer 14 has an average reflectance between 425 and 475 nanometers (nm) of about 0.01 to about 5%, specifically about 0.02 to about 2.5%, more specifically about 0.04 to about 1%.

Also, when a voltage of greater than about 0.5 V, specifically about 0.8 V, more specifically about 1 V is applied between the first and second electrodes, the electrochromic layer 14 has a wavelength of maximum reflectance at about 400 to about 500 nm, specifically 425 to about 475 nm, more specifically about 450 nm.

The following examples illustrate this disclosure in more detail. However, this disclosure shall not be limited by these examples.

Synthesis Example 1

Synthesis of a Precursor Compound 1

Reaction Scheme A

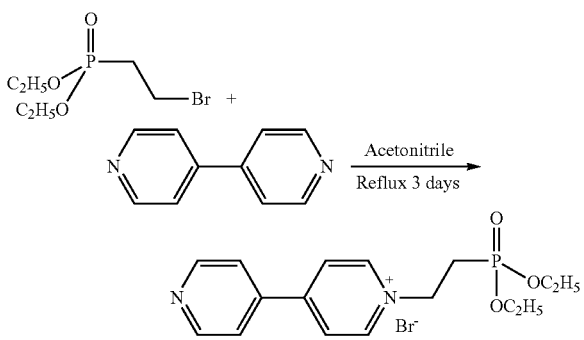

A 1 millimole (mmol) (0.245 grams, g) quantity of diethyl 2-bromoethylphosphonate is added to 1 mmol (0.156 g) of 4,4'-dipyridyl dissolved in 30 milliliters (mL) of toluene. The mixture is refluxed, until a yellow precipitate is produced. The reaction mixture is cooled and filtered, to provide the precipitate. The precipitate is cleaned with hexane and then with acetone, and dried in a vacuum oven, to provide a precursor compound 1.

Synthesis Example 2

Synthesis of a Precursor Compound 2

Reaction Scheme B

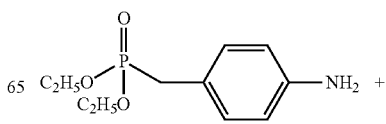

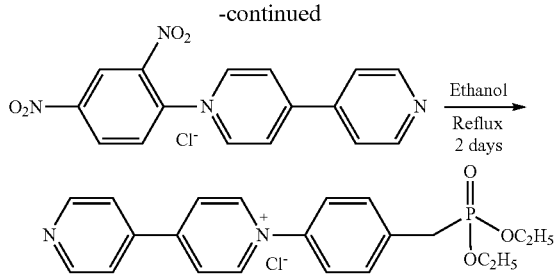

A 1 mmol (0.215 g) quantity of diethyl 2-amino benzylphosphonate and 1 mmol (0.358 g) of 4-(2,4-dinitrophenyl)-4,4'-dipyridyl are refluxed in 200 mL of ethanol for two days. The solvent is evaporated and a yellow solid is dissolved in a minimum quantity of methanol. Next, acetone is added thereto, until a precipitate is produced. The precipitate is filtered, cleaned with acetone, and dried at 70° C. in an oven, to provide a precursor compound 2.

Synthesis Example 3

Synthesis of a Precursor Compound 3

Reaction Scheme C

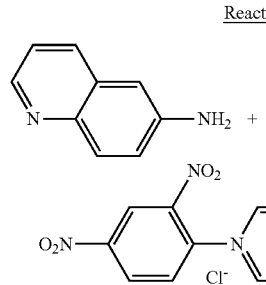

A 1 mmol (0.144 g) quantity of 6-amino quinoline and 1 mmol (0.358 g) of N-(2,4-dinitrophenyl)-4,4'-dipyridyl are refluxed in 200 mL of ethanol for 2 days. The solvent is evaporated and a yellow solid is dissolved in a minimum quantity of methanol. Then, acetone is added thereto until a precipitate is produced. The precipitate is filtered, cleaned with acetone, and dried at 70° C. in an oven, to provide a precursor compound 3.

Synthesis Example 4

Synthesis of a Precursor Compound 4

Reaction Scheme D

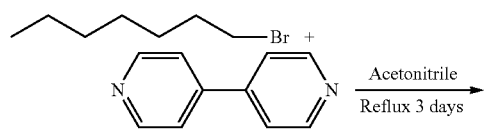

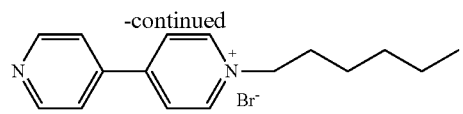

A 1 mmol (0.178 g) quantity of 1-bromoheptane and 1 mmol (0.156 g) of 4,4'-dipyridyl are refluxed in 30 mL of acetonitrile for 3 days. The precipitate is filtered, cleaned with acetone, and dried in a vacuum oven, to provide a precursor compound 4.

Synthesis Example 5

Synthesis of a Precursor Compound 5

Reaction Scheme E

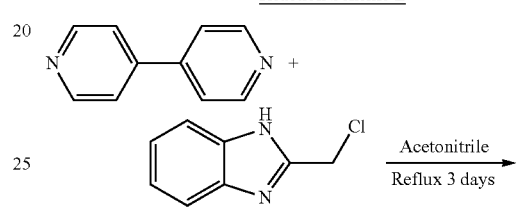

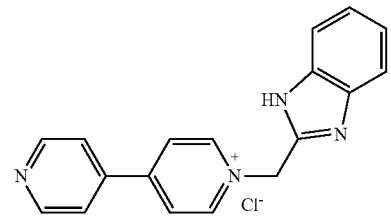

A 1 mmol (0.178 g) quantity of 2-chloromethyl benzimidazole and 1 mmol (0.156 g) of 4,4'-dipyridyl are refluxed in 30 mL of acetonitrile for 3 days. The precipitate is filtered, cleaned with acetone, and dried in a vacuum oven, to provide a precursor compound 5.

Synthesis Example 6

Synthesis of a Precursor Compound 6

Reaction Scheme F

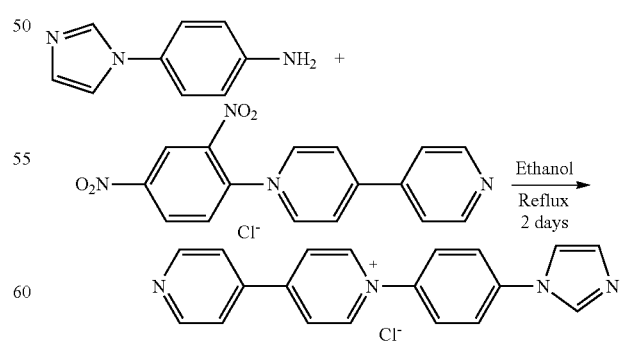

A 1 mmol (0.215 g) quantity of 1-(4-amino phenyl)imidazole and 1 mmol (0.358 g) 4-(2,4-dinitrophenyl)-4,4'-dipyridyl are refluxed in 200 mL of ethanol for 2 days. The solvent is evaporated and a yellow solid is dissolved in a minimum quantity of methanol. Next, acetone is added thereto, until a precipitate is produced. The precipitate is filtered, cleaned with acetone, and dried at 70° C. in an oven, to provide a precursor compound 6.

Synthesis Example 7

Synthesis of a Precursor Compound 7

Reaction Scheme F

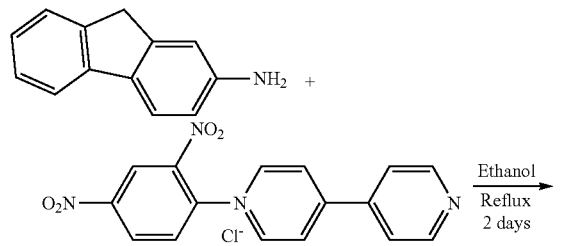

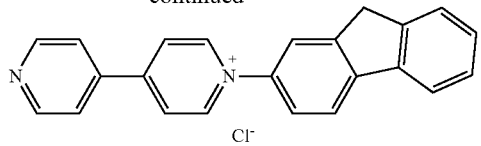

A 1 mmol (0.215 g) quantity of 2-aminofluorene and 1 mmol (0.358 g) of 4-(2,4-dinitrophenyl)-4,4'-dipyridyl are refluxed in 200 mL of ethanol for 2 days. The solvent is evaporated and a yellow solid is dissolved in a minimum quantity of methanol. Then, acetone is added thereto until a precipitate is produced. The precipitate is filtered, cleaned with acetone, and dried at 70° C. in an oven, to provide a precursor compound 7.

Example 1

Synthesis of Chemical Formula 1A Compound

Chemical Formula 1A

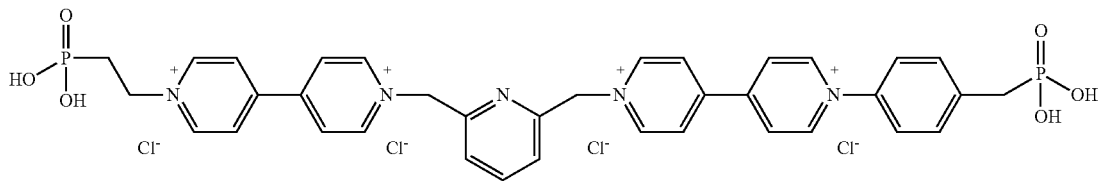

Reaction Scheme 1A

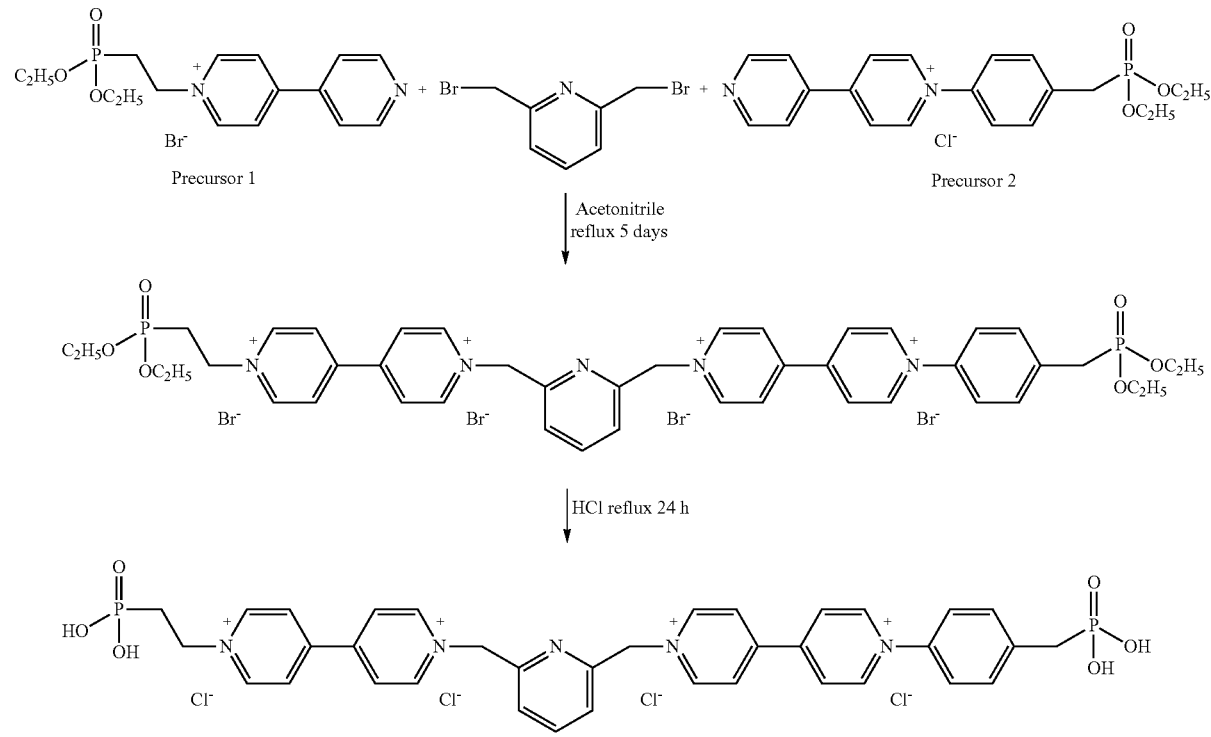

A 1 mmol quantity of precursor compound 1 is dissolved in 30 mL of acetonitrile, and 1 mmol of 2,6-dibromomethyl pyridine and 1 mmol of precursor compound 2 are added thereto. The resulting mixture is refluxed for about 5 days. The solvent is evaporated under reduced pressure, to provide a brown solid. The resulting material is treated with hot acetonitrile and then filtered. This solid is refluxed in 40 mL of 35% hydrochloric acid for about one day. The reaction mixture is evaporated and then treated with acetone. The brown residue is filtered and dissolved in MeOH. Next, acetone is added to the solution for reprecipitation, to provide the compound represented by Chemical Formula 1A.

Example 2

Synthesis of Chemical Formula 1B Compound

Figure 2:
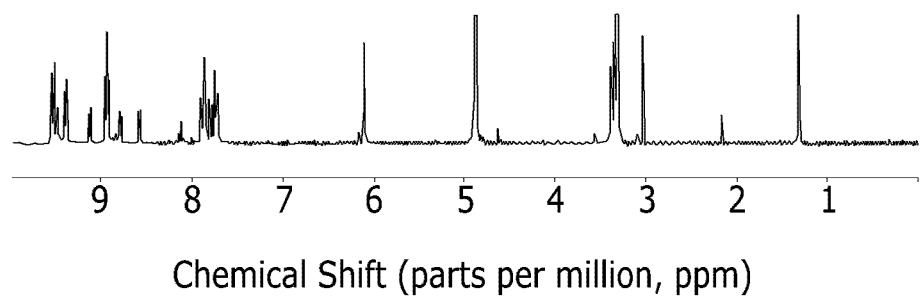
FIGS. 2 to 8 are $^1$H NMR spectra of electrochromic compounds according to Examples 2, 3, 4, 6, 8, 9, and 10, respectively.

About two mmol of a precursor compound 2 is refluxed with 1 mmol of 2,6-dibromomethyl pyridine in 30 mL of acetonitrile for about 7 days to separate a brown residue. The residue is filtered and then washed with acetone. The brown residue is refluxed in 40 mL of 35% hydrochloric acid for one day. The reaction mixture is evaporated and then treated with acetone. Then, it is filtered to separate a brown residue. The brown residue is dissolved in methanol. Next, acetone is added to the solution. The mixture is reprecipitated and then filtered to provide compound represented by Chemical Formula 1B. FIG. 2 shows a $^1$H NMR spectrum of the prepared compound. As shown in FIG. 2, the compound had a structure including a phosphonic acid group connected to dipyridyl moieties.

The chemical shift is measured in $CD_3OD$ solution and is referenced to tetramethylsilane (TMS). $^1$H-NMR ($CD_3OD$/TMS) δ (ppm): 9.36 (4H, d, pyridine proton) 9.31 (1H, d, Chemical Formula 1B

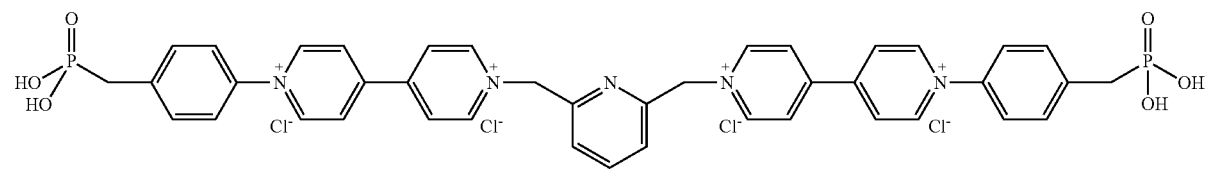

Reaction Scheme 1B

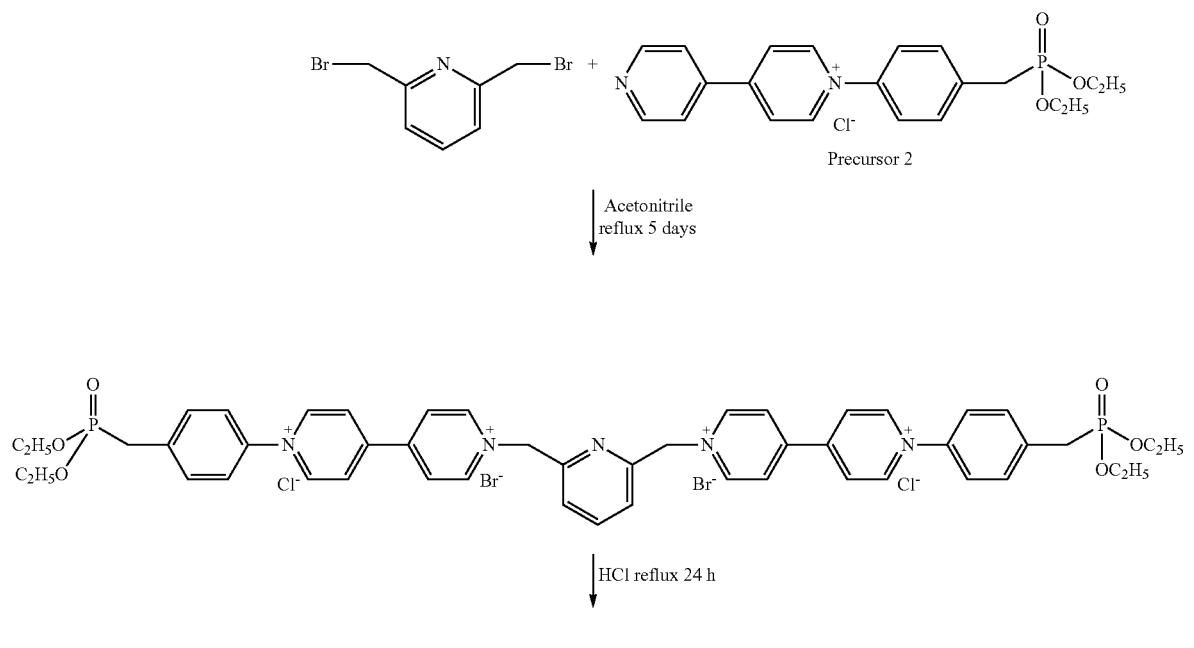

pyridine proton), 9.23 (4H, d, pyridine proton), 8.95 (1H, d, pyridine proton), 8.77 (6H, pyridine proton), 8.61 (1H, d, pyridine proton) 7.94 (1H, t, pyridine proton), 7.70 (4H, d, benzyl aromatic proton), 7.62 (1H, d pyridine proton) 7.56 (4H, d, benzyl aromatic proton), 6.14 (4H, d, methylene proton), 3.37 (1H, s, methylene proton attached to the phosphonic acid group), 3.36 (1H, s, methylene proton attached to the phosphonic acid group).

Example 3

Synthesis of Chemical Formula 1C Compound

Figure 3:
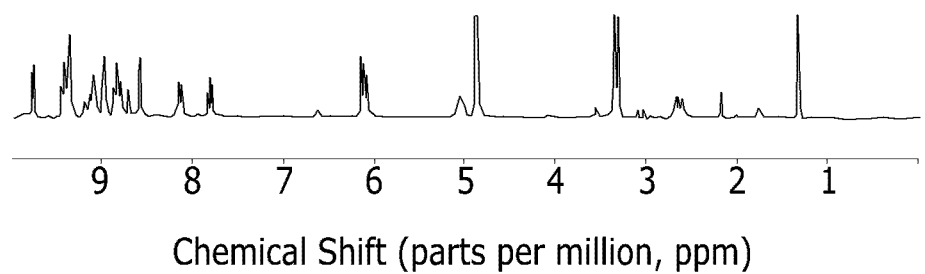

A 1 mmol quantity of precursor compound 1 is dissolved in 30 mL of acetonitrile, and 1 mmol of 2,6-dibromomethyl pyridine and 1 mmol of a precursor compound 3 are added thereto. The mixture is refluxed for 7 days. Then, the solvent is evaporated under reduced pressure, to provide a brown solid. The resulting material is treated with hot acetonitrile and filtered, to provide a brownish yellow solid. The brownish yellow solid is refluxed in 40 mL of 35% hydrochloric acid for one day. The reaction mixture is evaporated and then treated with acetone to provide a brown residue. The brown residue is filtered and dissolved in MeOH. Then, acetone is added to the solution. The mixture is reprecipitated and filtered, to provide compound represented by Chemical Formula 1C. FIG. 3

Chemical Formula 1C

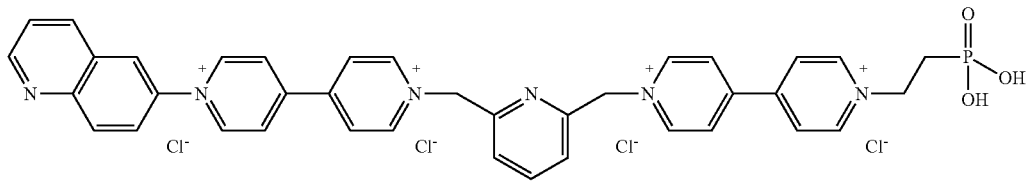

Reaction Scheme 1C

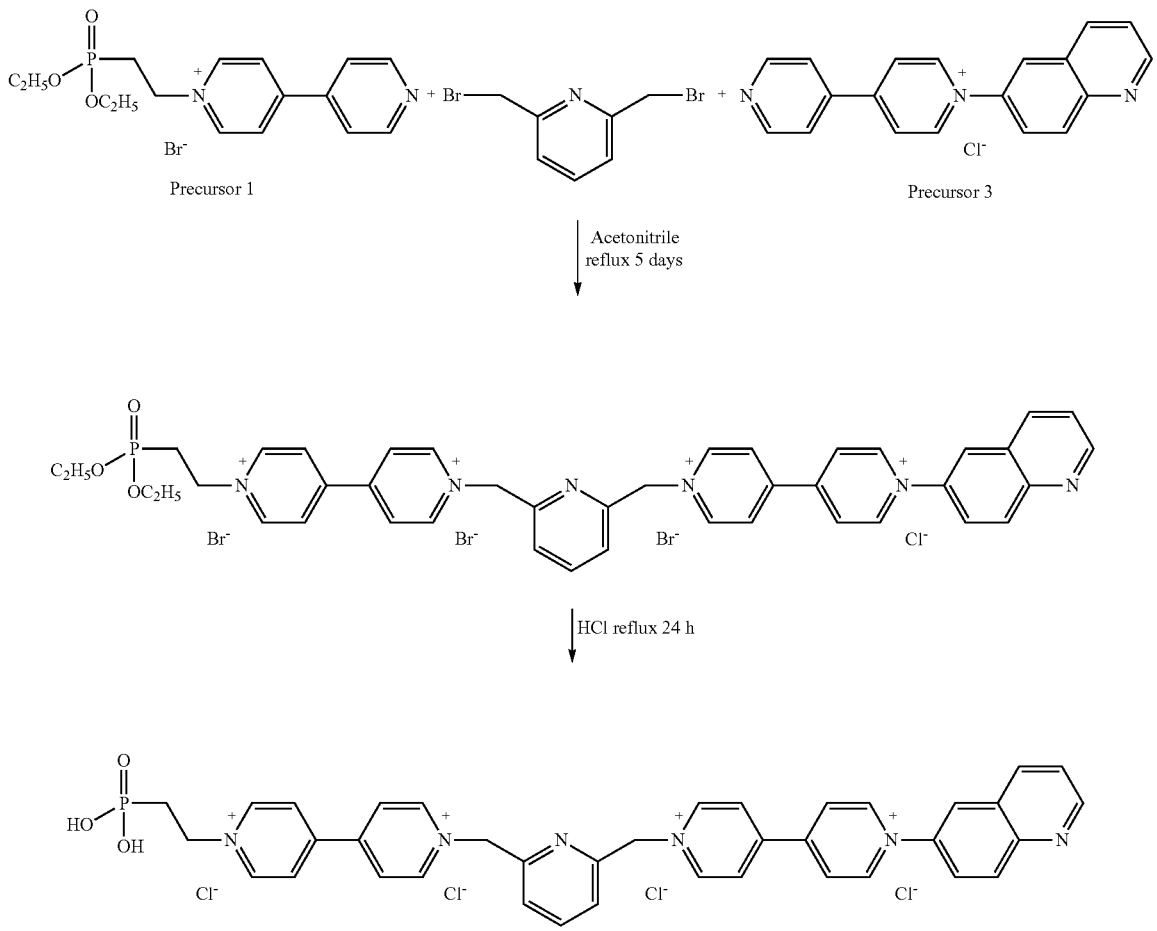

shows an $^1$H NMR spectrum of the compound. As shown in FIG. 3, the compound includes a phosphonic acid group connected to two dipyridyl moieties linked to each other in series.

The chemical shift is measured in CD$_3$OD solution and is referenced to TMS. $^1$H-NMR (CD$_3$OD/TMS) δ (ppm): 9.78 (2H, d, pyridine proton), 9.53-9.27 (7H, m, pyridine and quinoline proton), 9.14-9.03 (4H, m, pyridine and quinoline proton), 9.03-8.91 (2H, d, pyridine proton), 8.88-8.76 (4H, m, pyridine and quinoline proton), 8.7 (1H, t, pyridine proton), 8.64 (1H, d pyridine proton), 8.25 (1H, d, pyridine proton), 8.12 (1H, d, pyridine proton), 7.81 (2H, d), 6.15 (2H, d, methylene proton), 6.11 (2H, d, methylene proton), 5.15-4.96 (2H, m, methylene proton attached to the phosphonic acid group), 2.75-2.56 (2H, m, methylene proton attached to the phosphonic acid group).

Example 4

Synthesis of Chemical Formula 1D Compound

Figure 4:
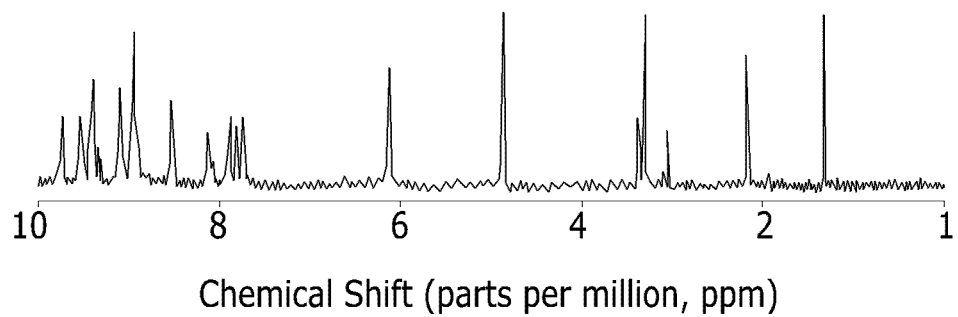

Compound 1D is prepared according to the same method as Example 3, except for using a precursor compound 2 instead of a precursor compound 1. FIG. 4 shows a $^1$H NMR spectrum of the compound. As shown in FIG. 4, the compound includes a phosphonic acid group connected to two dipyridyl moieties linked to each other in series.

The chemical shift is measured in CD$_3$OD solution and is referenced to TMS. $^1$H-NMR (CD$_3$OD/TMS) δ (ppm): 9.74 (1H, d, pyridine proton) 9.53 (2H, d, pyridine proton), 9.40 (6H, m, pyridine and quinoline proton), 9.29 (1H, t, quinoline proton), 9.05 (1H, d, pyridine proton), 9.04-8.90 (9H, m, pyridine and quinoline proton), 8.85 (1H, s, quinoline proton), 8.48 (1H, d pyridine proton), 8.13 (1H, t, pyridine proton), 7.9 (2H, d, pyridine proton), 7.81 (2H, d, benzyl aromatic proton), 7.74 (2H, d, benzyl aromatic proton), 6.14 (4H, d, methylene proton), 3.37 (1H, s, methylene proton attached to the phosphonic acid group), 3.36 (1H, s, methylene proton attached to the phosphonic acid group).

Chemical Formula 1D

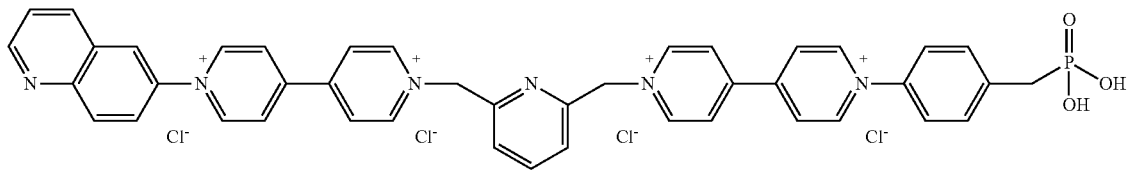

Reaction Scheme 1D

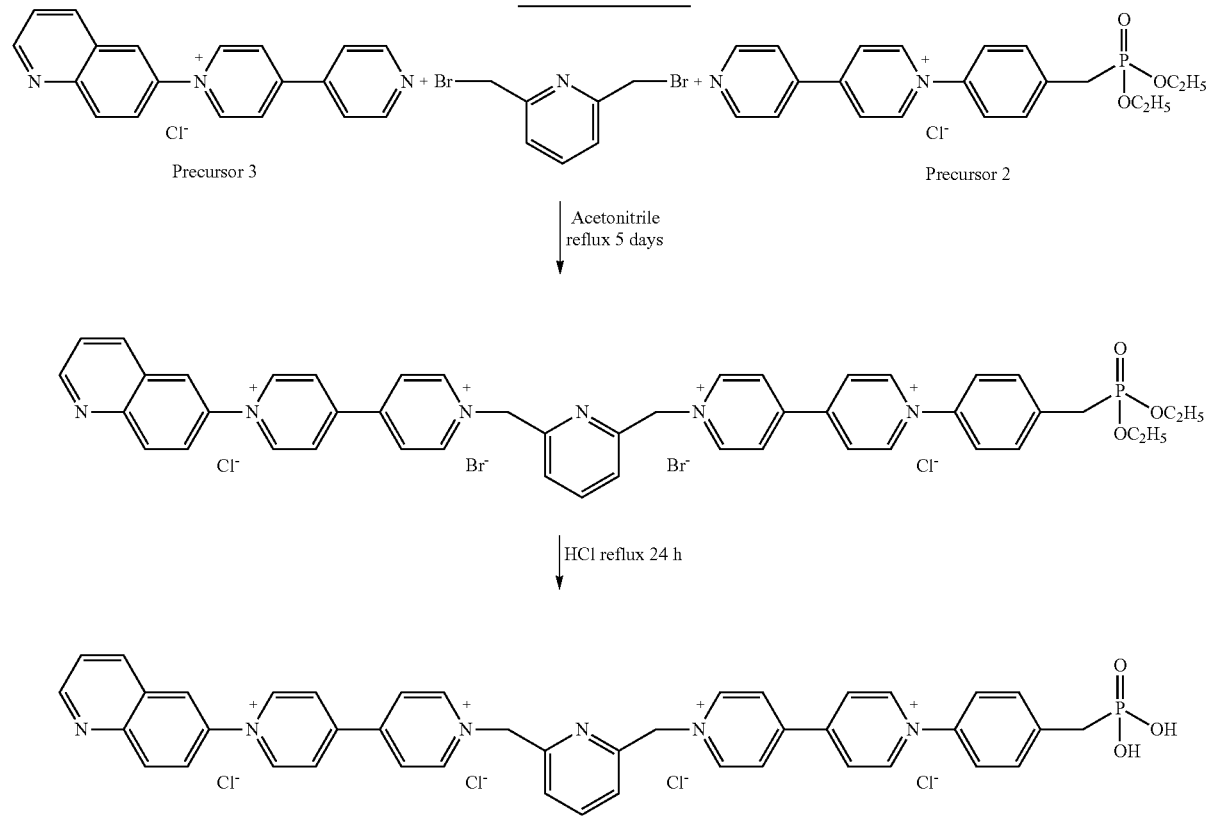

Example 5
Synthesis of Chemical Formula 1 E Compound
Chemical Formula 1E
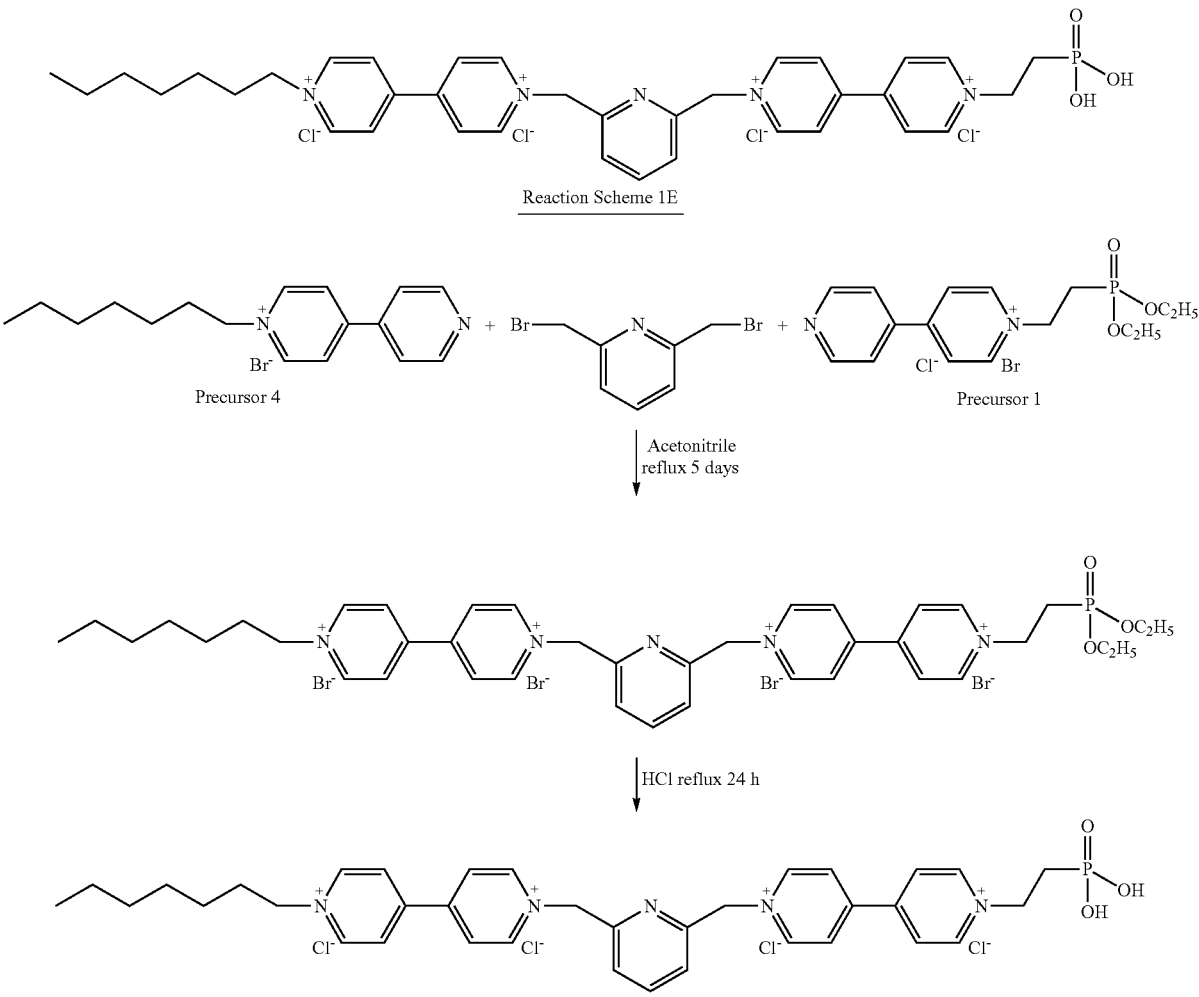
A compound 1 E is prepared according to the same method as Example 3, except for using precursor compound 4 instead of precursor compound 3.
Example 6
Synthesis of Chemical Formula 1F Compound
Chemical Formula 1F
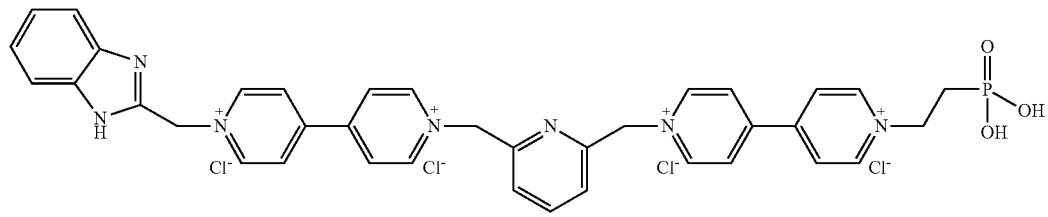

-continued
Reaction Scheme 1F

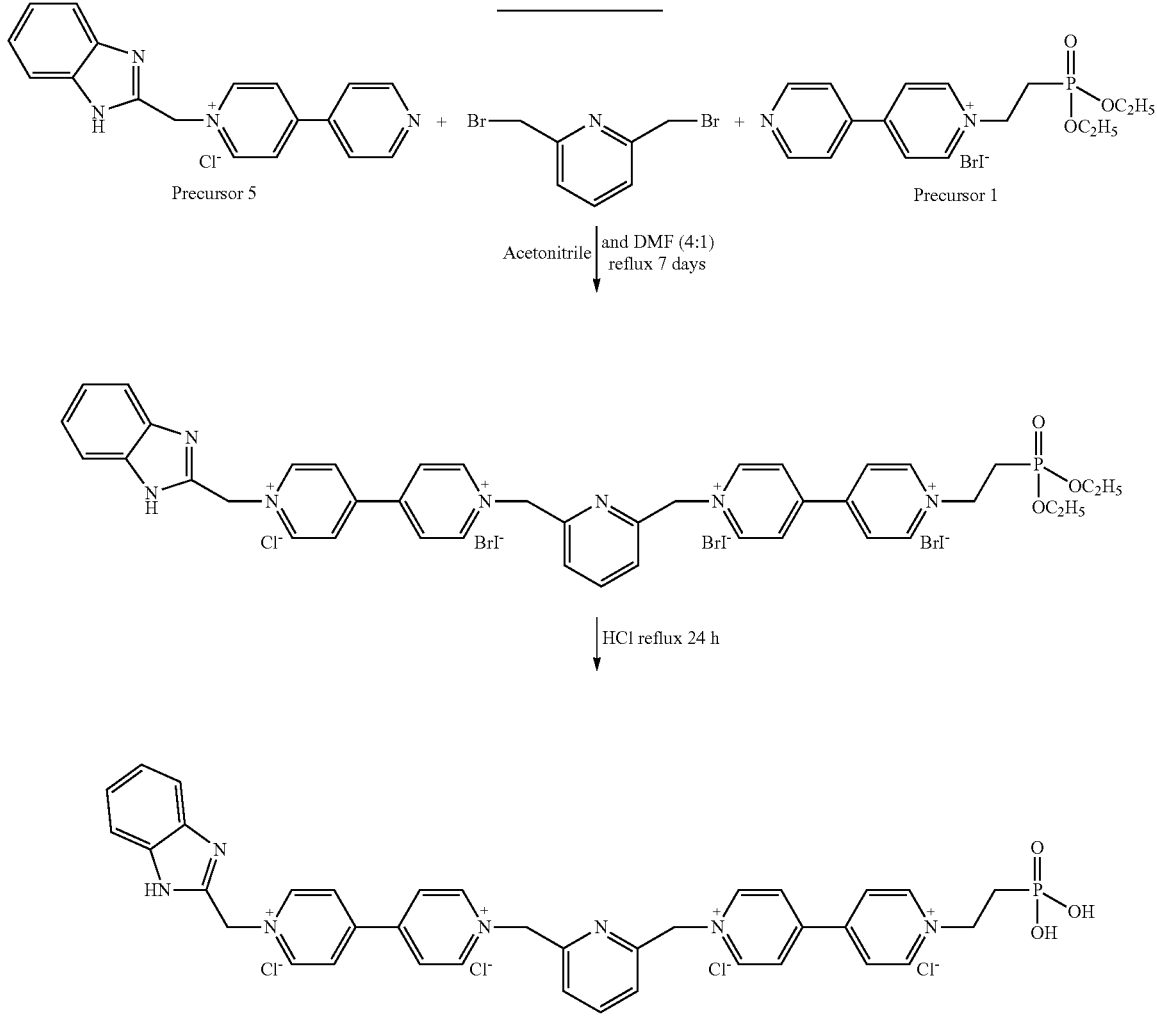

Figure 5:
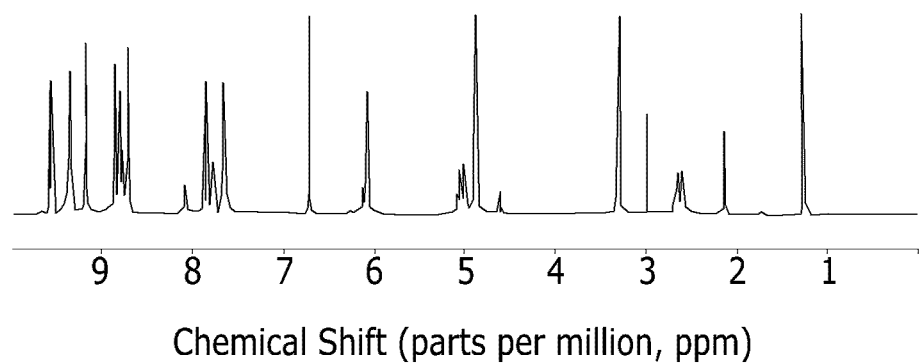

A compound 1F is prepared according to the same method as Example 3, except for using precursor compound 5 instead of precursor compound 3 and using acetonitrile and DMF (4:1) instead of acetonitrile. FIG. 5 shows an $^1$H NMR spectrum of the compound.

The chemical shift is measured in $CD_3OD$ solution and is referenced to TMS. $^1$H-NMR ($CD_3OD$/TMS) δ (ppm): 9.57 (2H, d, pyridine proton) 9.36 (4H, m, pyridine and benzimidazole proton), 9.19 (2H, d, pyridine), 8.88 (2H, d, pyridine proton), 8.81 (2H, t, benzimidazole proton), 8.72 (2H, d, pyridine proton), 8.48 (1H, d pyridine proton), 8.10 (1H, t, pyridine proton), 7.87 (4H, dd, pyridine proton), 7.78 (1H, d, pyridyl proton), 7.66 (4H, dd, pyridine proton), 6.73 (2H, s, methylene proton attached to benzimidazole group) 6.08 (4H, d, methylene proton), 5.19-4.95 (2H, m, methylene proton attached to the phosphonic acid group), 2.75-2.56 (2H, m, methylene proton attached to the phosphonic acid group).

Example 7

Synthesis of Chemical Formula 1G Compound

Chemical Formula 1G

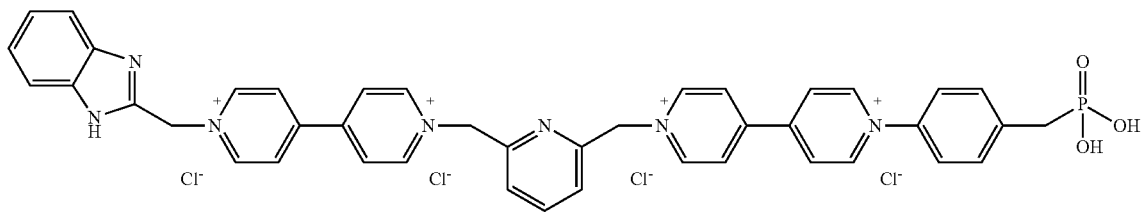

-continued
Reaction Scheme 1G
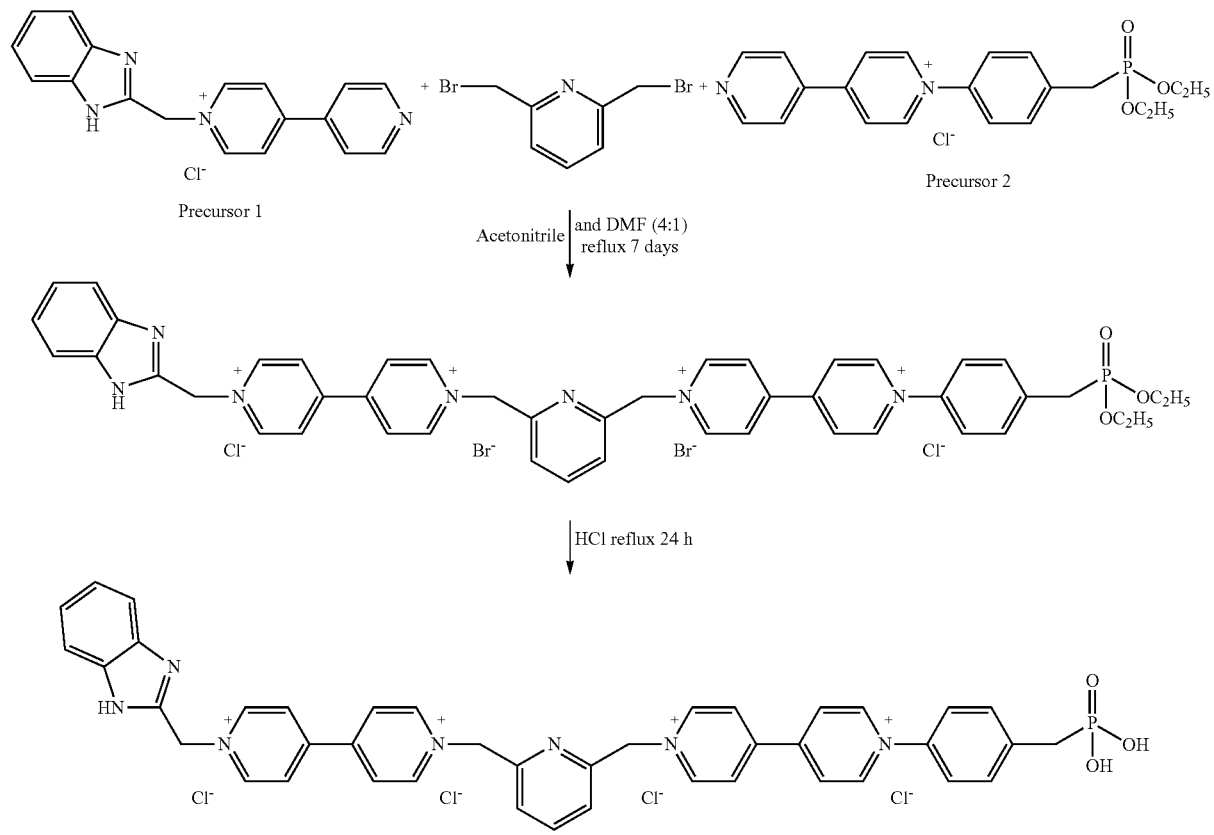
A compound 1G is prepared according to the same method as Example 3, except for using precursor compound 5 instead of precursor compound 3, precursor compound 2 instead of precursor compound 1, and using acetonitrile and DMF (4:1) instead of acetonitrile.
Example 8
Synthesis of Chemical Formula 1H Compound
Chemical Formula 1H
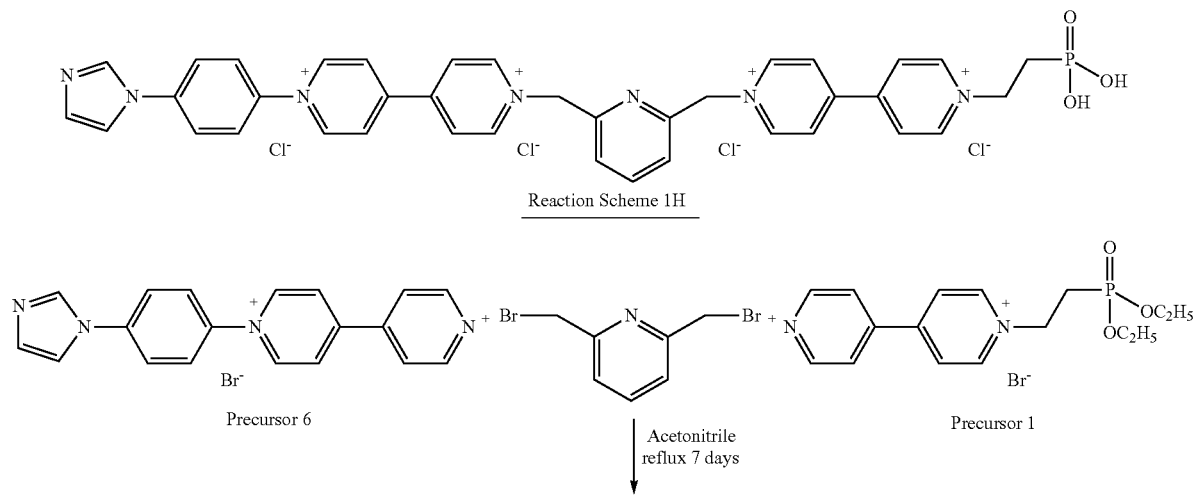
Reaction Scheme 1H

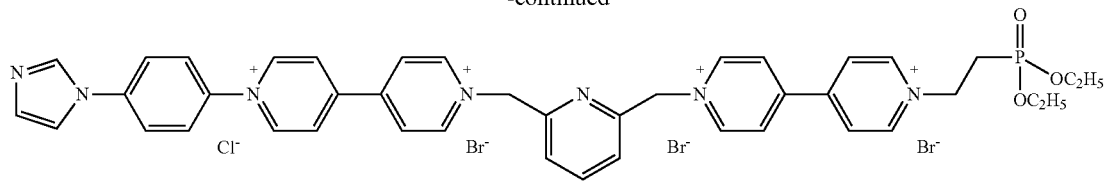

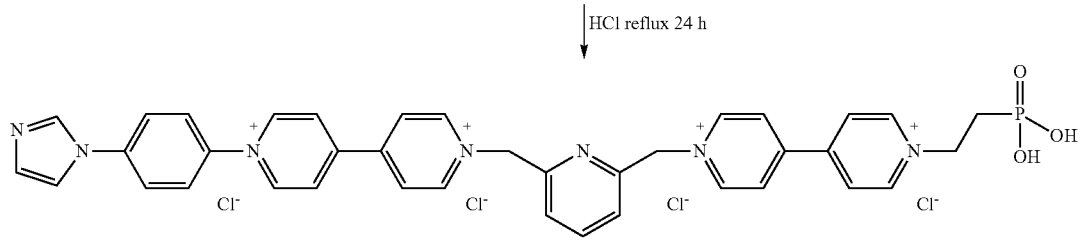

Figure 6:
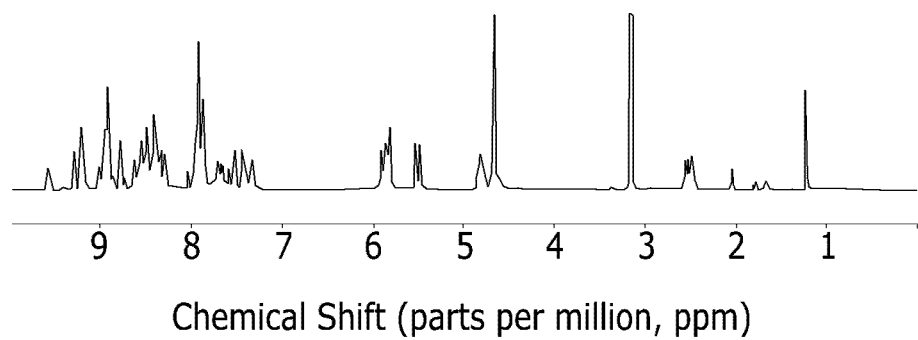

A compound 1H is prepared according to the same method as Example 3, except for using precursor compound 6 instead of precursor compound 3. FIG. 6 shows a $^1$H NMR spectrum of the compound.

The chemical shift is measured in $CD_3OD$ solution and is referenced to TMS. $^1$H-NMR ($CD_3OD$/TMS) δ (ppm): 9.76 (1H, s) 9.64 (2H, d, pyridine proton), 9.23 (2H, d, pyridine proton), 8.93 (2H, d, pyridine proton), 8.80 (2H, d pyridine proton), 5.14-4.96 (2H, m, methylene proton attached to the phosphonic acid group), 2.75-2.54 (2H, m, methylene proton of the phosphonic acid group).

Example 9

Synthesis of Chemical Formula 1 Compound

Chemical Formula 1I

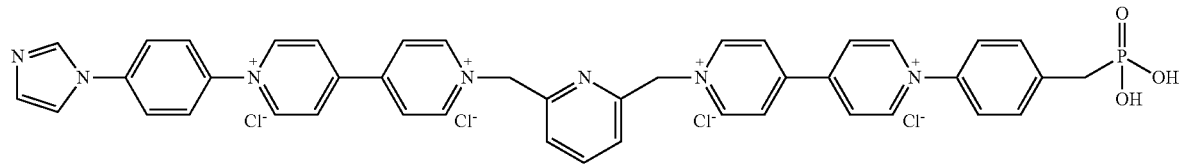

Reaction Scheme 1I

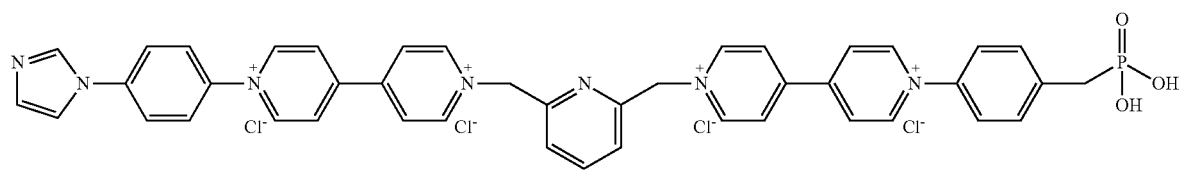

Reaction Scheme 1I

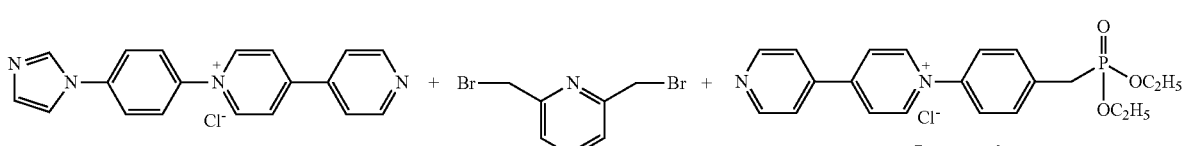

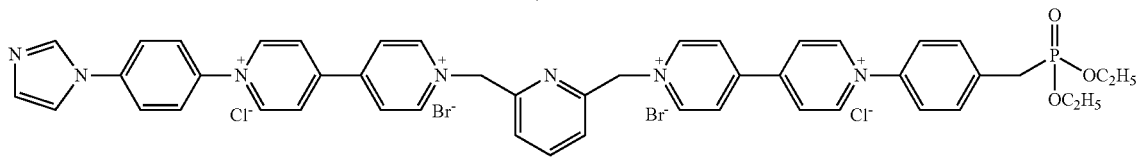

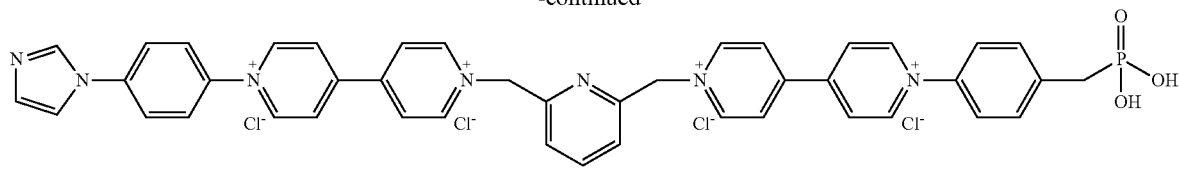

Figure 7:
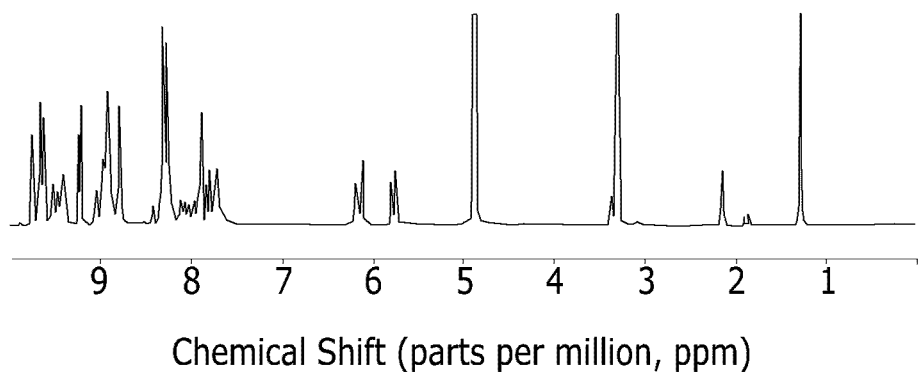

A compound 1I is prepared according to the same method as Example 3, except for using precursor compound 6 instead of precursor compound 3, and precursor compound 2 instead of precursor compound 1. FIG. 7 shows a $^1$H NMR spectrum of the compound.

Example 10

Synthesis of Chemical Formula 1J Compound

Figure 8:
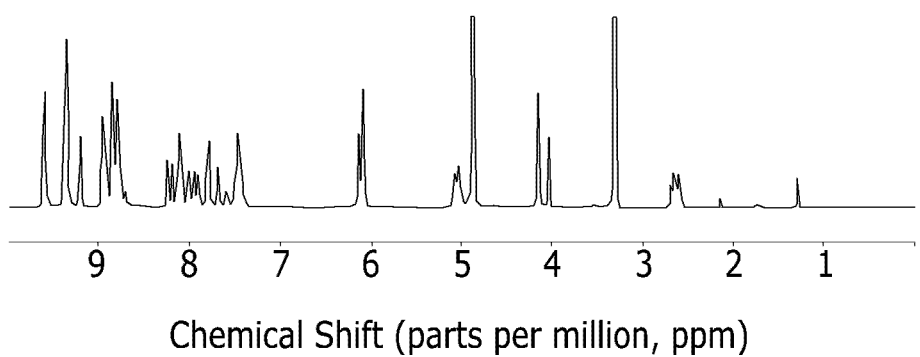

A compound 1J is prepared according to the same method as Example 3, except for using precursor compound 7 instead of precursor compound 3, and using acetonitrile and DMF (4:1) instead of acetonitrile. FIG. 8 shows a $^1$H NMR spectrum of the compound.

The chemical shift is measured in $CD_3OD$ solution and is referenced to TMS. $^1$H-NMR ($CD_3OD$/TMS) δ (ppm): 9.65-9.3 (3H, m, pyridine proton), 9.45-9.31 (7H, m, pyridine proton), 9.2 (1H, d, pyridine proton), 9.02-8.89 (7H, m pyridine proton along with fluorene proton), 5.14-4.96 (2H, m, Chemical Formula 1J

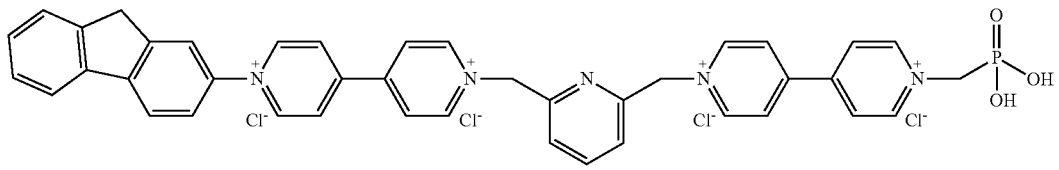

Reaction Scheme 1J

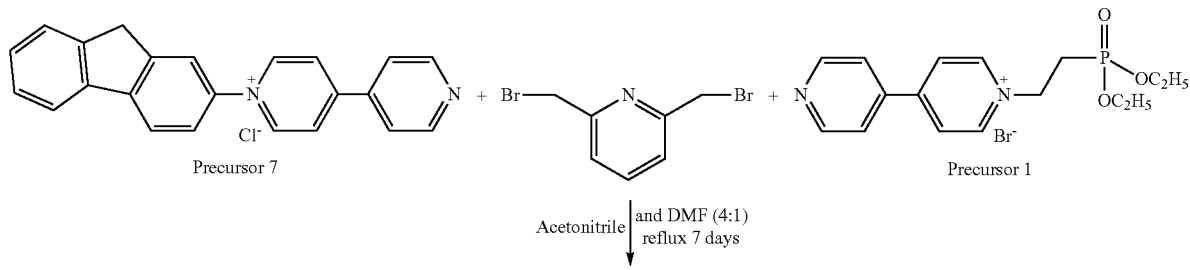

Acetonitrile and DMF (4:1) reflux 7 days

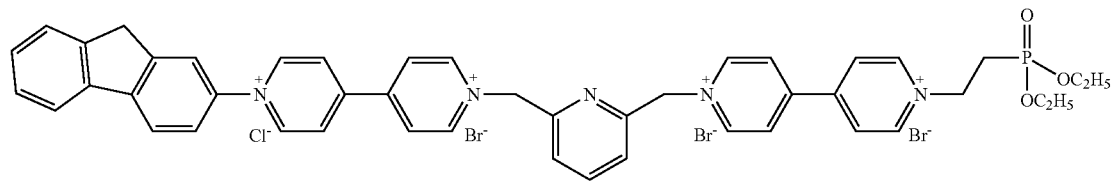

HCl reflux 24 h

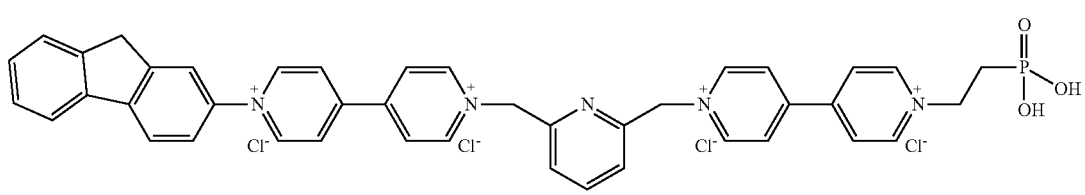

methylene proton of the phosphonic acid group), 4.16 (2H, s, fluorine position-9 protons) 2.75-2.54 (2H, m, methylene proton of the phosphonic acid group).

Fabrication of an Electrochromic Device

Each compound according to Examples 1 to 10 and 0.05 mmol of $LiClO_4$ as an electrolyte are dissolved in butyrolactone, to prepare an electrochromic solution. Next, ITO and ATO electrodes are respectively formed on two sheets of glass substrates, and a titanium oxide ($TiO_2$) is coated thereon. The glass substrates are sealed using a spacer. Then, the electrochromic solution is injected between the glass substrates, to fabricate an electrochromic device according to Examples 11 to 20.

Electrochromic Characteristic

The electrochromic characteristics of the electrochromic devices according to Examples 11 to 20 are determined as a function of voltage. Electrochemical measurements are carried out using a $TiO_2$ coated indium tin oxide ("ITO") electrode as the working electrode and the reference electrode, and $TiO_2$ coated on ATO as the counter electrode. Electrochemical measurements are at room temperature. In the cyclic voltammograms, a scan rate of 0.01 volts per second (V/sec) is used.

Figure 9:
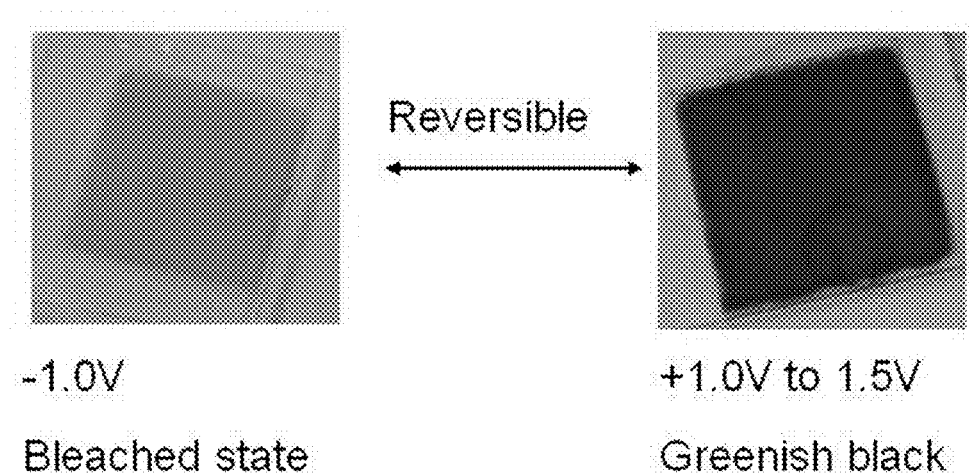
FIG. 9 is a photograph showing electrochromism of the electrochromic device according to Example 11 as a function of an applied voltage.

FIG. 9 shows a chromophore photograph of the electrochromic device according to Example 11 at different applied voltages. As shown in FIG. 9, the electrochromic device of Example 11 emits greenish black at a voltage ranging from 1.0 to 1.5 V and maintains the same chromophore up to 1.5 V, and emits yellow at −1.0 V.

Figure 10:
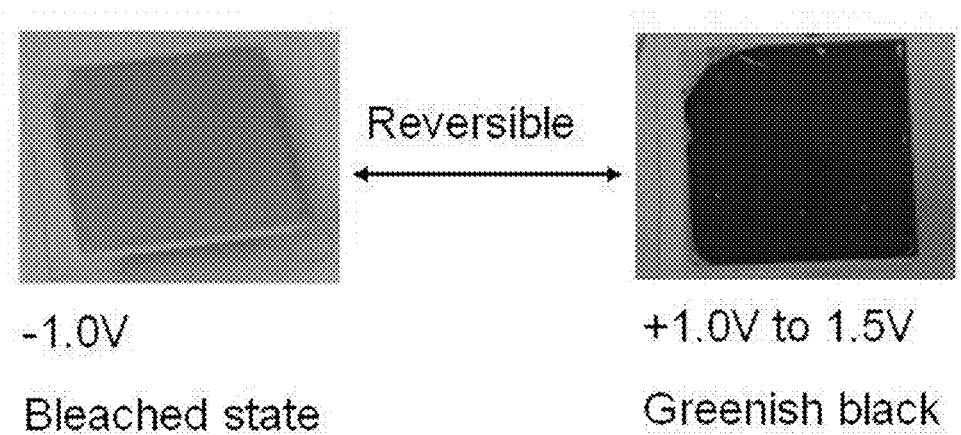
FIG. 10 is a photograph showing electrochromism of the electrochromic device according to Example 12 as a function of an applied voltage.
Figure 11:
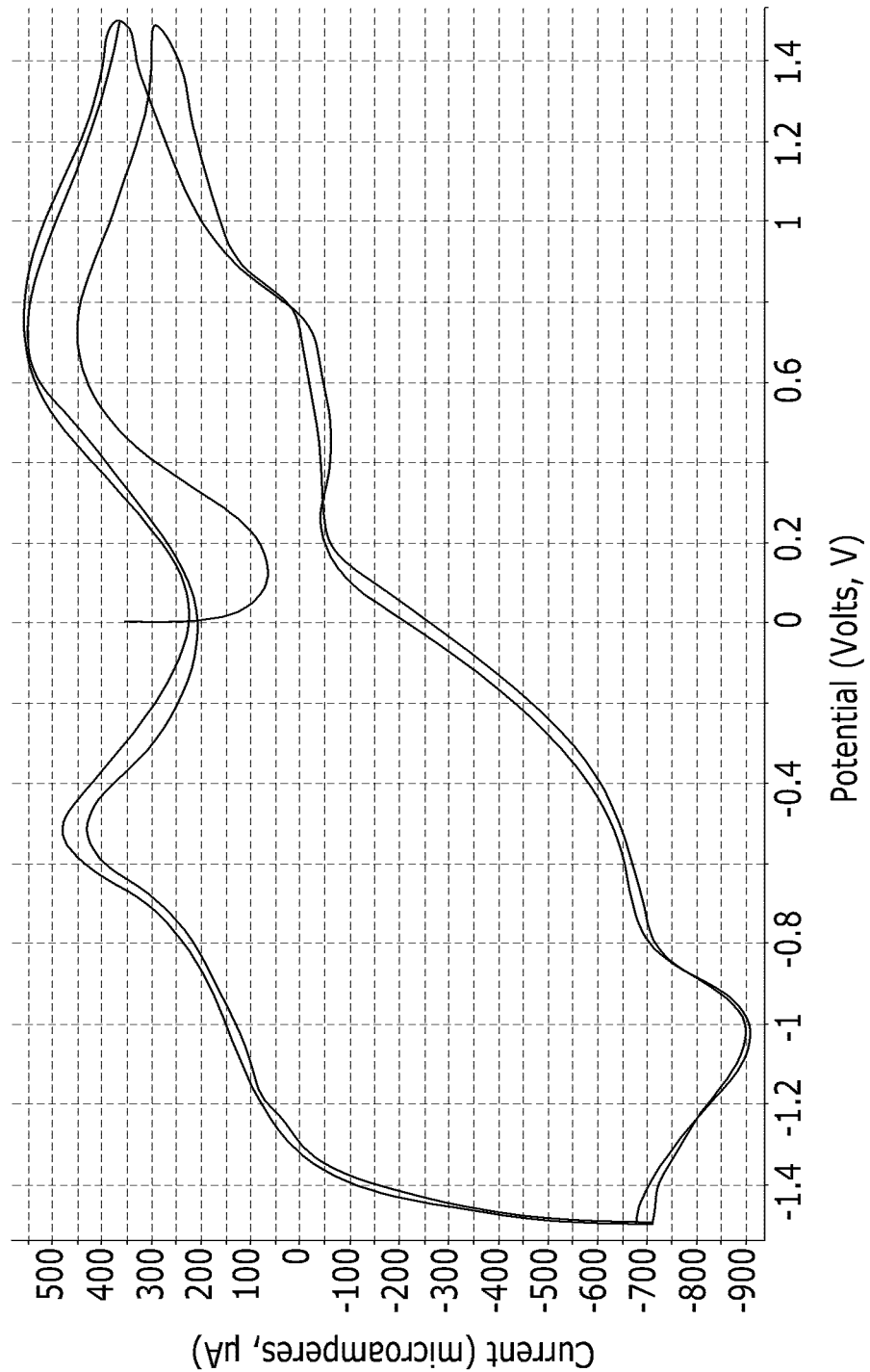
FIGS. 11 and 12 are graphs of current (microamperes) versus potential (volts) showing initial and terminal cyclic voltammograms, respectively, of the electrochromic device according to Example 12 during a reliability test.
Figure 12:
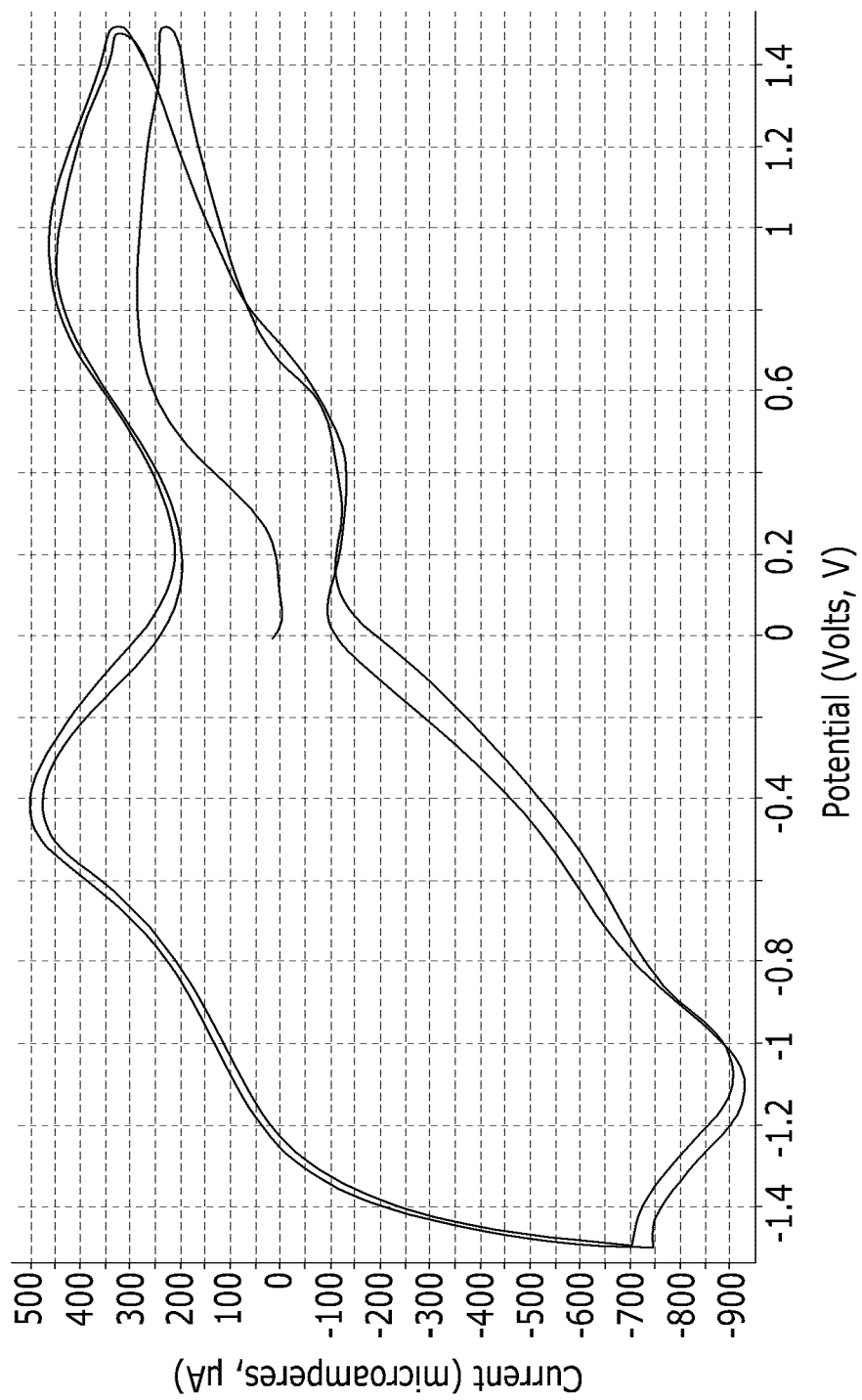

FIG. 10 shows a chromophore photograph of the electrochromic device according to Example 12 depending to the applied voltage. As shown in FIG. 10, the electrochromic device of Example 12 emits greenish black at a voltage ranging from 1.0 to 1.5 V and maintains the same chromophore up to 1.5 V, and emits yellow at −1.0 V In addition, FIG. 11 shows cyclic voltammograms of initial two cycles, and FIG. 12 shows cyclic voltammograms of 999th and 1000th cycles to evaluate reliability of the electrochromic device of Example 12. As shown in FIGS. 11 and 12, the electrochromic device of Example 12 has excellent stability.

Figure 13:
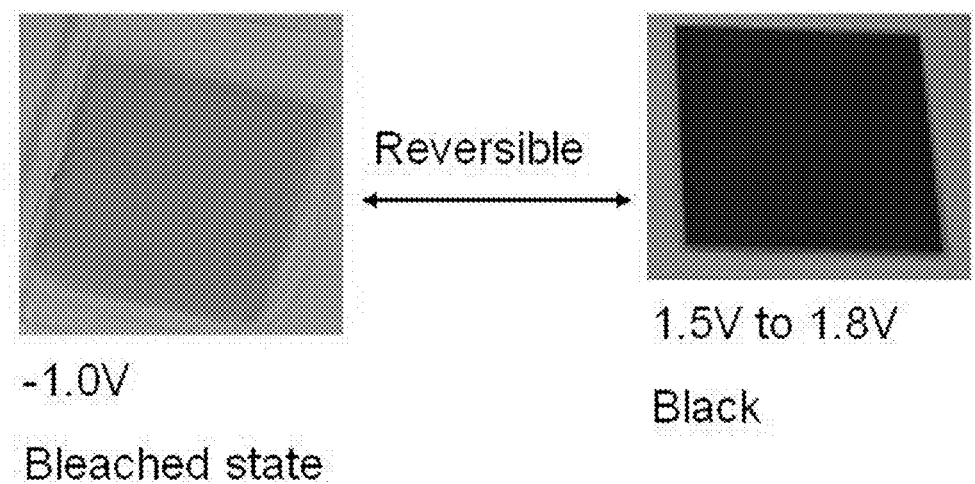
FIG. 13 is a photograph showing electrochromism of the electrochromic device according to Example 13 as a function of an applied voltage.
Figure 14:
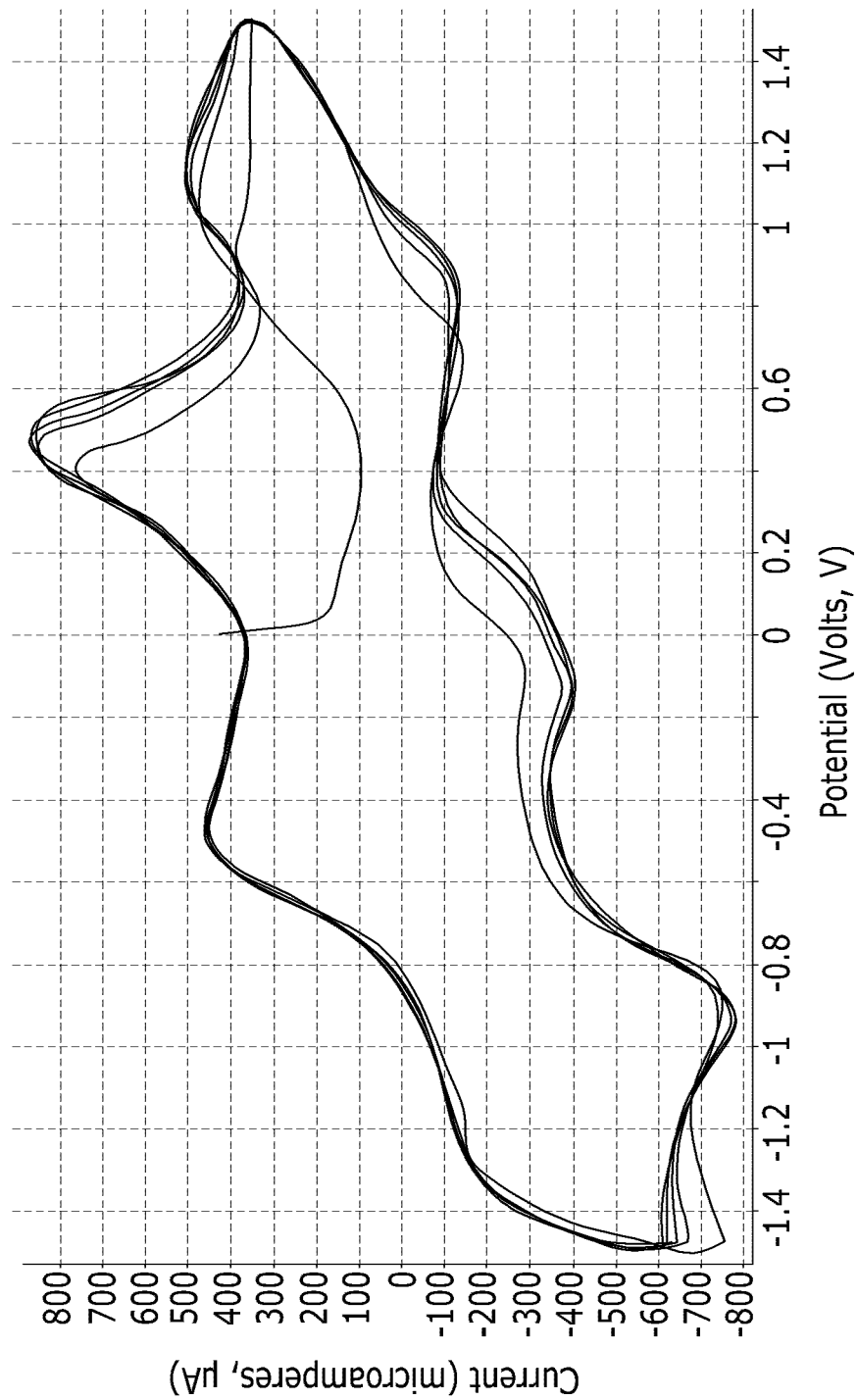
FIGS. 14 and 15 are graphs of current (microamperes) versus potential (volts) showing initial and terminal cyclic voltammograms, respectively, of the electrochromic device according to Example 13 during a reliability test.
Figure 15:
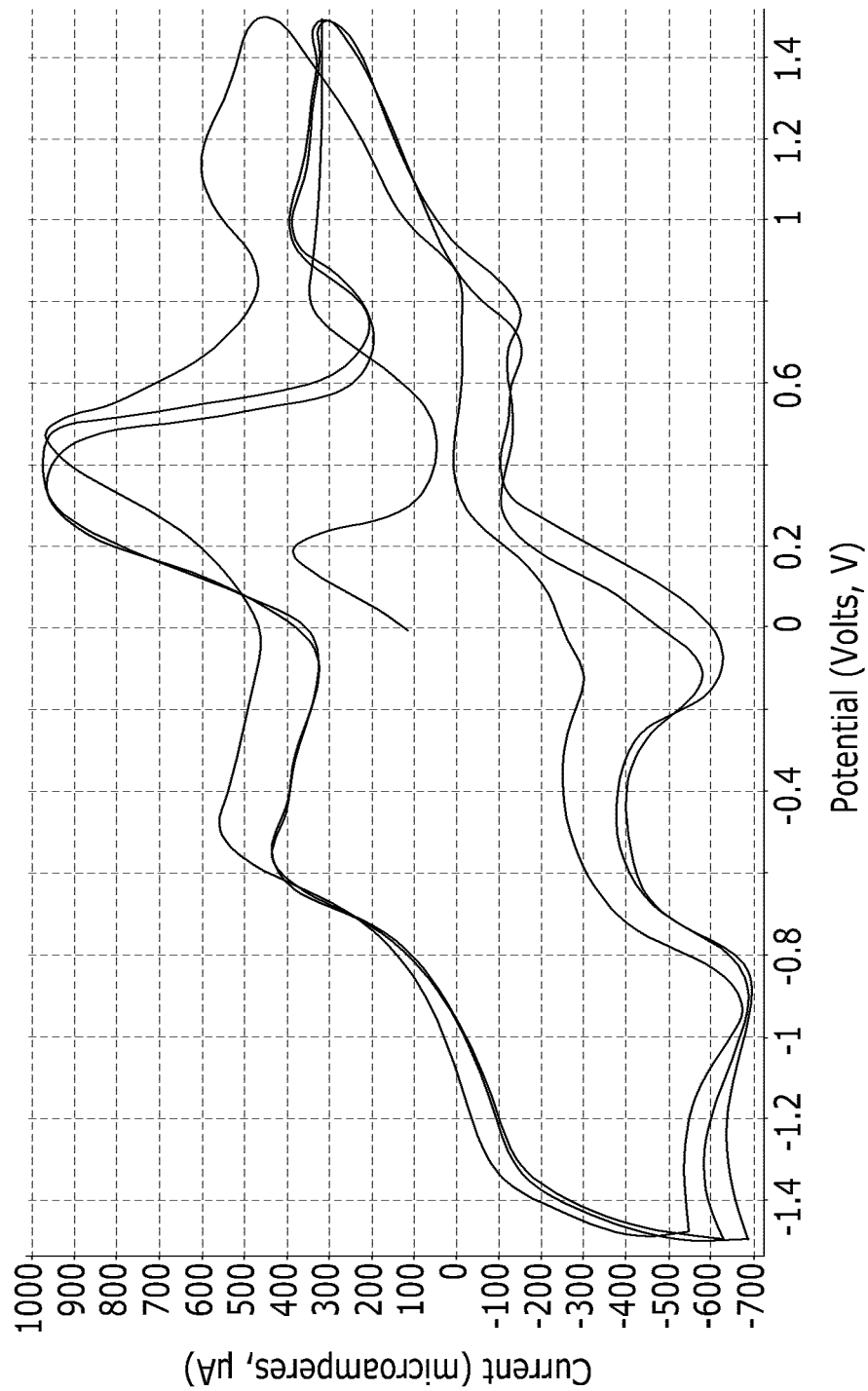

FIG. 13 shows chromophore photographs of the electrochromic device according to Example 13 depending on a voltage applied thereto. As shown in FIG. 13, the electrochromic device of Example 13 emits black at a voltage ranging from 1.5 to 1.8 V and maintains the same chromophore up to 1.8 V, and emits yellow at −1.0V. In addition, FIG. 14 shows initial 10 cyclic voltammograms of the electrochromic device of Example 13, and FIG. 15 shows its 999 and 1000th cyclic voltammograms to evaluate reliability. As shown in FIGS. 14 and 15, the electrochromic device of Example 13 has excellent stability.

Figure 16:
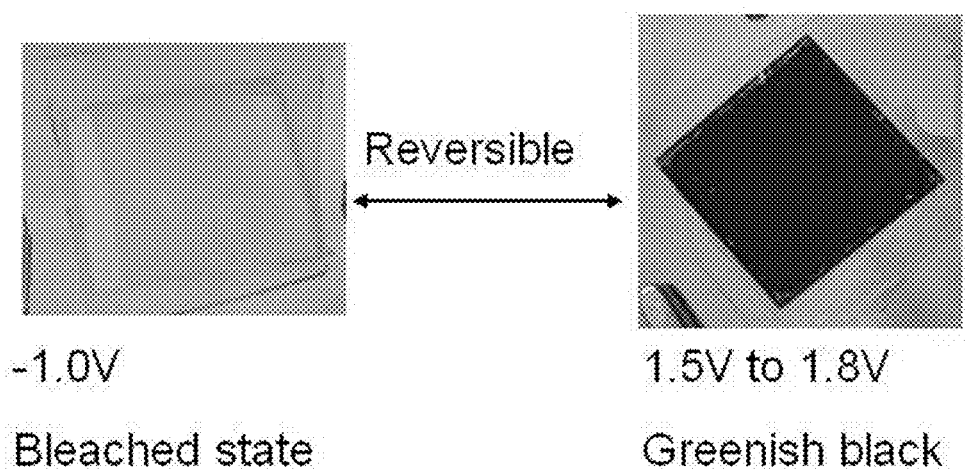
FIG. 16 is a photograph showing electrochromism of the electrochromic device according to Example 14 as a function of an applied voltage.
Figure 17:
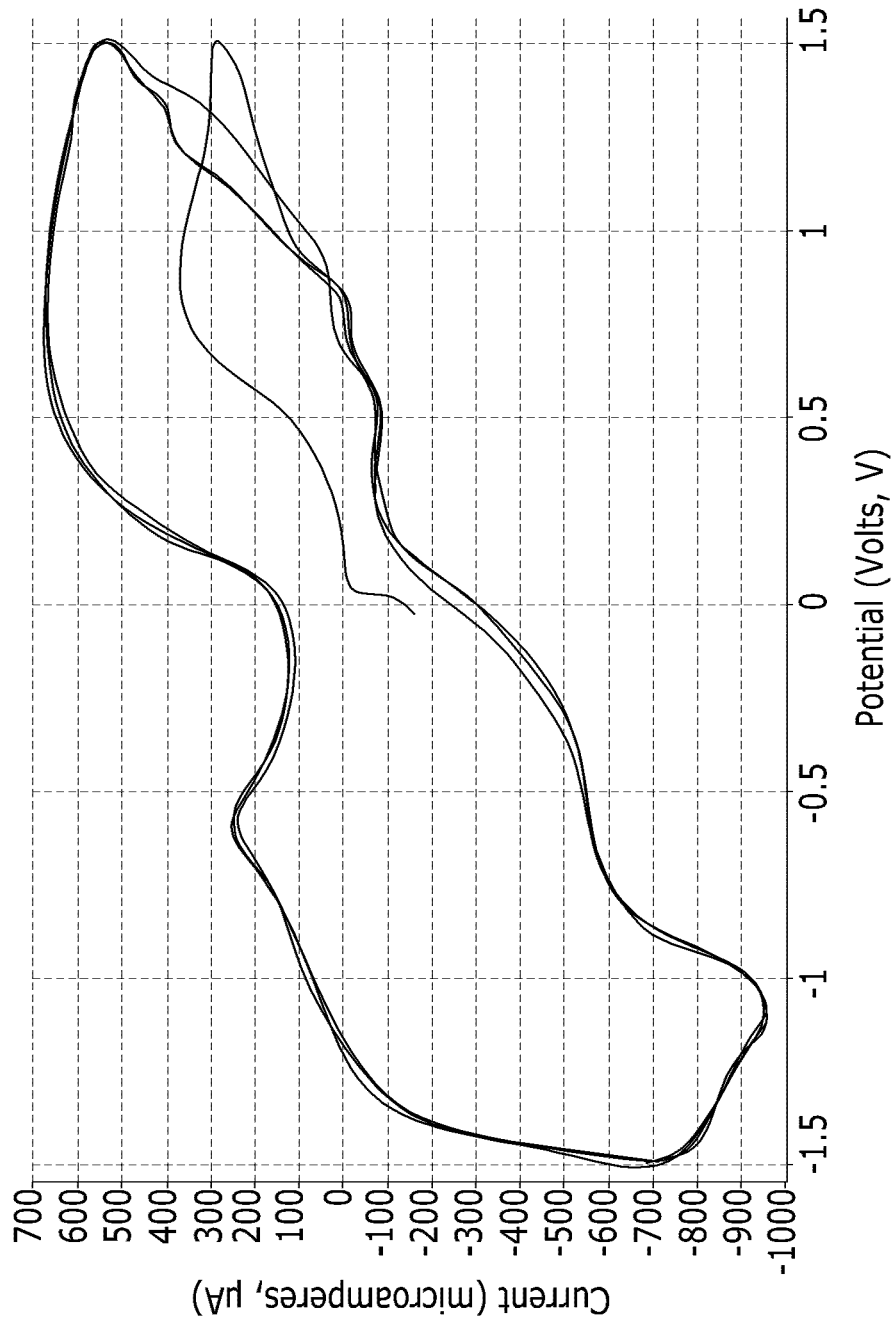
FIGS. 17 and 18 are graphs of current (microamperes) versus potential (volts) showing initial and terminal cyclic voltammograms, respectively, of the electrochromic device according to Example 14 during a reliability test.
Figure 18:
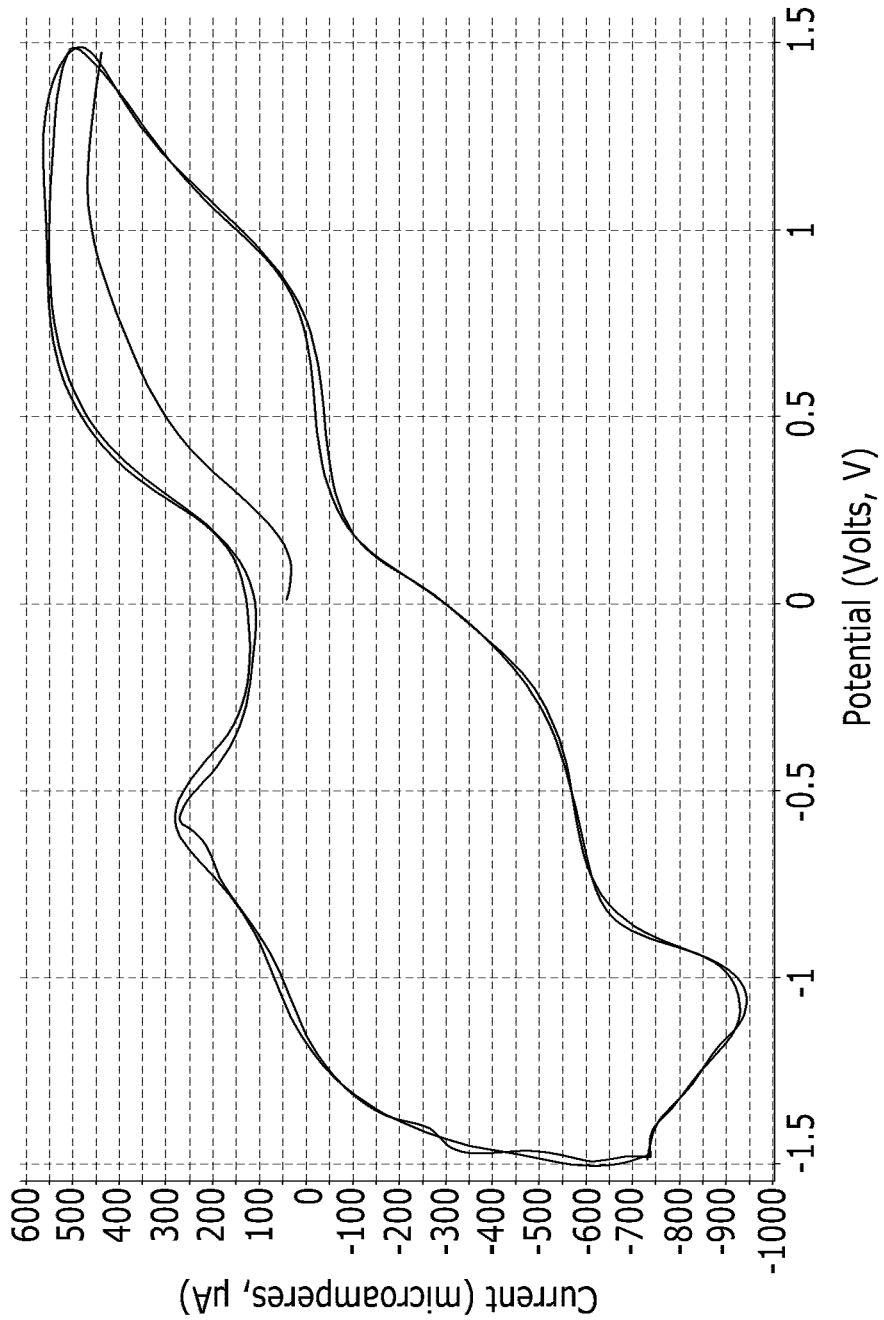

FIG. 16 shows chromophore photographs of the electrochromic device of Example 14 depending on a voltage applied thereto. As shown in FIG. 16, the electrochromic device of Example 14 emits greenish black at a voltage ranging from 1.5 to 1.8 V and maintains the same chromophore up to 1.8 V, and emits yellow at −1.0V. In addition, FIG. 17 shows initial 5 cyclic voltammograms of the electrochromic device of Example 14, and FIG. 18 shows its 995 to 1000th cyclic voltammograms to evaluate reliability. As shown in FIGS. 17 and 18, the electrochromic device of Example 14 has excellent stability.

Figure 19:
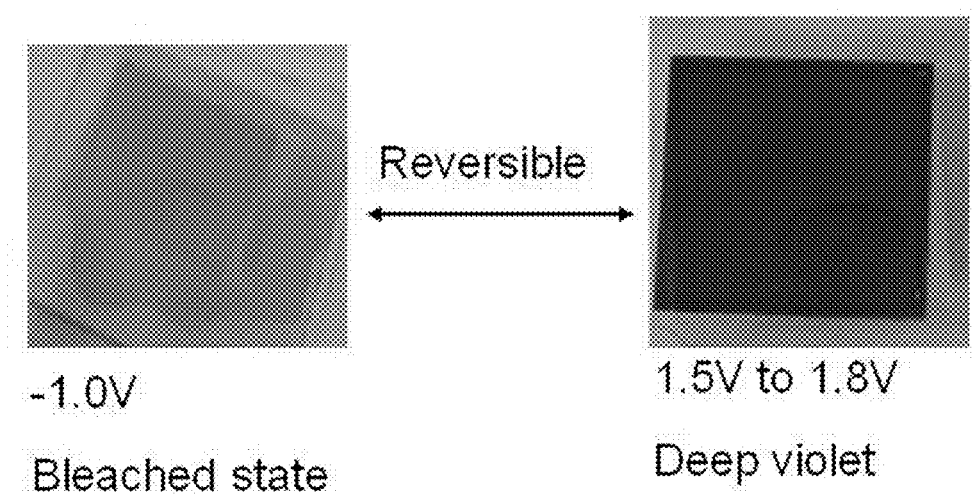
FIG. 19 is a photograph showing electrochromism of the electrochromic device according to Example 15 as a function of an applied voltage.
Figure 20:
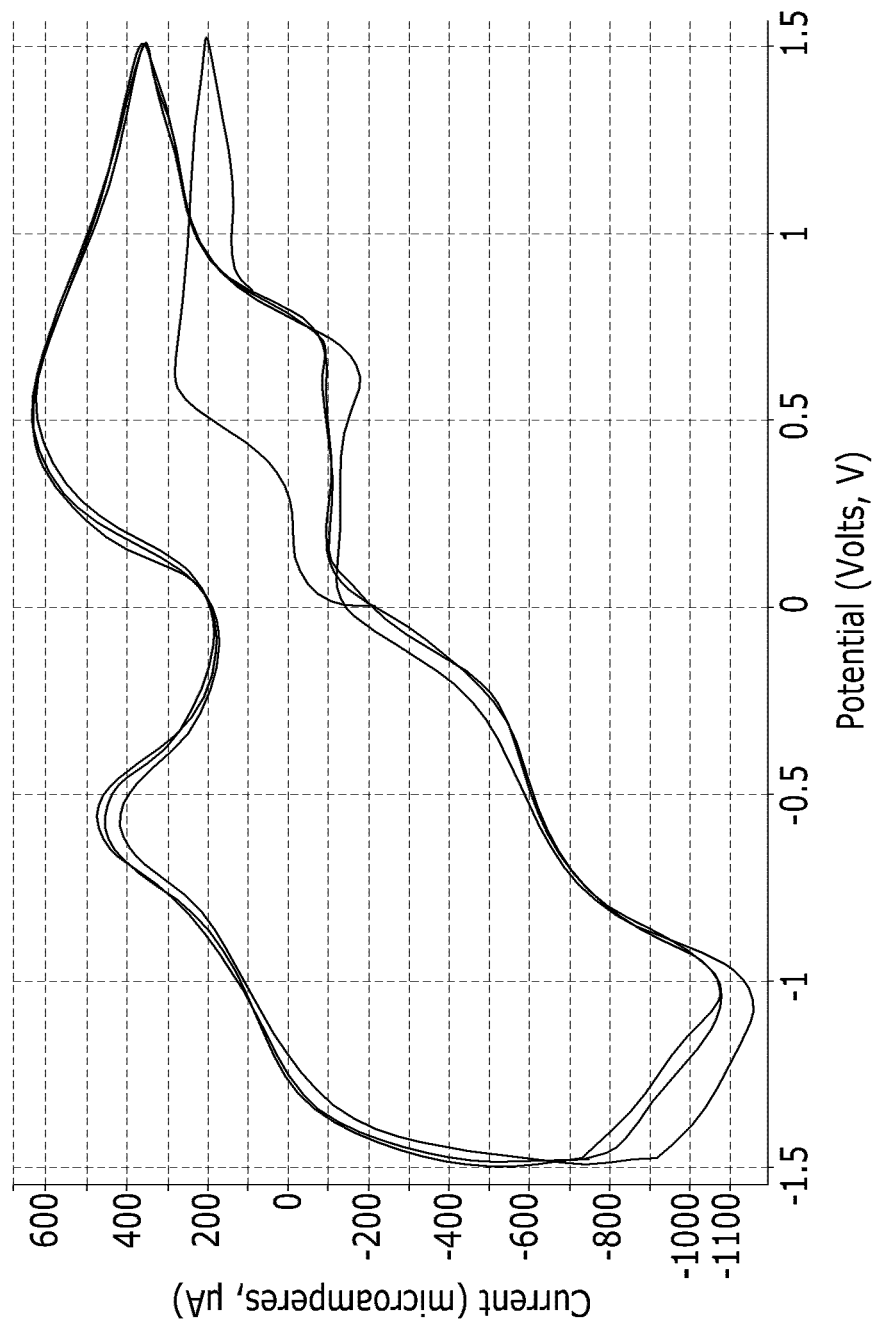
FIGS. 20 and 21 are graphs of current (microamperes) versus potential (volts) showing initial and terminal cyclic voltammograms, respectively, of the electrochromic device according to Example 15 during a reliability test.
Figure 21:
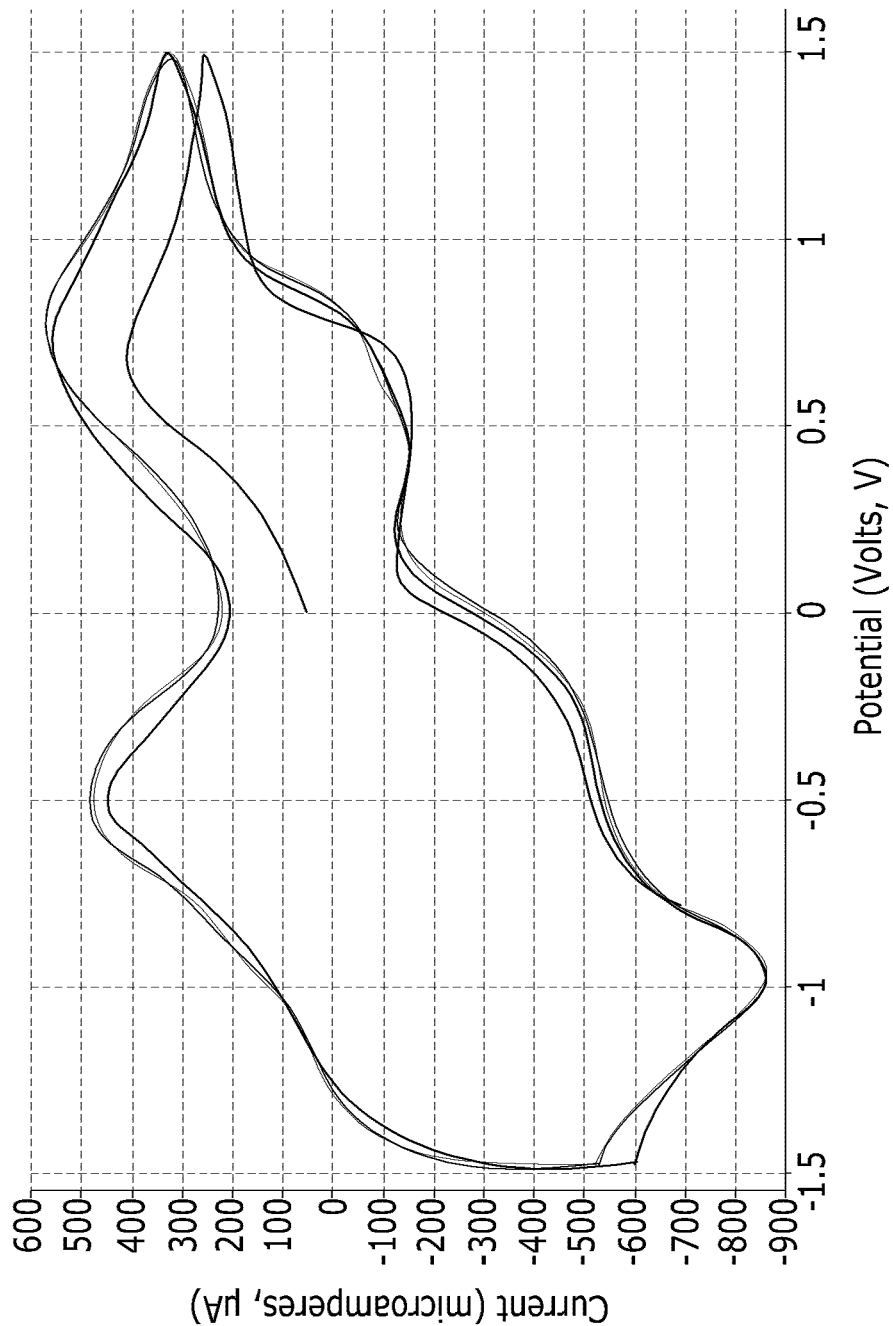

FIG. 19 shows chromophore photographs of the electrochromic device according to Example 15 depending on a voltage applied thereto. As shown in FIG. 19, the electrochromic device of Example 15 emits deep violet at a voltage ranging from 1.5 to 1.8 V and maintains the same chromophore up to 1.8 V, and emits light green at −1.0 V. In addition, FIG. 20 shows initial 5 cyclic voltammograms of the electrochromic device of Example 15, and FIG. 21 shows its 95th to 100th cyclic voltammograms to evaluate reliability. As shown in FIGS. 20 and 21, the electrochromic device of Example 15 has excellent stability.

Figure 22:
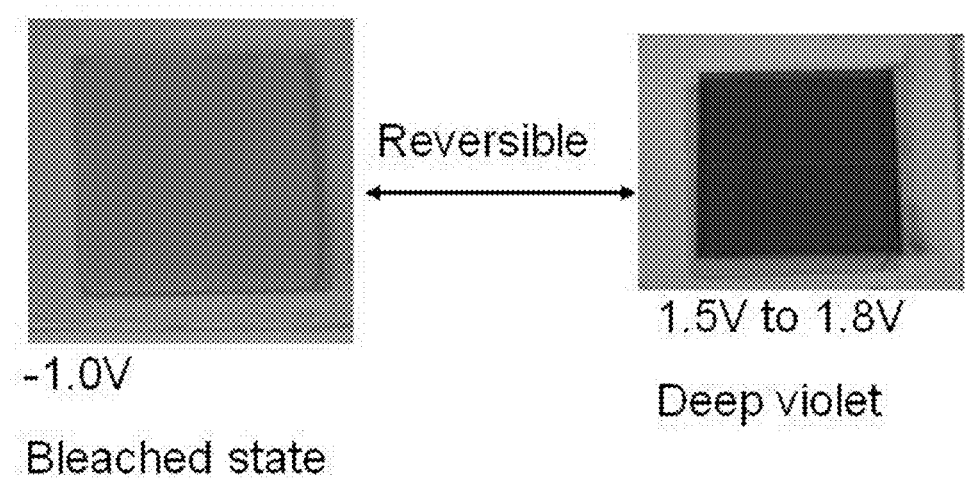
FIG. 22 is a photograph showing electrochromism of the electrochromic device according to Example 16 as a function of an applied voltage.
Figure 23:
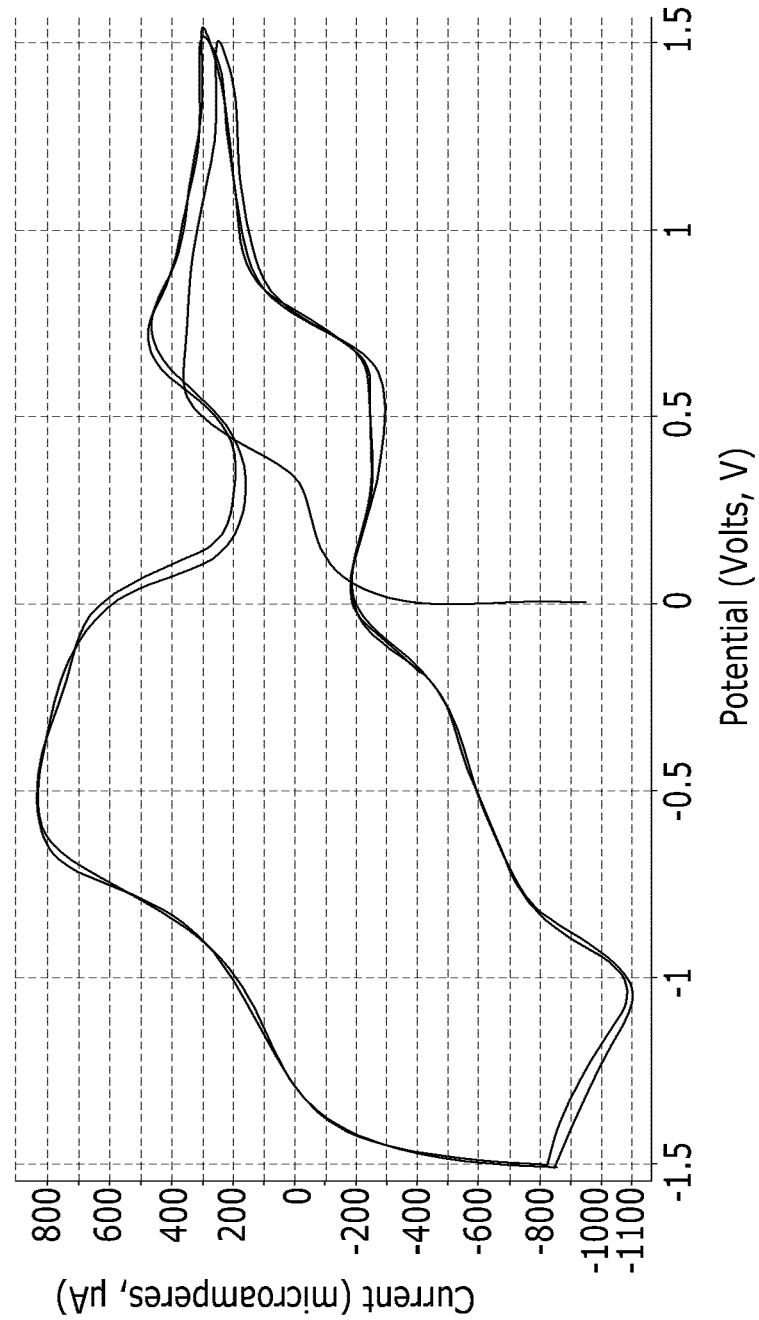
FIGS. 23 and 24 are graphs of current (microamperes) versus potential (volts) showing initial and terminal cyclic voltammograms, respectively, of the electrochromic device according to Example 16 during a reliability test.
Figure 24:
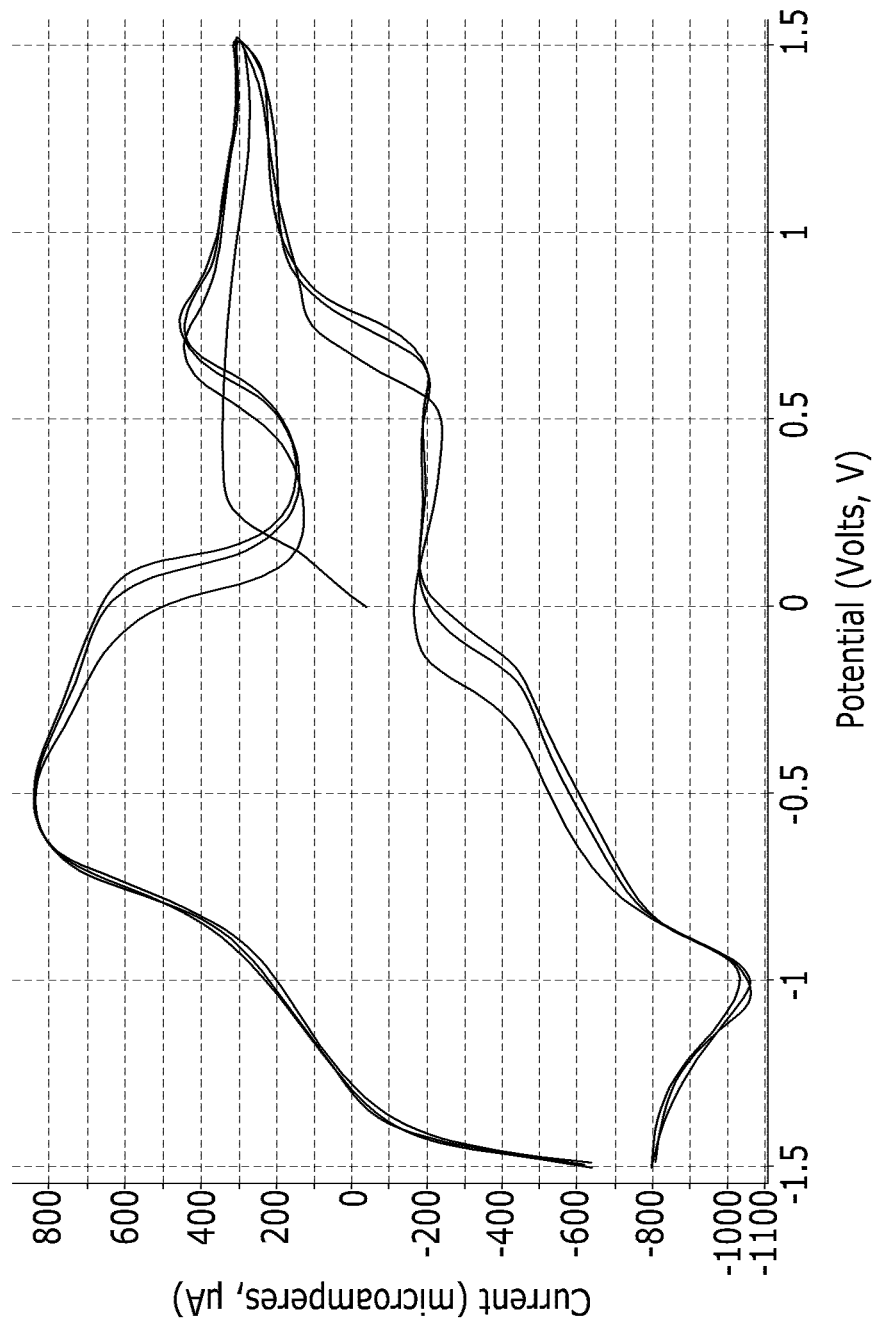

FIG. 22 shows chromophore photograph of the electrochromic device of Example 16 depending on a voltage applied thereto. As shown in FIG. 22, the electrochromic device of Example 16 emits deep violet at a voltage ranging from 1.5 to 1.8 V and maintains the same chromophore up to 1.8 V, and emits light green at −1.0V. In addition, FIG. 23 shows initial 3 cyclic voltammograms of the electrochromic device of Example 16, and FIG. 24 shows its 495th to 500th cyclic voltammograms to evaluate reliability. As shown in FIGS. 23 and 24, the electrochromic device of Example 16 has excellent stability.

Figure 25:
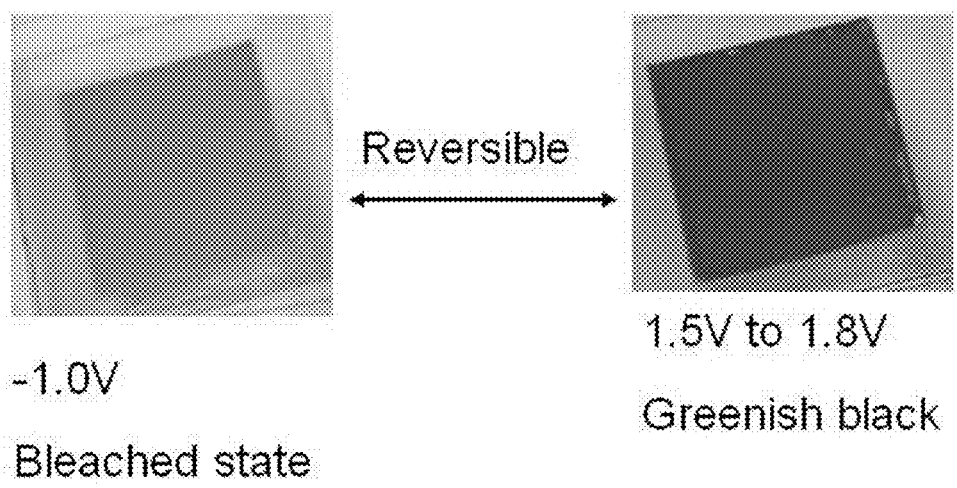
FIG. 25 is a photograph showing electrochromism of the electrochromic device according to Example 17 as a function of an applied voltage.
Figure 26:
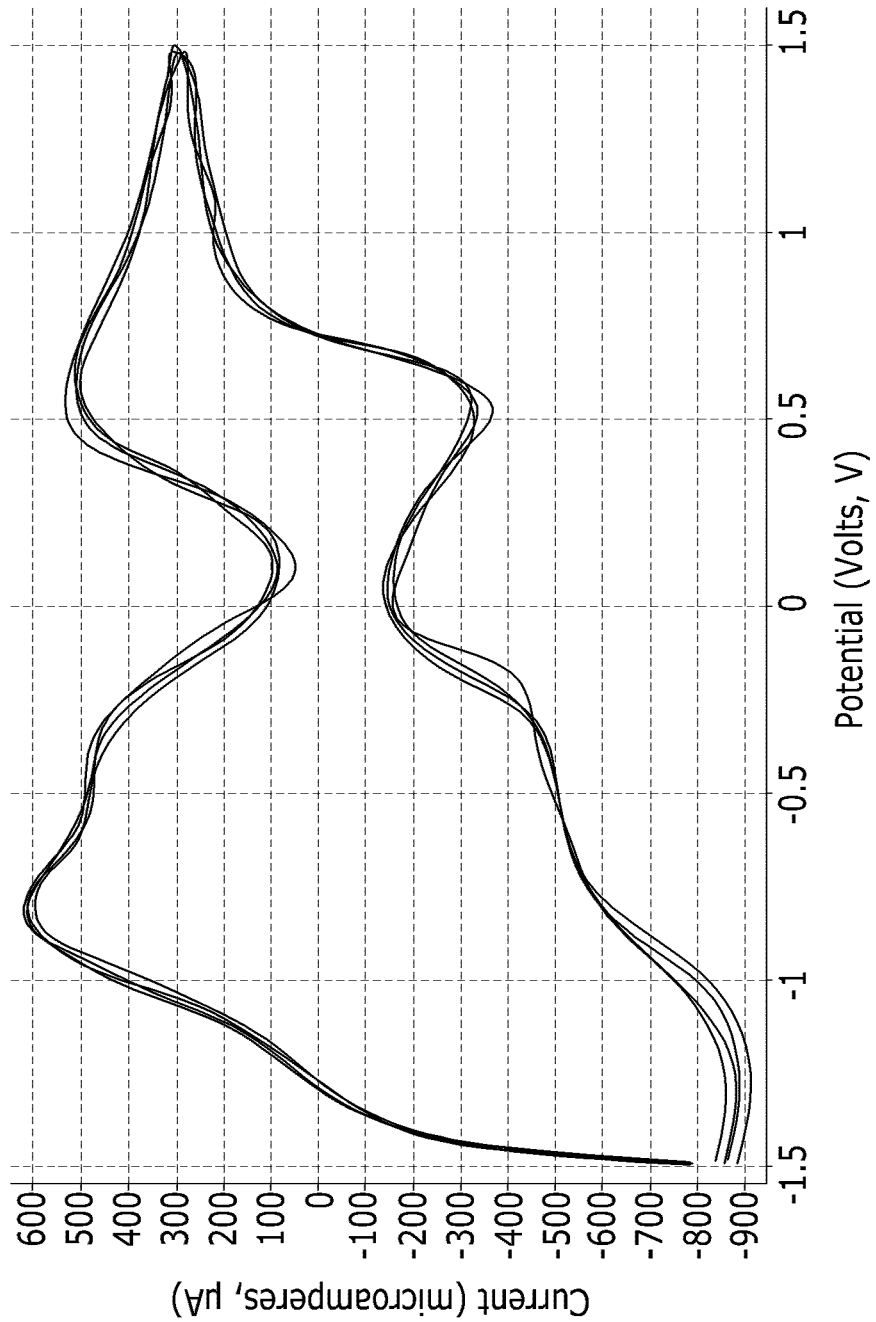
FIGS. 26 and 27 are graphs of current (microamperes) versus potential (volts) showing initial and terminal cyclic voltammograms, respectively, of the electrochromic device according to Example 17 during a reliability test.
Figure 27:

FIG. 25 shows chromophore photographs of the electrochromic device of Example 17 depending on a voltage applied thereto. As shown in FIG. 25, the electrochromic device of Example 17 emits greenish black at a voltage ranging from 1.5 to 1.8 V and maintains the same chromophore up to 1.8 V, and emits light yellow at −1.0 V. In addition, in order to evaluate reliability, FIG. 26 shows initial 5 cyclic voltammograms of the electrochromic device of Example 17, and FIG. 27 shows its 497 to 500th cyclic voltammograms. As shown in FIGS. 26 and 27, the electrochromic device of Example 17 has excellent stability.

Figure 28:
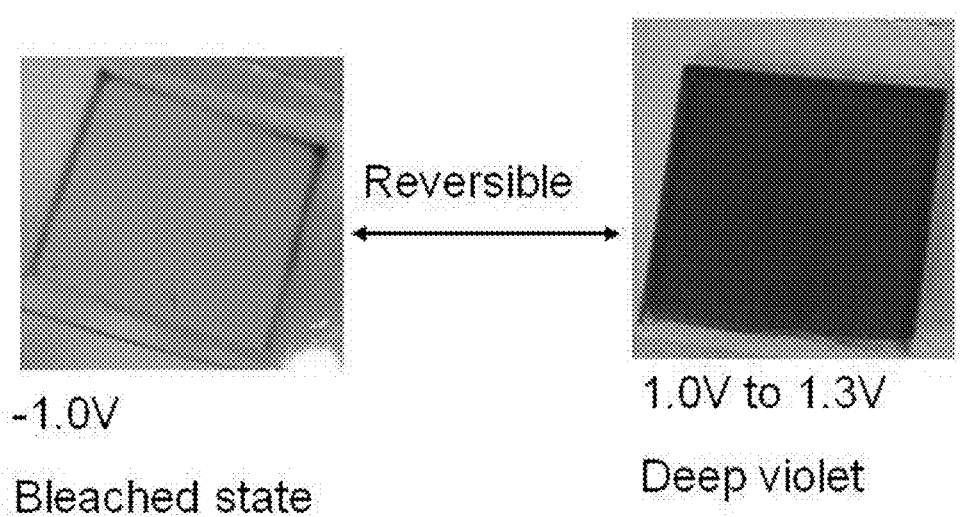
FIG. 28 is a photograph showing electrochromism of the electrochromic device according to Example 18 as a function of an applied voltage.
Figure 29:
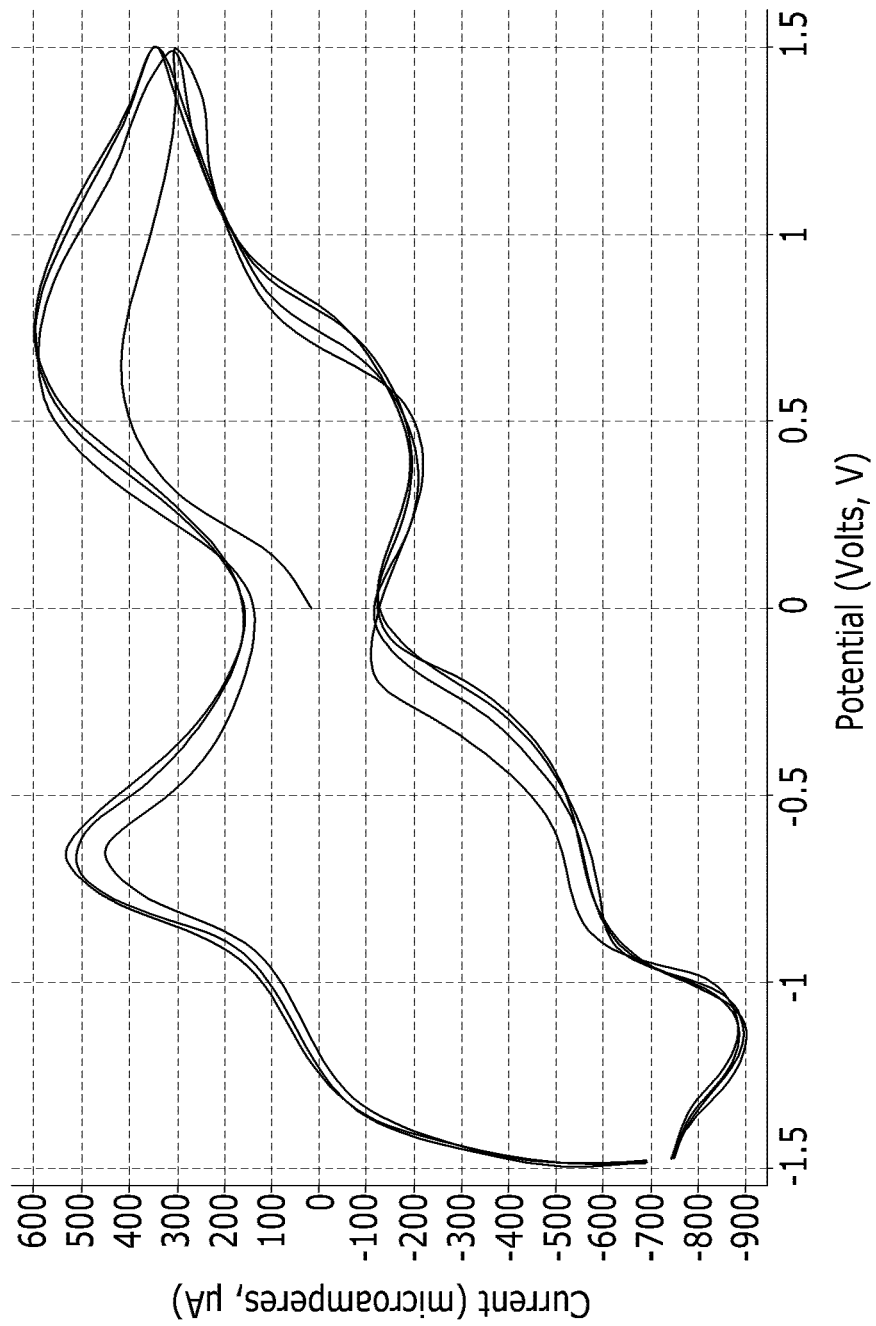
FIGS. 29 and 30 are graphs of current (microamperes) versus potential (volts) showing initial and terminal cyclic voltammograms, respectively, of the electrochromic device according to Example 18 during a reliability test.
Figure 30:
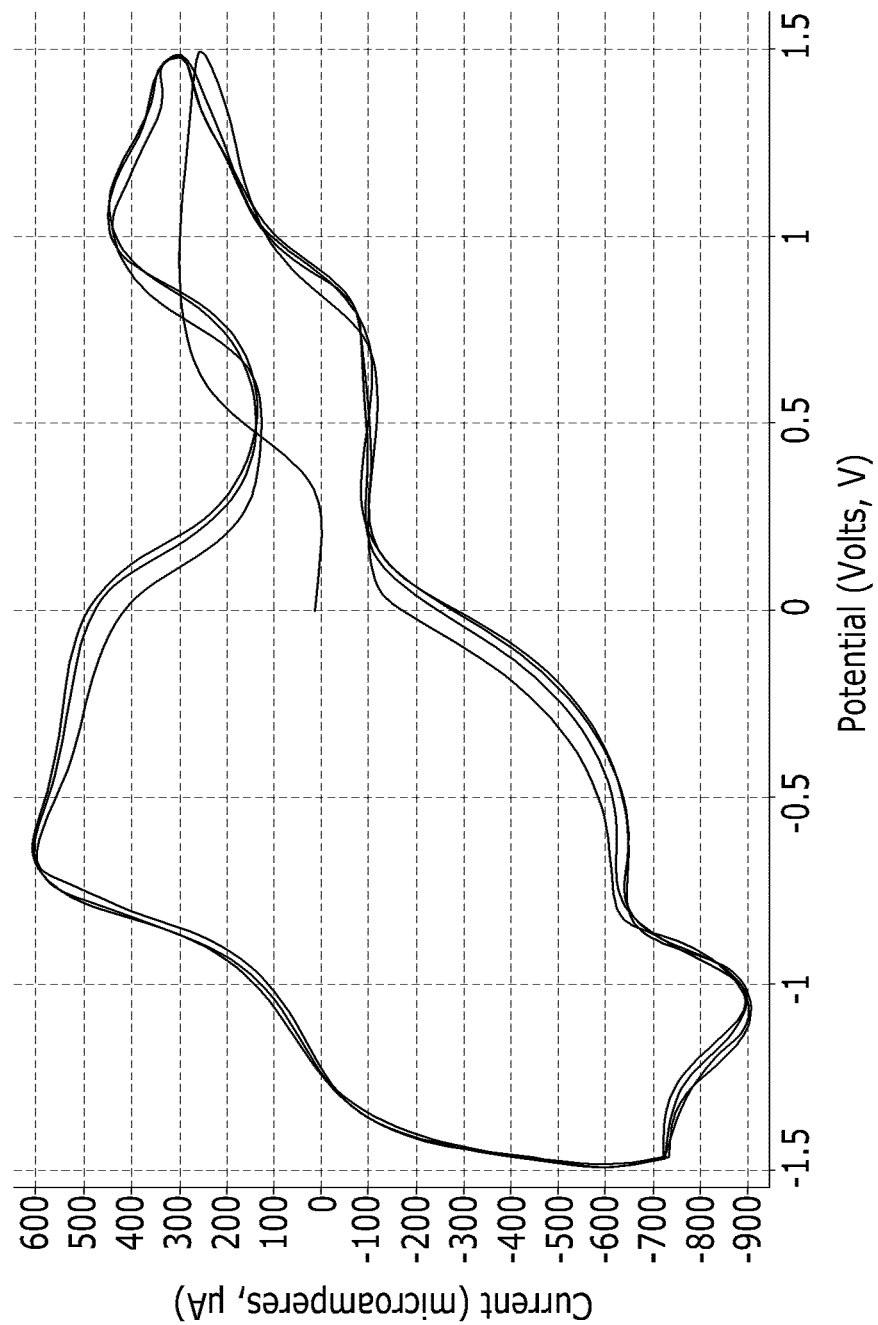

FIG. 28 shows chromophore photographs of the electrochromic device of Example 18 depending on a voltage applied thereto. As shown in FIG. 28, the electrochromic device of Example 18 emits deep violet at a voltage ranging from 1.0 to 1.3 V and maintains the same chromophore up to 1.3 V, and emits light green at −1.0 V. In order to evaluate reliability, FIG. 29 shows initial 10 cyclic voltammograms of the electrochromic device, and FIG. 30 shows its 490th to 500th cyclic voltammograms. As shown in FIGS. 29 and 30, the electrochromic device of Example 18 has excellent stability.

Figure 31:
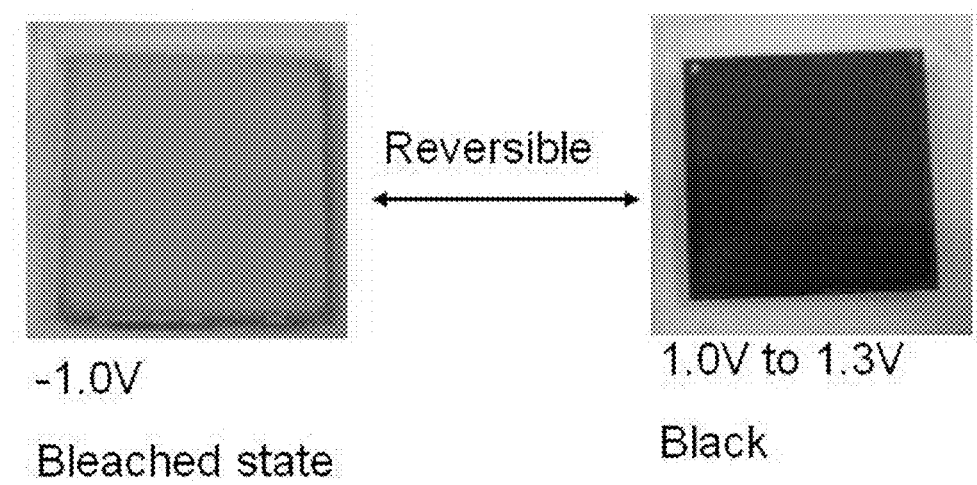
FIG. 31 is a photograph showing electrochromism of the electrochromic device according to Example 19 as a function of an applied voltage.
Figure 32:
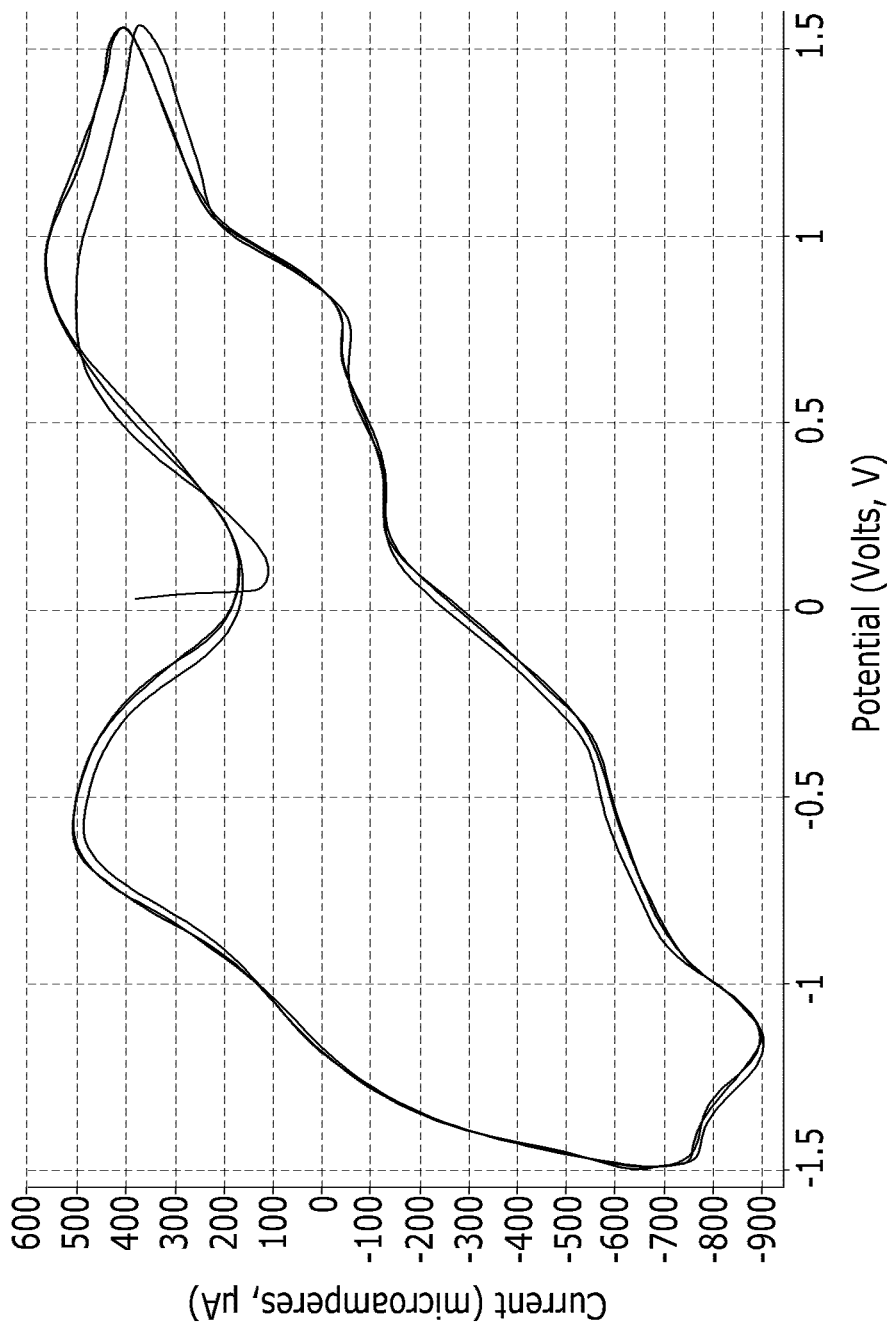
FIGS. 32 and 33 are graphs of current (microamperes) versus potential (volts) showing initial and terminal cyclic voltammograms, respectively, of the electrochromic device according to Example 19 during a reliability test.
Figure 33:
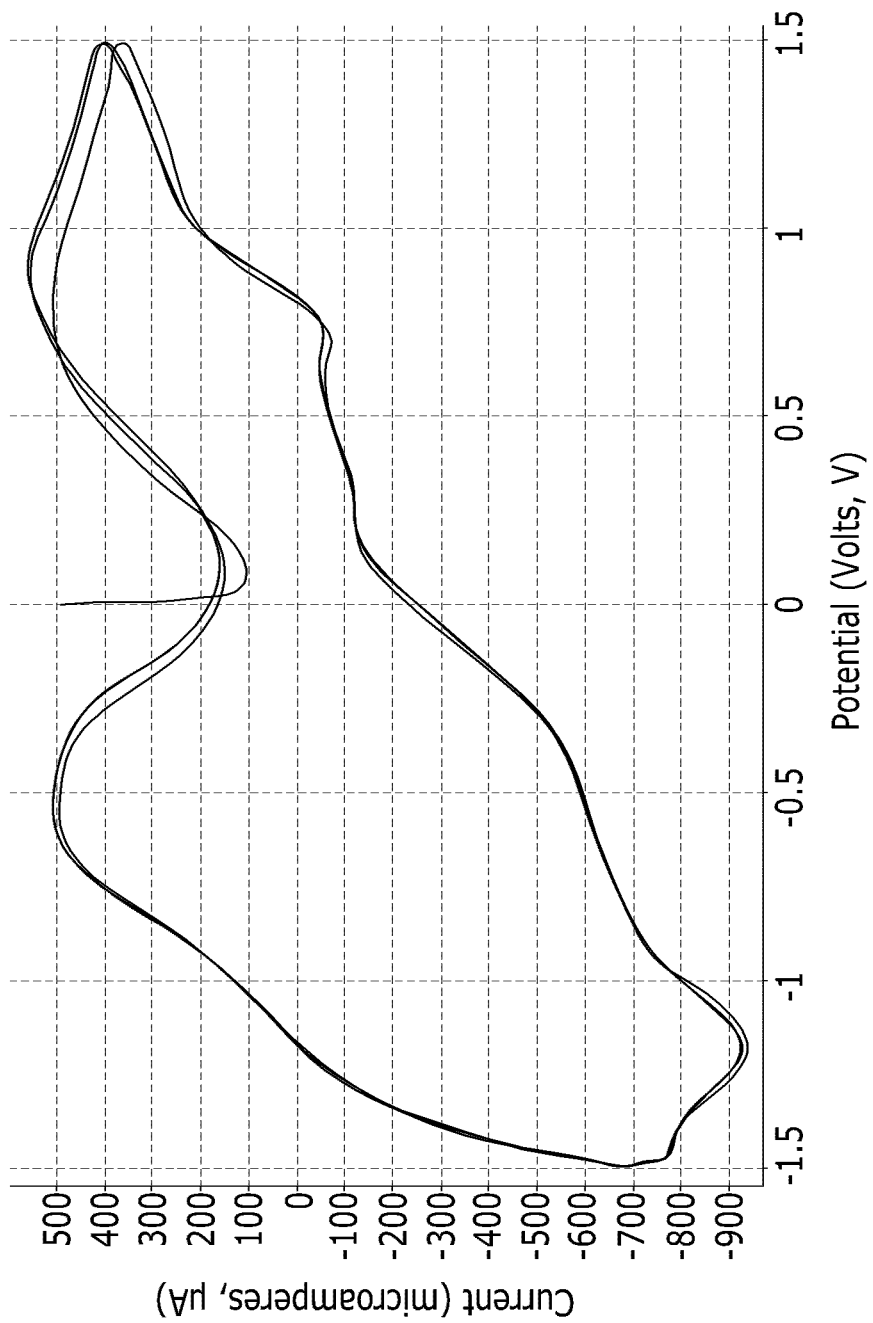

FIG. 31 shows chromophore photographs of the electrochromic device of Example 19 depending on a voltage applied thereto. As shown in FIG. 31, the electrochromic device of Example 19 emits black at a voltage ranging from 1.0 to 1.3 V and maintains the same chromophore up to 1.3 V, and emits light green at a voltage of −1.0 V. In order to evaluate reliability, FIG. 32 shows initial 5 cyclic voltammograms of the electrochromic device of Example 19, and FIG. 33 shows its 145th to 150th cyclic voltammograms. As shown in FIGS. 32 and 33, the electrochromic device of Example 19 has excellent stability.

Figure 34:
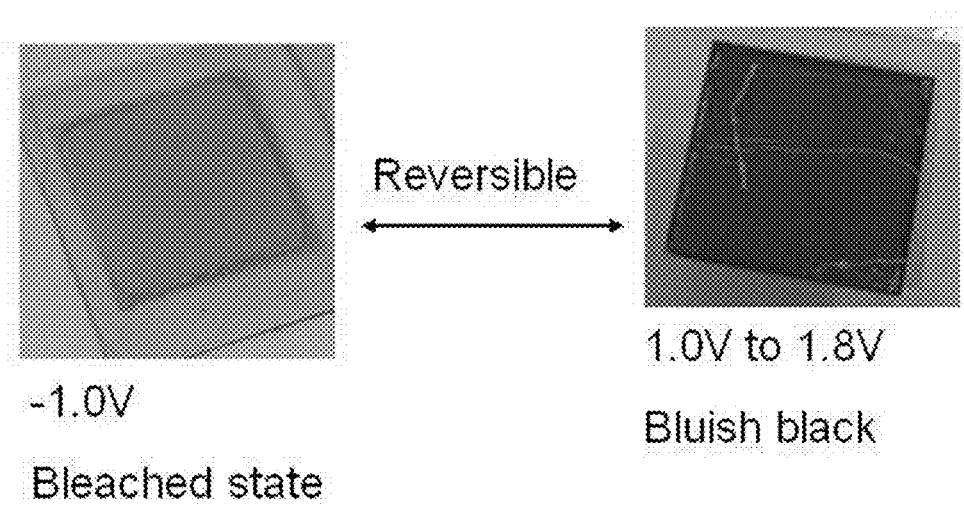
FIG. 34 is a photograph showing electrochromism of the electrochromic device according to Example 20 as a function of an applied voltage.
Figure 35:
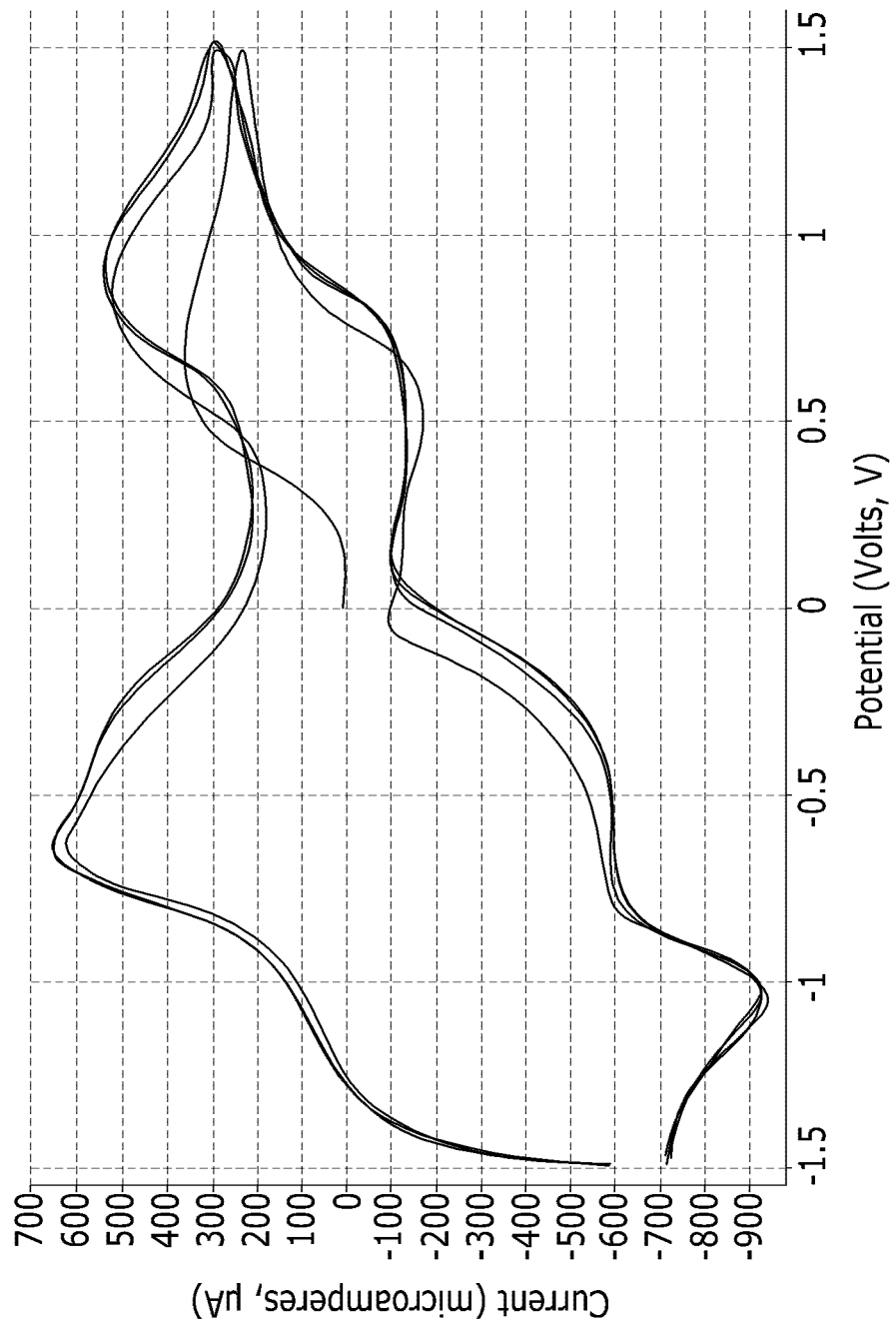
FIGS. 35 and 36 are graphs of current (microamperes) versus potential (volts) showing initial and terminal cyclic voltammograms, respectively, of the electrochromic device according to Example 20 during a reliability test.
Figure 36:
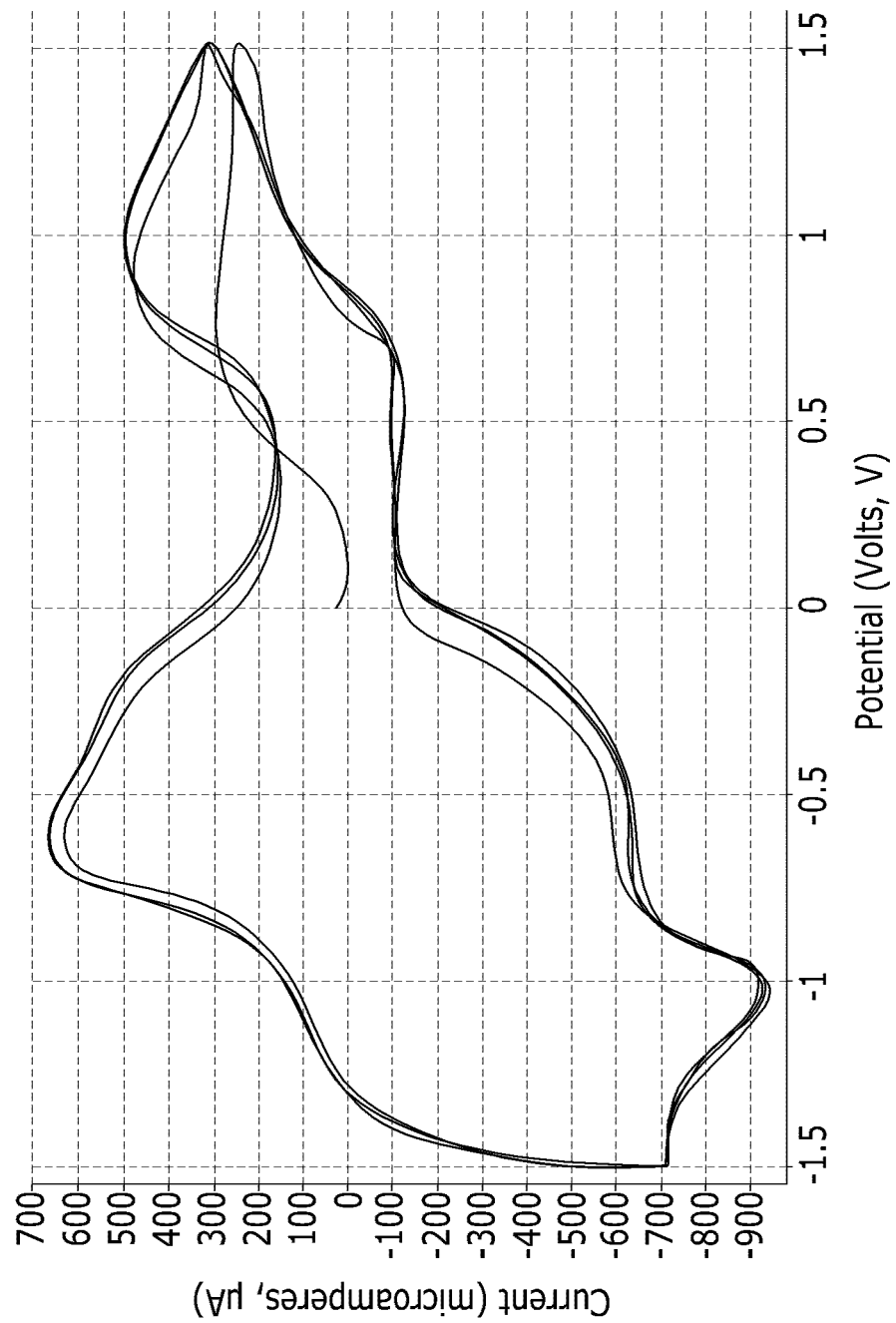
Figure 37:
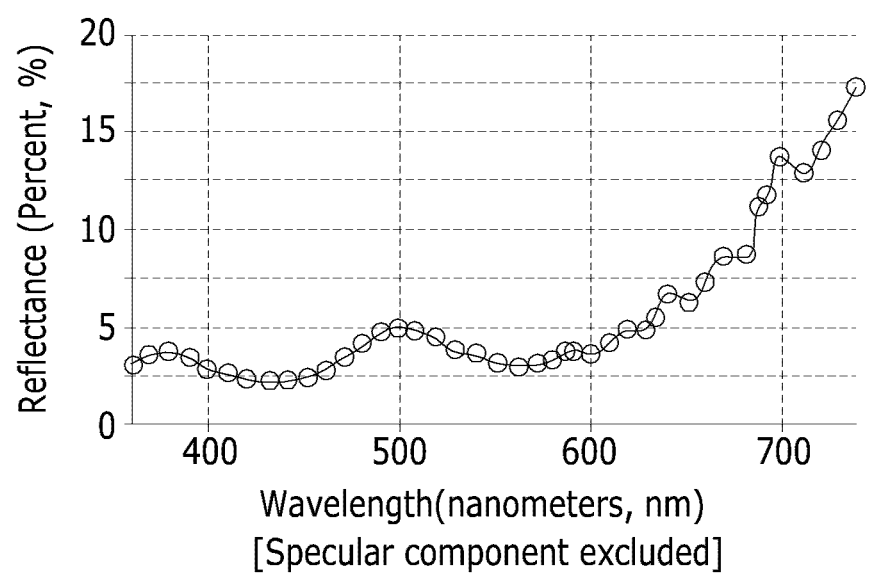
FIGS. 37 to 42 are graphs of reflectance (percent, %) versus wavelength (nanometers) which show transmission of the electrochromic devices according to Examples 14 to 20, respectively.
Figure 38:
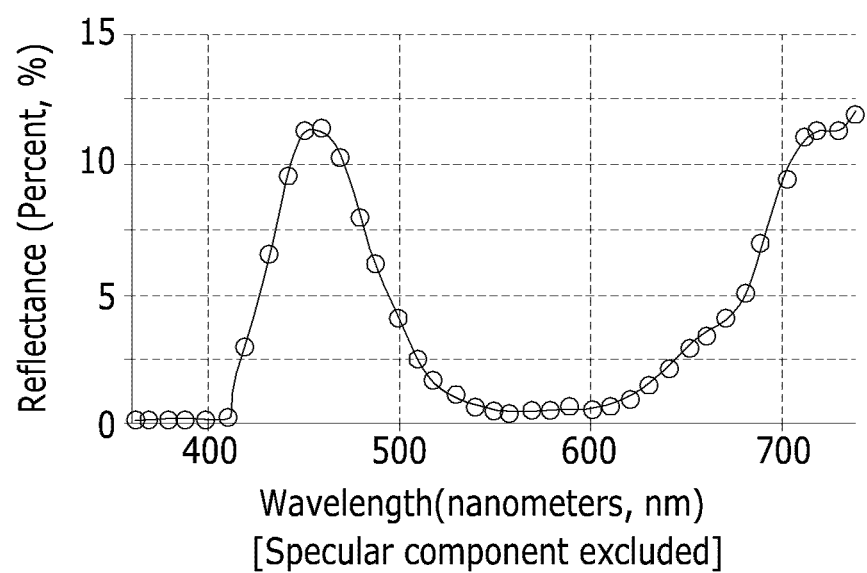
Figure 39:
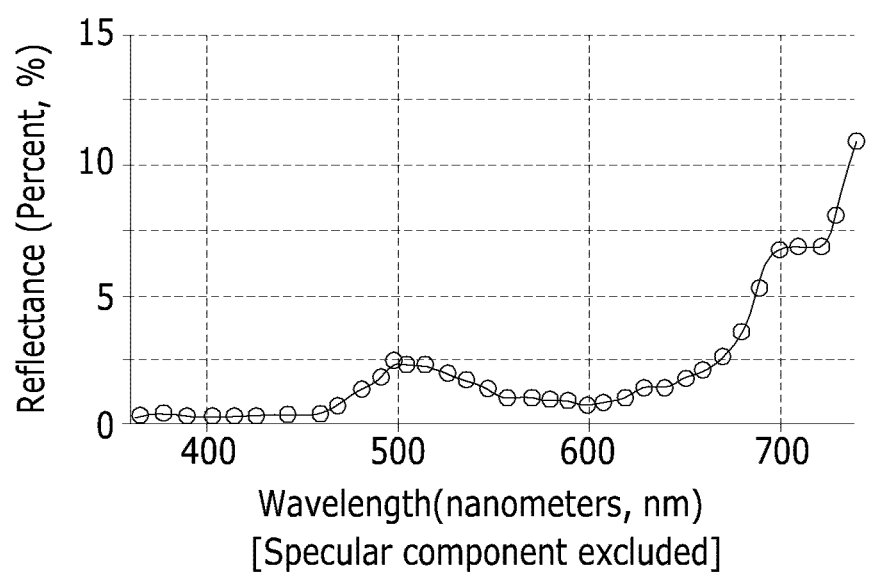
Figure 40:
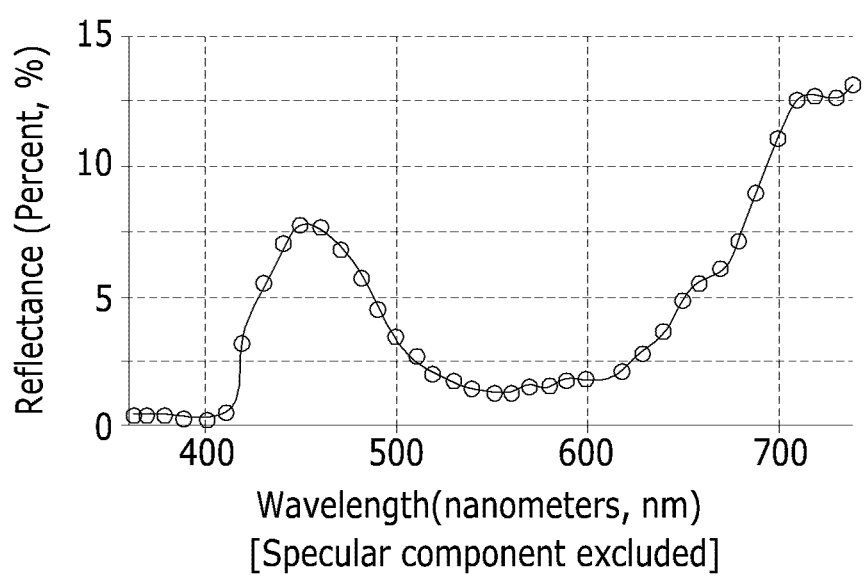
Figure 41:
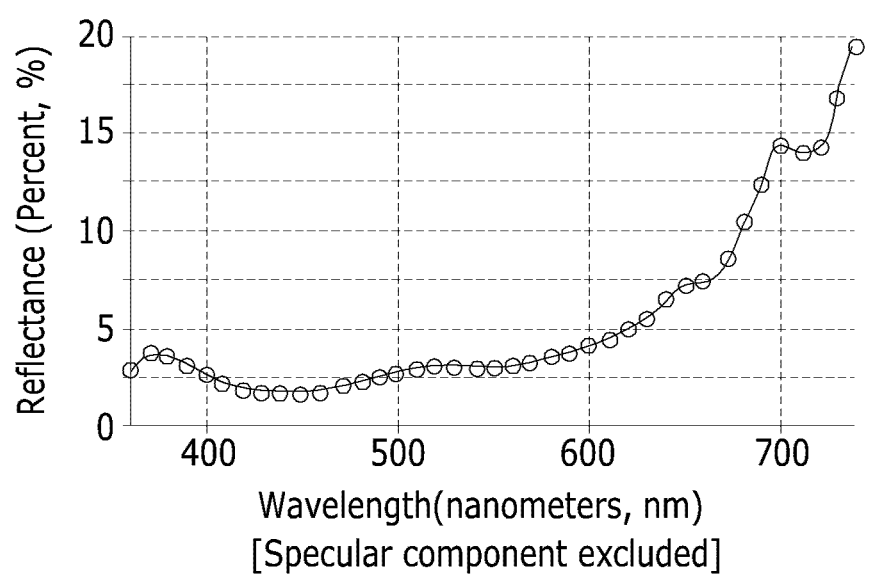
Figure 42:
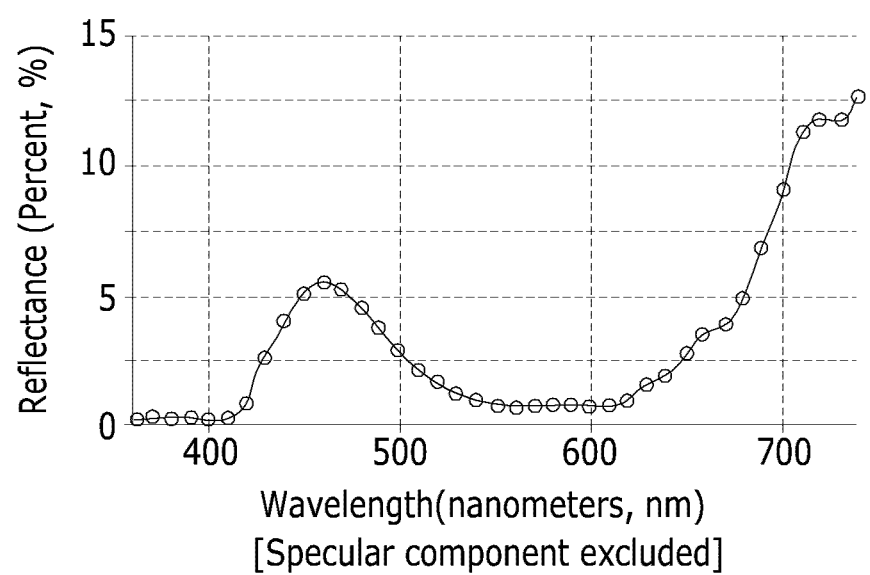

FIG. 34 shows chromophore photographs of the electrochromic device of Example 20 depending on a voltage applied thereto. As shown in FIG. 34, the electrochromic device of Example 20 emits bluish black at a voltage ranging from 1.0 to 1.8 V and maintains the same chromophore up to 1.8 V, and emits light yellow at −1.0 V. In order to evaluate reliability, FIG. 35 shows initial 3 cyclic voltammograms of the electrochromic device according to Example 20, and FIG. 36 shows its 497th to 500th cyclic voltammograms. As shown in FIGS. 35 and 36, the electrochromic device of Example 20 has excellent stability.

The electrochromic devices according to Examples 11 to 20 may display a different color at a different voltage range, and black or a color similar to black.

FIGS. 37 to 42 respectively show reflectance as a function of wavelength for the electrochromic devices of Example 14 to 20 at a voltage range from 1.0 to 1.5 V. In FIGS. 37 to 42, the specular component has been excluded. Thus FIGS. 37 to 42 respectively show reflection spectra of each electrochromic device when a voltage is applied thereto. As shown in the reflectance spectra, each electrochromic device displays a color when a voltage of from 1.0 to 1.5 V is applied thereto.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrochromic compound represented by the following Chemical Formula 1:

Chemical Formula 1

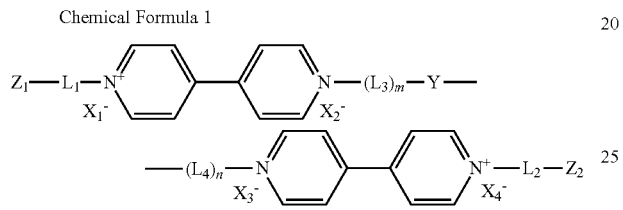

wherein, in Chemical Formula 1,
Y is an N-containing aromatic ring group,
$X_1^-$ to $X_4^-$ are each independently a monovalent anion,
$L_1$ to $L_4$ are each independently a single bond, a substituted or unsubstituted C1 to C30 alkylene group, a substituted or unsubstituted C3 to C30 cycloalkylene group, a substituted or unsubstituted C6 to C30 arylene group, or a substituted or unsubstituted C2 to C30 heteroarylene group, and
$Z_1$ and $Z_2$ are each independently a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, provided that at least one of $Z_1$ and $Z_2$ is a phosphonic acid group, a carboxylic acid group, a sulfonic acid group, a hydroxyl group, or a thiol group, and
m and n each independently range from 0 to 4.

2. The electrochromic compound of claim 1, wherein in Chemical Formula 1, when $Z_1$ and $Z_2$ are the same, $L_1$ and $L_2$ are different from each other.

3. The electrochromic compound of claim 1, wherein in Chemical Formula 1, $L_1$ and $L_2$ are each independently a substituted or unsubstituted C3 to C30 cycloalkylene group, a substituted or unsubstituted C6 to C30 arylene group, or a substituted or unsubstituted C2 to C30 heteroarylene group.

4. The electrochromic compound of claim 1, wherein Y comprises a substituted or unsubstituted pyridine group, a substituted or unsubstituted pyridazine group, a substituted or unsubstituted pyrimidine group, a substituted or unsubstituted pyrazine group, a substituted or unsubstituted quinoline group, a substituted or unsubstituted quinoxaline group, a substituted or unsubstituted isoquinoline group, an N-substituted, substituted or unsubstituted benzimidazole group, an N-substituted, substituted or unsubstituted indole group, an N-substituted, substituted or unsubstituted isoindole group, an N-substituted, substituted or unsubstituted indazole group, a substituted or unsubstituted phthalazine group, a substituted or unsubstituted acridine group, or a an N-substituted, substituted or unsubstituted carbazole group, which are represented by the following Chemical Formula 2:

Chemical Formula 2

(1)
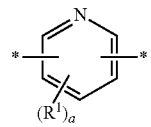

(2)
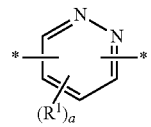

(3)
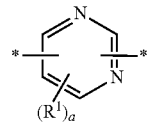

(4)
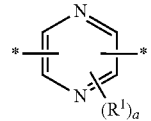

(5)
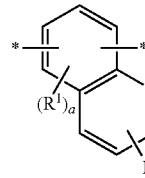

(6)
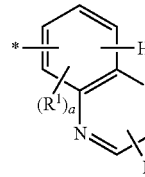

(7)
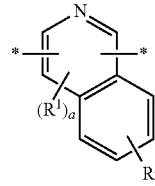

(8)
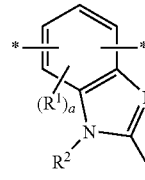

-continued (9)
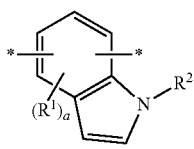

(10)
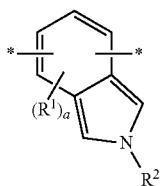

(11)
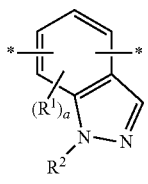

(12)
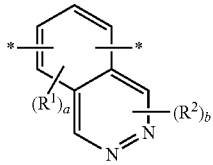

(13)
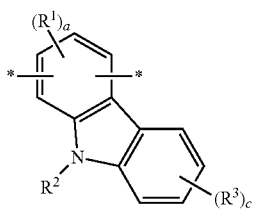

(14)
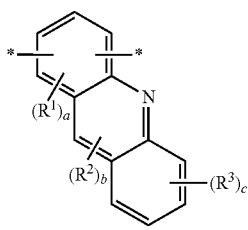

wherein, in Chemical Formula 2,
$R^1$ to $R^3$ are each independently hydrogen, a substituted or unsubstituted C1 to C10 alkyl group, or a substituted or unsubstituted C6 to C12 aryl group, and a to c range from 0 to the number of hydrogens in the ring being substituted.

5. The electrochromic compound of claim 1, wherein at least one of $Z_1$ and $Z_2$ is a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, and the other of $Z_1$ and $Z_2$ is a phosphonic acid group, a carboxylic acid group, a sulfonic acid group, a hydroxyl group, or a thiol group.

6. The electrochromic compound of claim 1, wherein one of -$L_1$-$Z_1$ and -$L_2$-$Z_2$ is a substituted or unsubstituted quinolinyl group (1) of the following Chemical Formula 3A, a substituted or unsubstituted quinoxalinyl group (2) of the following Chemical Formula 3A, a substituted or unsubstituted fluorenyl group (3) of the following Chemical Formula 3A, a substituted or unsubstituted beta-methylstyrenyl group (4) of the following Chemical Formula 3A, a substituted or unsubstituted anthraquinonyl group (5) of the following Chemical Formula 3A, a substituted or unsubstituted benzimidazolyl group (6) of the following Chemical Formula 3A, a substituted or unsubstituted N-phenyl imidazolyl group (7) of the following Chemical Formula 3A, a substituted or unsubstituted phenyl group, a substituted or unsubstituted benzyl group, a substituted or unsubstituted vinyl group, a substituted or unsubstituted allyl group, a substituted or unsubstituted carbazolyl group, a substituted or unsubstituted pyrenyl group, a substituted or unsubstituted thiophene group, a substituted or unsubstituted hydroxyalkyl group, a substituted or unsubstituted heptyl group, or a substituted or unsubstituted octyl group, and the other of -$L_1$-$Z_1$ and -$L$-$Z_2$ is a functional group represented by the following Chemical Formula 3B-1 or 3B-2:

Chemical Formula 3A (1)
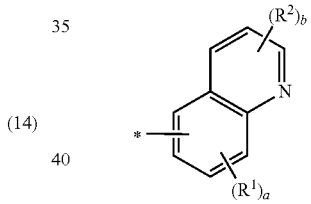

(2)
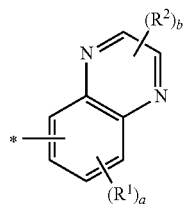

(3)
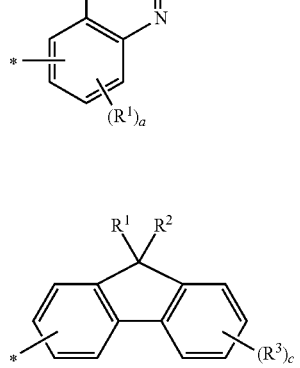

(4)
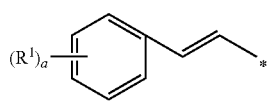

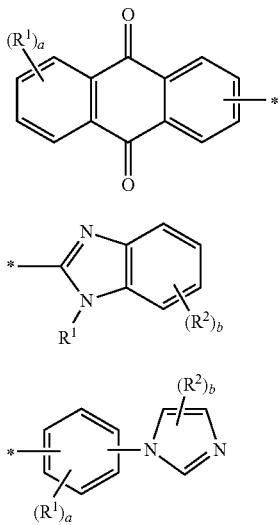

wherein, in Chemical Formula 3A,
R¹ and R² are each independently a substituted or unsubstituted C1 to C10 alkyl group or a substituted or unsubstituted C6 to C12 aryl group, and a to c ranges from 0 to the number of hydrogens on the substituted ring, \*-(G)$_n$-(Z$_3$)$_k$     Chemical Formula 3B-1 wherein, in Chemical Formula 3B-1,
G is a C1 to C4 hydrocarbon group, Z$_3$ is a phosphonic acid group, a carboxylic acid group, a sulfonic acid group, a hydroxyl group, or a thiol group, n ranges from 0 to 1, and k is 1 or 2, \*—(CH$_2$)$_{m1}$-(Ph)$_{m2}$-(CH$_2$)$_{m3}$—(Z$_3$)$_k$     Chemical Formula 3B-2 wherein, in Chemical Formula 3B-2,
Ph is a substituted or unsubstituted phenylene, Z$_3$ is a phosphonic acid group, a carboxylic acid group, a sulfonic acid group, a hydroxyl group, or a thiol group, m1, m2, and m3 are each independently 0 to 4, and k is 1 or 2.

7. The electrochromic compound of claim 6, wherein the functional group of Chemical Formula 3B-1 or 3B-2 are a group represented by the following Chemical Formula 4:

Chemical Formula 4

8. The electrochromic compound of claim 1, wherein the electrochromic compound is at least one of the compounds represented by the following Chemical Formulas 1A to 1J:

Chemical Formula 1A

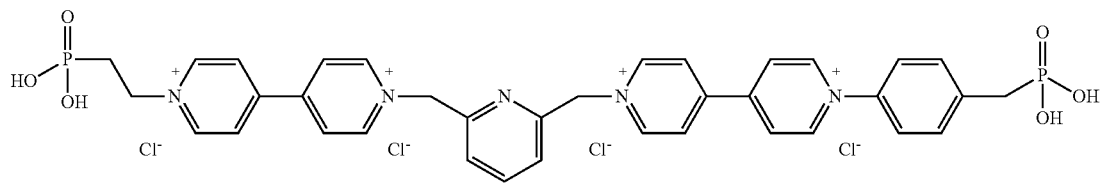

Chemical Formula 1B

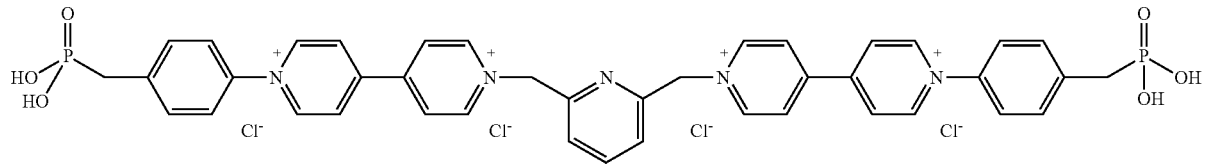

-continued
Chemical Formula 1C
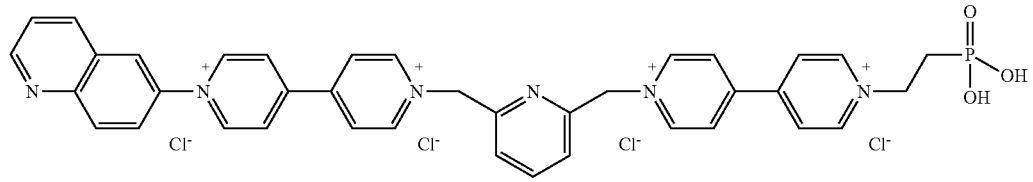
Chemical Formula 1D
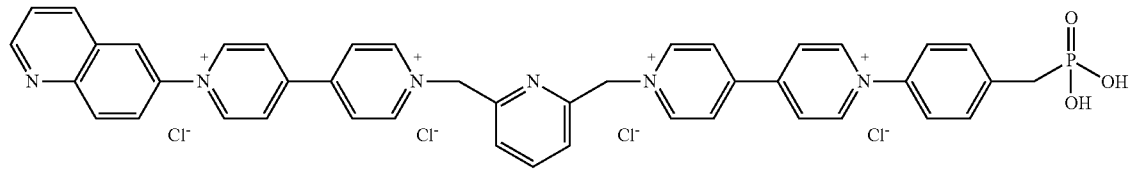
Chemical Formula 1E
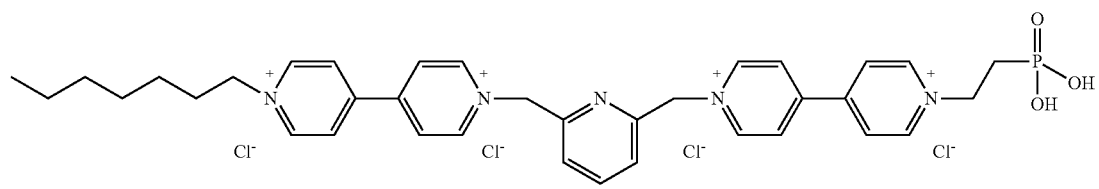
Chemical Formula 1F
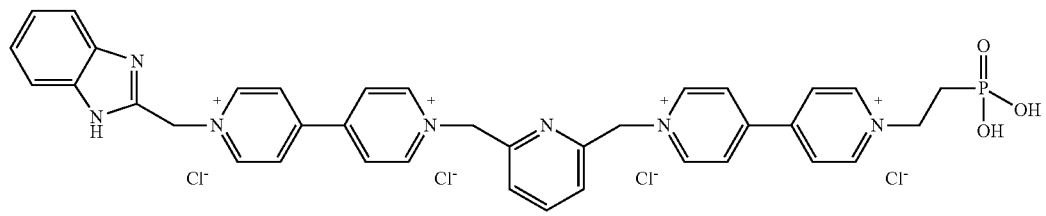
Chemical Formula 1G
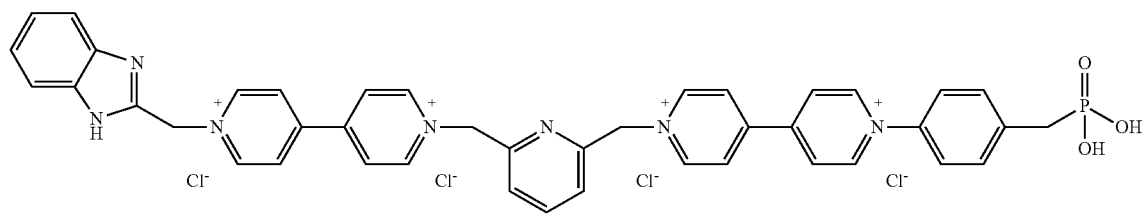
Chemical Formula 1H
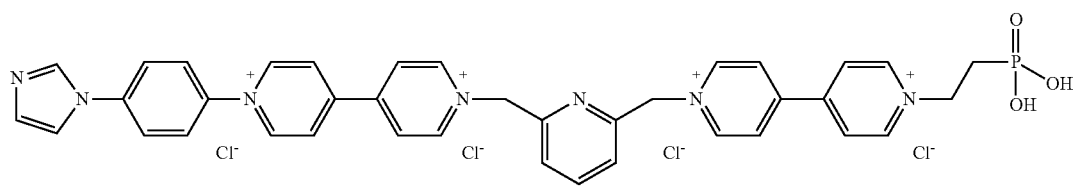
Chemical Formula 1I
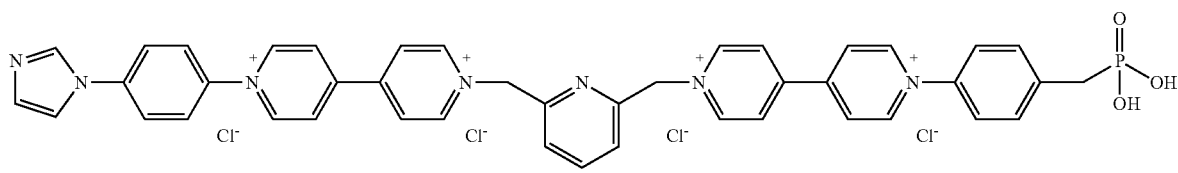

Chemical Formula 1J

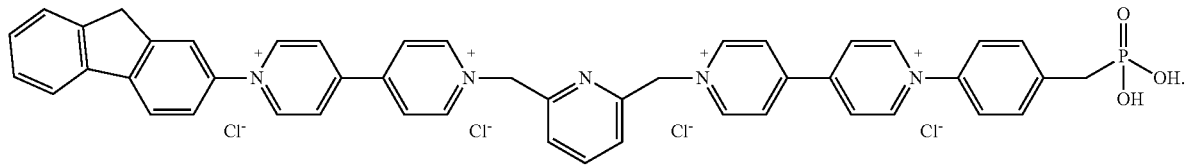

9. The electrochromic compound of claim 1, wherein the electrochromic compound has a black color or a color close to black.

10. The electrochromic compound of claim 1, wherein the electrochromic compound has an average reflectance between about 400 and about 700 nanometers of less than about 10% when oxidized at a voltage of greater than 0.5 Volt.

11. The electrochromic compound of claim 1, wherein the electrochromic compound has a wavelength of maximum reflectance of about 425 to about 475 nanometers when oxidized at a voltage of greater than about 0.5 Volt.

12. An electrochromic device, comprising:
a first electrode and a second electrode opposite the first electrode;
an electrochromic layer on either of the first electrode or the second electrode; and
an electrolyte layer disposed between the first electrode and the second electrode,
wherein the electrochromic compound is represented by the following Chemical Formula 1:

Chemical Formula 1

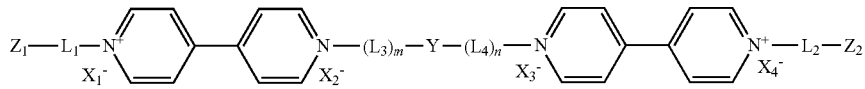

wherein, in Chemical Formula 1,
Y is an N-containing aromatic ring group,
$X_1^-$ to $X_4^-$ are each independently a monovalent anion,
$L_1$ to $L_4$ are each independently a single bond, a substituted or unsubstituted C1 to C30 alkylene group, a substituted or unsubstituted C3 to C30 cycloalkylene group, a substituted or unsubstituted C6 to C30 arylene group, or a substituted or unsubstituted C2 to C30 heteroarylene group, and
$Z_1$ and $Z_2$ are each independently a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, provided that at least one of $Z_1$ and $Z_2$ is a phosphonic acid group, a carboxylic acid group, a sulfonic acid group, a hydroxyl group, or a thiol group, and
m and n each independently range from 0 to 4.

13. The electrochromic device of claim 12, wherein in Chemical Formula 1, when $Z_1$ and $Z_2$ are the same, $L_1$ and $L_2$ are different from each other.

14. The electrochromic device of claim 12, wherein in Chemical Formula 1, $L_1$ and $L_2$ are each independently a substituted or unsubstituted C3 to C30 cycloalkylene group, a substituted or unsubstituted C6 to C30 arylene group, or a substituted or unsubstituted C2 to C30 heteroarylene group.

15. The electrochromic device of claim 12, wherein
Y comprises a substituted or unsubstituted pyridine group, a substituted or unsubstituted pyridazine group, a substituted or unsubstituted pyrimidine group, a substituted or unsubstituted pyrazine group, a substituted or unsubstituted quinoline group, a substituted or unsubstituted quinoxaline group, a substituted or unsubstituted isoquinoline group, an N-substituted, substituted or unsubstituted benzimidazole group, an N-substituted, substituted or unsubstituted indole group, an N-substituted, substituted or unsubstituted isoindole group, an N-substituted, substituted or unsubstituted indazole group, a substituted or unsubstituted phthalazine group, a substituted or unsubstituted acridine group, or a an N-substituted, substituted or unsubstituted carbazole group, which are represented by the following Chemical Formula 2:

Chemical Formula 2

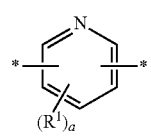
(1)

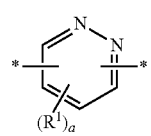
(2)

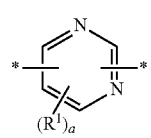
(3)

(4) 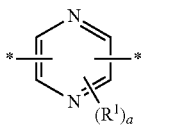

(5) 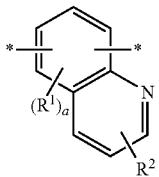

(6) 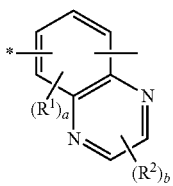

(7) 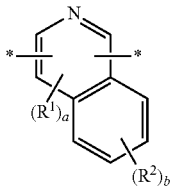

(8) 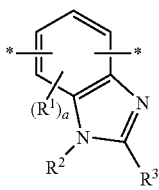

(9) 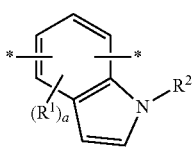

(10) 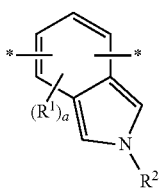

(11) 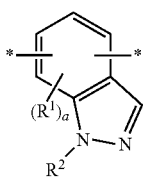

(12) 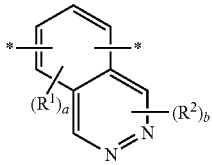

(13) 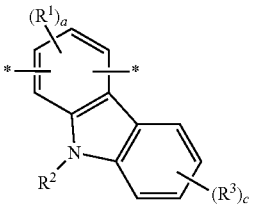

(14) 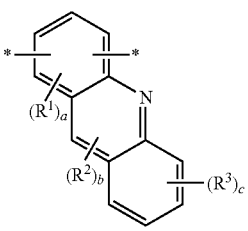

wherein, in Chemical Formula 2, $R^1$ to $R^3$ are each independently selected from hydrogen, a substituted or unsubstituted C1 to C10 alkyl group, or a substituted or unsubstituted C6 to C12 aryl group, and a to c range from 0 to the number of hydrogens in the ring being substituted.

16. The electrochromic device of claim 12, wherein at least one of $Z_1$ and $Z_2$ is a substituted or unsubstituted C1 to C30 alkyl group, a substituted or unsubstituted C2 to C30 alkenyl group, a substituted or unsubstituted C1 to C30 fluoroalkyl group, a substituted or unsubstituted C1 to C30 alkoxy group, a substituted or unsubstituted C3 to C30 cycloalkyl group, a substituted or unsubstituted C6 to C30 heterocycloalkyl group, a substituted or unsubstituted C6 to C30 aryl group, a substituted or unsubstituted C6 to C30 aryloxy group, a substituted or unsubstituted C2 to C30 heteroaryl group, a phosphonic acid group, a carboxylic acid group, a sulfonic acid group, a hydroxyl group, or a thiol group, and the other of $Z_1$ and $Z_2$ is a phosphonic acid group, a carboxylic acid group, a sulfonic acid group, a hydroxyl group, or a thiol group.

17. The electrochromic device of claim 12, wherein one of -$L_1$-$Z_1$ and -$L_2$-$Z_2$ is a substituted or unsubstituted quinolinyl group (1) of the following Chemical Formula 3A, a substituted or unsubstituted quinoxalinyl group (2) of the following Chemical Formula 3A, a substituted or unsubstituted fluorenyl group (3) of the following Chemical Formula 3A, a substituted or unsubstituted beta-methylstyrenyl group (4) of the following Chemical Formula 3A, a substituted or unsubstituted anthraquinonyl group (5) of the following Chemical Formula 3A, a substituted or unsubstituted benzimidazolyl group (6) of the following Chemical Formula 3A, a substituted or unsubstituted N-phenyl imidazolyl group (7) of the following Chemical Formula 3A, a substituted or unsubstituted phenyl group, a substituted or unsubstituted benzyl group, a substituted or unsubstituted vinyl group, a substituted or unsubstituted allyl group, a substituted or unsubstituted carbazolyl group, a substituted or unsubstituted pyrenyl group, a substituted or unsubstituted thiophenyl group, a substituted or unsubstituted hydroxyalkyl group, a substituted or unsubstituted heptyl group, or a substituted or unsubstituted octyl group, and the other of -$L_1$-$Z_1$ and -$L_2$-$Z_2$ is a functional group represented by the following Chemical Formula 3B-1 or 3B-2:

Chemical Formula 3A (1) 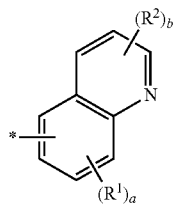

(2) 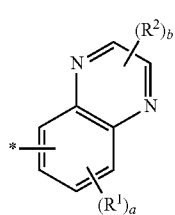

(3) 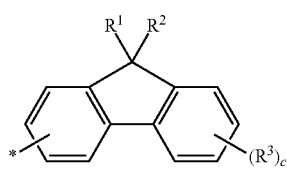

(4) 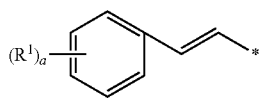

(5) 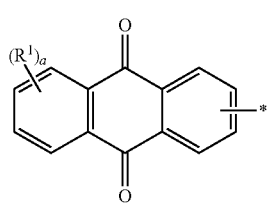

(6) 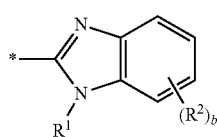

(7) 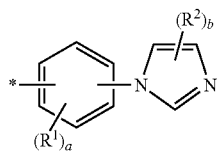

wherein, in Chemical Formula 3A, $R^1$ and $R^2$ are each independently a substituted or unsubstituted C1 to C10 alkyl group or a substituted or unsubstituted C6 to C12 aryl group, and a to c range from 0 to the number of hydrogens on the substituted ring,

*-(G)$_n$-(Z$_3$)$_k$    Chemical Formula 3B-1 wherein, in Chemical Formula 3B-1,

G is a C1 to C4 hydrocarbon group, $Z_3$ is a phosphonic acid group, a carboxylic acid group, a sulfonic acid group, a hydroxyl group, or a thiol group, n ranges from 0 to 1, and k is 1 or 2,

*—(CH$_2$)$_{m1}$-(Ph)$_{m2}$-(CH$_2$)$_{m3}$—(Z$_3$)$_k$    Chemical Formula 3B-2 wherein, in Chemical Formula 3B-2,

Ph is a substituted or unsubstituted phenylene, $Z_3$ is a phosphonic acid group, a carboxylic acid group, a sulfonic acid group, a hydroxyl group, or a thiol group, m1, m2, and m3 are independently 0 to 1, and k is 1 or 2.

18. The electrochromic device of claim 12, wherein the functional group of Chemical Formulas 3B-1 or 3B-2 are a group represented by the following Chemical Formula 4:

Chemical Formula 4

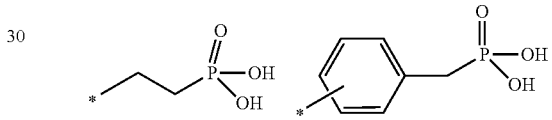

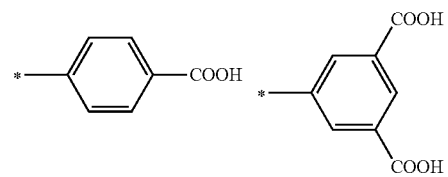

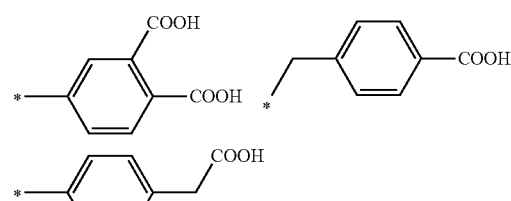

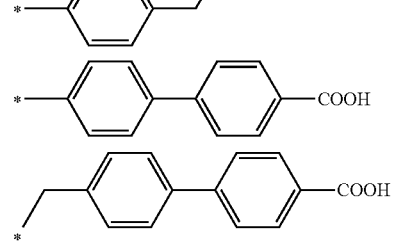

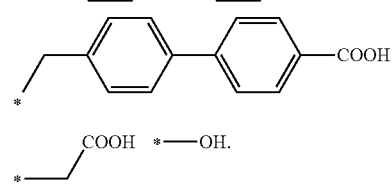

19. The electrochromic device of claim 12, wherein the electrochromic compound comprises at least one of the compounds represented by the following Chemical Formulas 1A to 1J:

Chemical Formula 1A
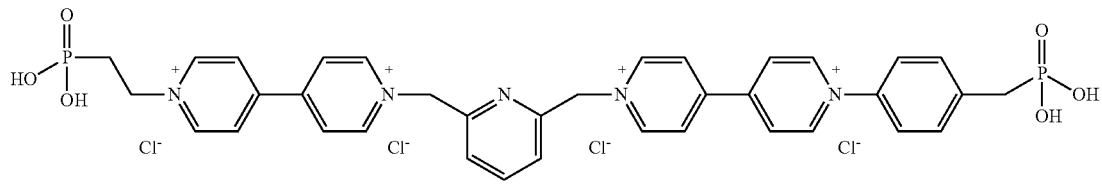
Chemical Formula 1B
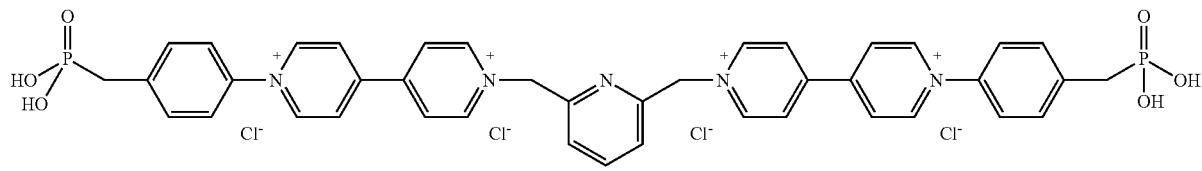
Chemical Formula 1C
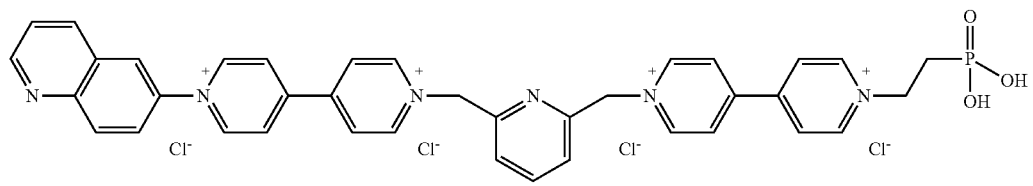
Chemical Formula 1D
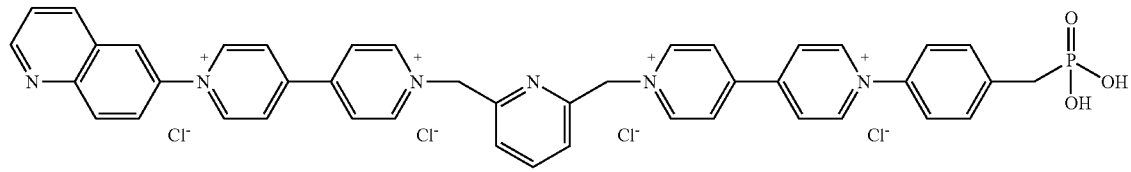
Chemical Formula 1E
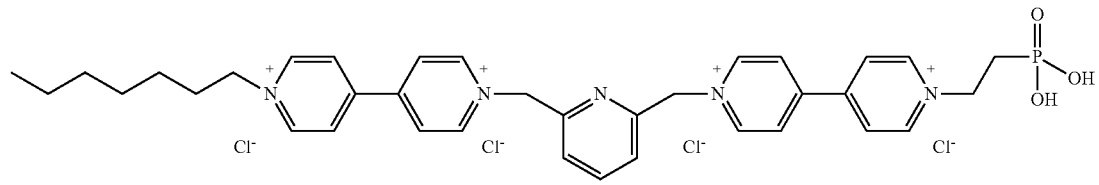
Chemical Formula 1F
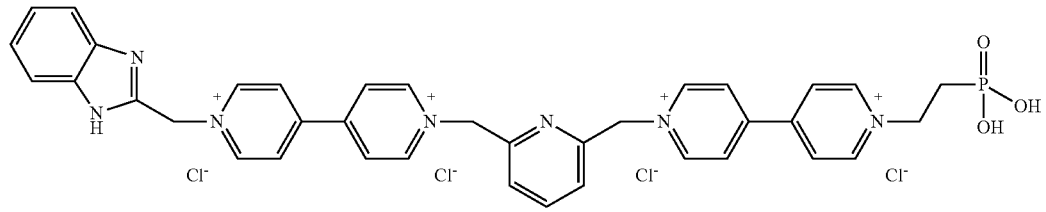
Chemical Formula 1G
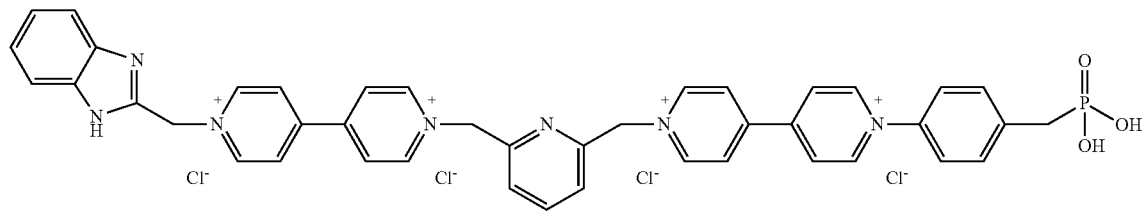

Chemical Formula 1H

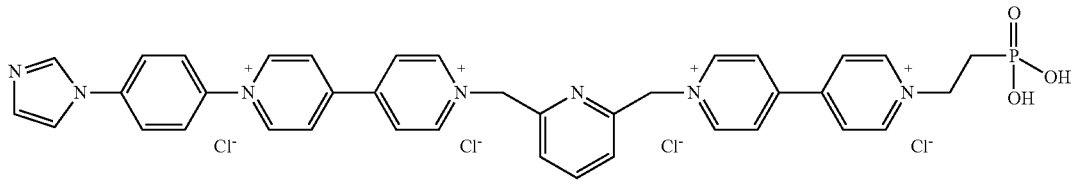

Chemical Formula 1I

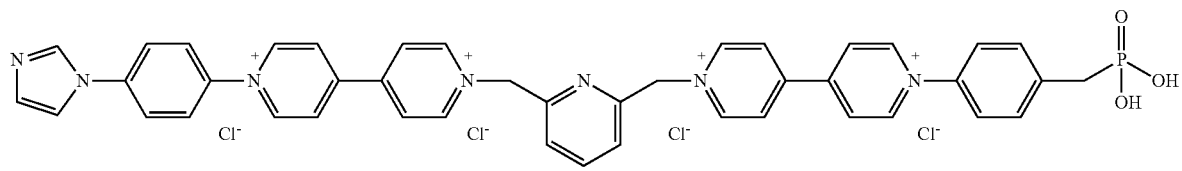

Chemical Formula 1J

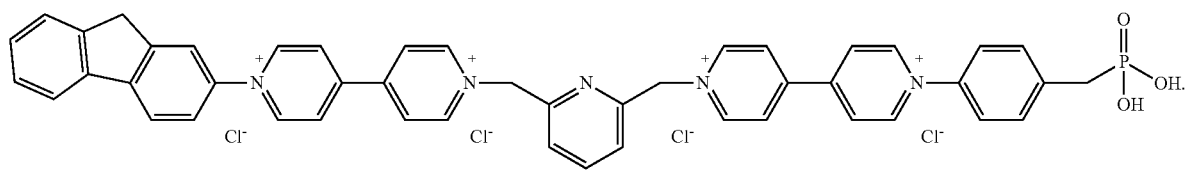

20. The electrochromic device of claim 12, wherein the electrochromic compound has an average reflectance between about 400 and about 700 nanometers of less than about 10% when oxidized at a voltage of greater than about 0.5 Volt.

21. The electrochromic device of claim 12, wherein the electrochromic compound has a wavelength of maximum reflectance of about 425 to about 475 nanometers when oxidized at a voltage of greater than about 0.5 Volt.

* * * * *